US008764500B2

(12) United States Patent
Kuriyagawa et al.

(10) Patent No.: US 8,764,500 B2
(45) Date of Patent: Jul. 1, 2014

(54) OUTBOARD MOTOR CONTROL APPARATUS

(75) Inventors: Koji Kuriyagawa, Saitama (JP); Hajime Yoshimura, Saitama (JP); Hiroshi Yamamoto, Saitama (JP); Nobuchika Katagiri, Saitama (JP); Masahide Shinokawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 332 days.

(21) Appl. No.: 13/029,324

(22) Filed: Feb. 17, 2011

(65) Prior Publication Data

US 2011/0217888 A1 Sep. 8, 2011

(30) Foreign Application Priority Data

| Mar. 5, 2010 | (JP) | 2010-049665 |
|---|---|---|
| Mar. 5, 2010 | (JP) | 2010-049666 |
| Mar. 5, 2010 | (JP) | 2010-049667 |
| Mar. 5, 2010 | (JP) | 2010-049668 |
| Mar. 5, 2010 | (JP) | 2010-049669 |
| Mar. 5, 2010 | (JP) | 2010-049670 |

(51) Int. Cl.
*B63H 21/21* (2006.01)

(52) U.S. Cl.
USPC .............................. 440/86; 701/21

(58) Field of Classification Search
CPC ...................................................... B63H 21/21
USPC .............. 114/284, 285; 440/1, 86, 75; 701/21
See application file for complete search history.

(56) References Cited

U.S. PATENT DOCUMENTS

| 3,744,309 | A | * | 7/1973 | Astengo | 73/178 R |
|---|---|---|---|---|---|
| 6,139,380 | A | * | 10/2000 | Uematsu | 440/61 D |
| 6,456,946 | B1 | * | 9/2002 | O'Gorman | 702/58 |
| 7,238,071 | B2 | | 7/2007 | Takada et al. | |
| 7,702,431 | B2 | * | 4/2010 | Kaji | 440/1 |
| 2003/0054704 | A1 | | 3/2003 | Kanno | |
| 2003/0109184 | A1 | | 6/2003 | Kanno | |
| 2009/0209151 | A1 | | 8/2009 | Suzuki et al. | |
| 2009/0221193 | A1 | | 9/2009 | Suzuki et al. | |
| 2009/0247026 | A1 | * | 10/2009 | Suzuki et al. | 440/1 |

FOREIGN PATENT DOCUMENTS

JP 2009-190671 A 8/2009

* cited by examiner

*Primary Examiner* — Lars A Olson
*Assistant Examiner* — Andrew Polay
(74) *Attorney, Agent, or Firm* — Carrier Blackman & Associates, P.C.; William D. Blackman; Michael J. McCandlish

(57) ABSTRACT

In an apparatus for controlling operation of an outboard motor having an engine to power a propeller, a transmission being selectively changeable in gear position to establish speeds including a first speed and second speed and transmitting power of the engine to the propeller with a gear ratio determined by established speed, and a trim angle regulation mechanism regulating a trim angle through trim-up/down operation, the transmission is controlled to change the gear position from the second speed to the first speed when the second speed is selected and a throttle opening change amount is at or above a predetermined value; and the trim angle regulation mechanism is operated to start the trim-up operation based on engine speed. With this, the transmission can be appropriately controlled to suppress the decrease in boat speed caused by change of gear position, thereby mitigating an unnatural feel given to the operator.

19 Claims, 33 Drawing Sheets

OUTBOARD MOTOR CONTROL APPARATUS

BACKGROUND OF THE INVENTION

1. Field of the Invention

This invention relates to an outboard motor control apparatus, particularly to an apparatus for controlling an outboard motor with a transmission.

2. Description of the Related Art

In recent years, there is proposed an outboard motor having a transmission interposed at a power transmission shaft between an internal combustion engine and a propeller to change an output of the engine in speed and transmit it to the propeller, as taught, for example, by Japanese Laid-Open Patent Application No. 2009-190671. In the reference, when a throttle lever is manipulated by the operator to accelerate the boat speed, a gear position (ratio) of the transmission is changed from the second speed to the first speed to amplify torque to be transmitted to the propeller, thereby improving the acceleration performance. After that, when the engine speed is increased and the acceleration is completed, the transmission is changed back from the first speed to the second speed.

SUMMARY OF THE INVENTION

However, when, as in the above reference, the transmission is changed back from the first speed to the second speed under the accelerating condition where the resistance of water flow against the boat is relatively high, the boat speed is decreased and it gives an unnatural feel to the operator. Specifically, if the transmission is changed back from the first speed to the second speed when the acceleration is completed, since the torque is not amplified through the transmission, the torque to be transmitted to the propeller is decreased, so that the boat speed is decreased, resulting in such the unnatural feel, disadvantageously.

An object of this invention is therefore to overcome the foregoing drawbacks by providing an apparatus for controlling an outboard motor having a transmission, which apparatus can appropriately control the operation of the transmission to suppress the decrease in boat speed which is caused by change of gear position, thereby mitigating an unnatural feel given to the operator.

In order to achieve the object, this invention provides an apparatus for controlling operation of an outboard motor adapted to be mounted on a stern of a boat and having an internal combustion engine to power a propeller through a drive shaft and a propeller shaft, a transmission installed at a location between the drive shaft and the propeller shaft, the transmission being selectively changeable in gear position to establish speeds including at least a first speed and a second speed and transmitting power of the engine to the propeller with a gear ratio determined by established speed, and a trim angle regulation mechanism regulating a trim angle relative to the boat through trim-up/down operation, comprising: a throttle opening change amount detector that detects a change amount of throttle opening of the engine; an engine speed detector that detects speed of the engine; a transmission controller that controls operation of the transmission to change the gear position from the second speed to the first speed when the second speed is selected and the detected change amount of the throttle opening is equal to or greater than a first predetermined value; and a trim angle controller that controls operation of the trim angle regulation mechanism, wherein the trim angle controller operates the trim angle regulation mechanism to start the trim-up operation based on the detected engine speed.

BRIEF DESCRIPTION OF THE DRAWINGS

The above and other objects and advantages of the invention will be more apparent from the following description and drawings in which.

DETAILED DESCRIPTION OF THE PREFERRED EMBODIMENTS

Preferred embodiments of an outboard motor control apparatus according to the invention will now be explained with reference to the attached drawings.

Figure 1:
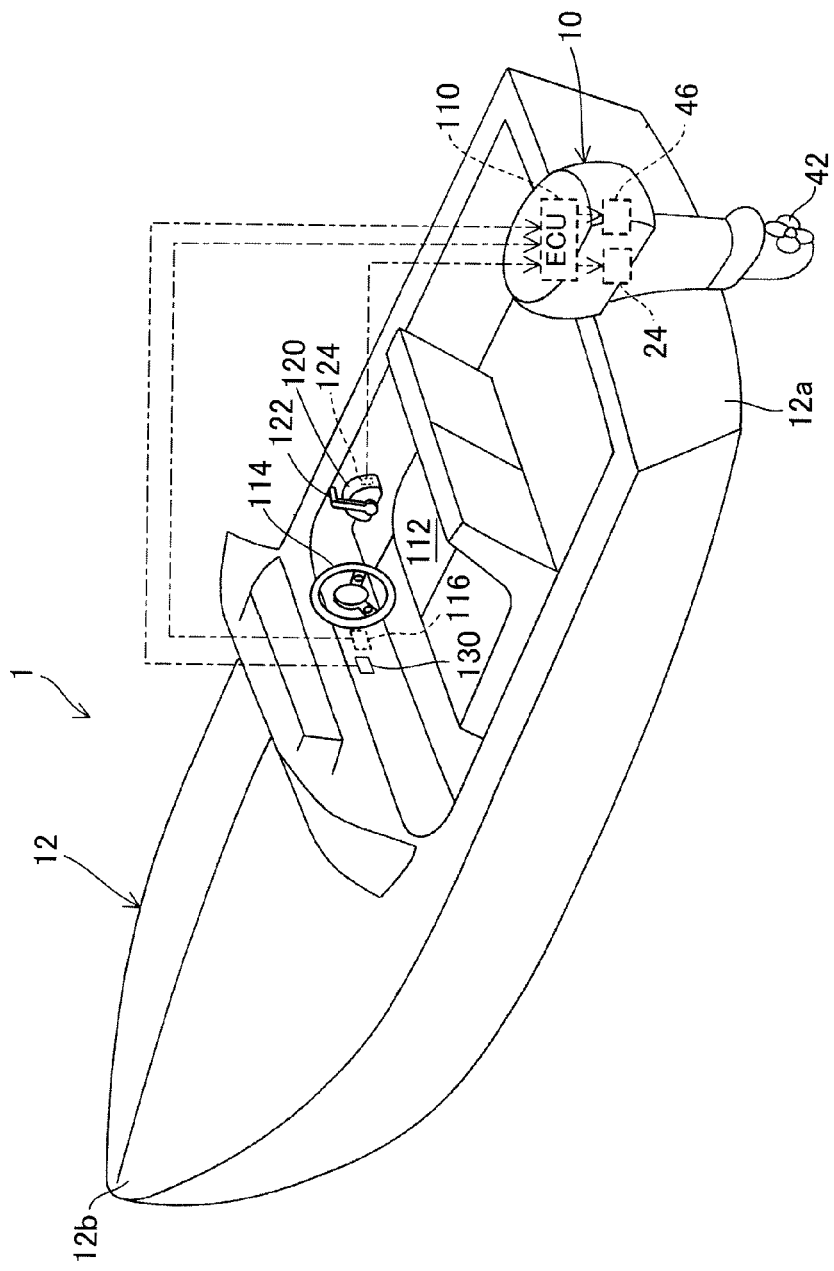
FIG. 1 is an overall schematic view of an outboard motor control apparatus including a boat according to a first embodiment of the invention.
Figure 2:
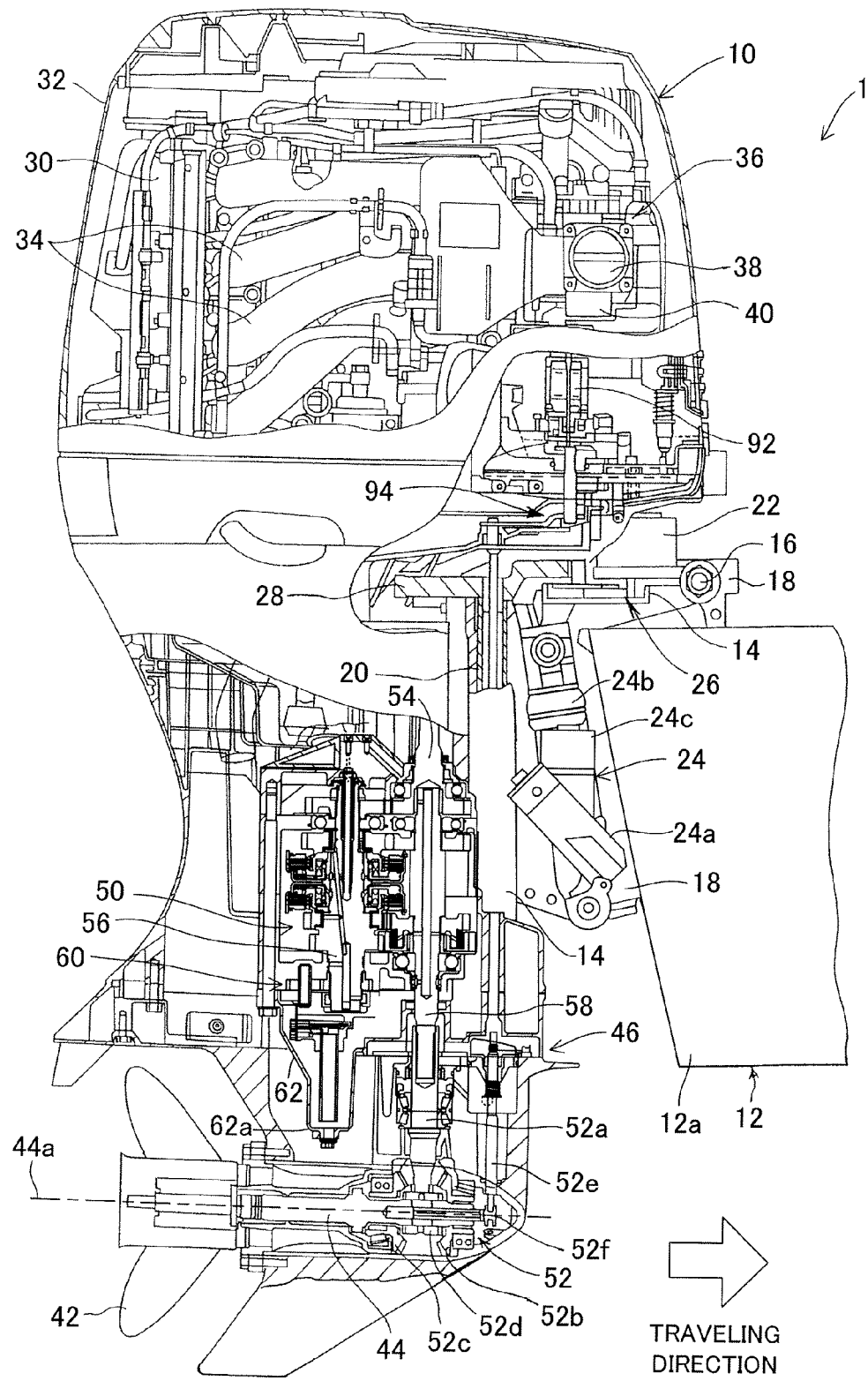
FIG. 2 is an enlarged sectional side view partially showing the outboard motor shown in FIG. 1.

FIG. 1 is an overall schematic view of an outboard motor control apparatus including a boat according to a first embodiment of the invention. FIG. 2 is an enlarged sectional side view partially showing the outboard motor shown in FIG. 1 and FIG. 3 is an enlarged side view of the outboard motor.

Figure 3:
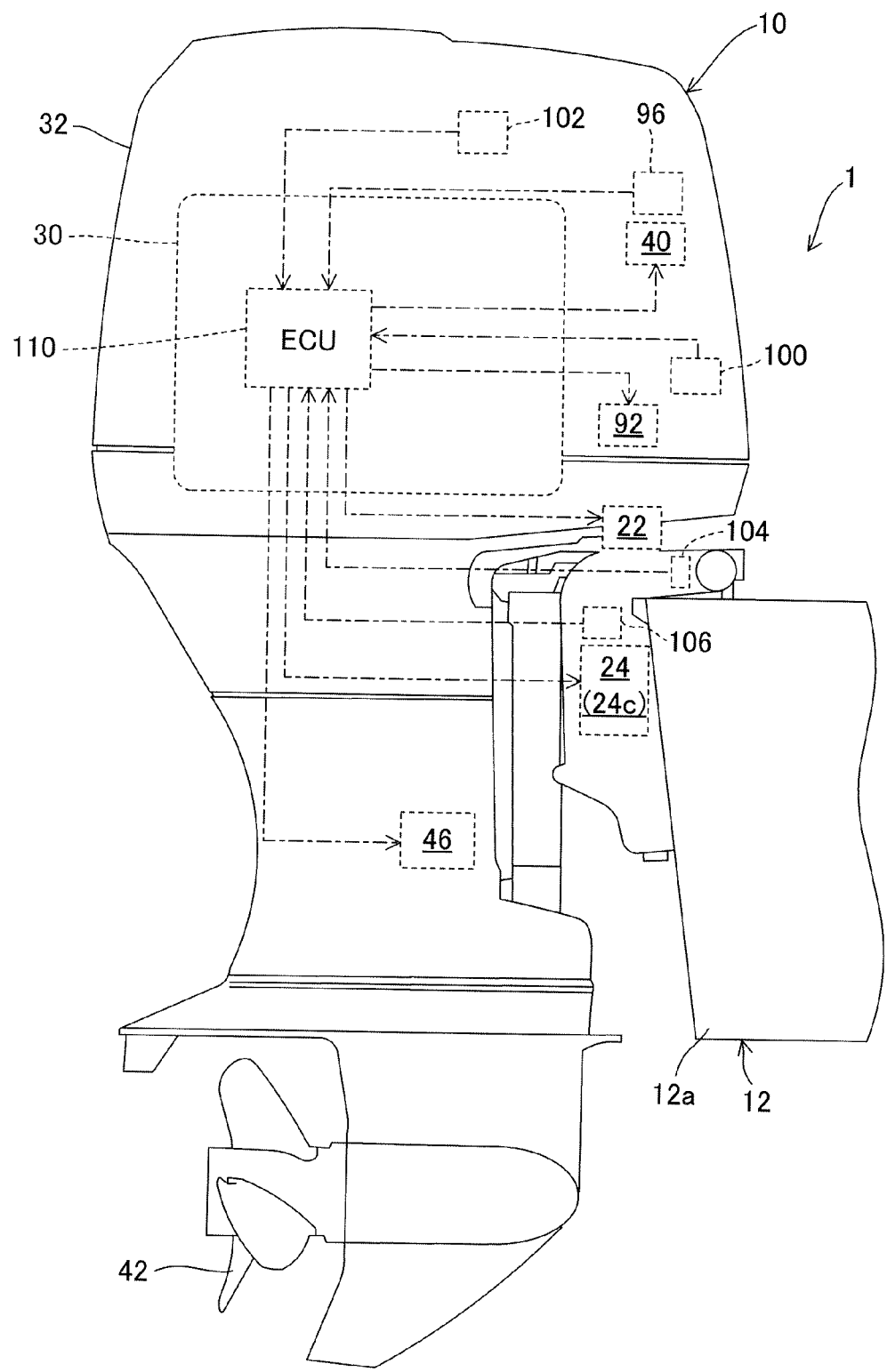
FIG. 3 is an enlarged side view of the outboard motor shown in FIG. 1.

In FIGS. 1 to 3, a symbol 1 indicates a boat or vessel whose hull 12 is mounted with an outboard motor 10. As clearly shown in FIG. 2, the outboard motor 10 is clamped (fastened) to the stern or transom 12a of the boat 1, more precisely, to the stern 12a of the hull 12 through a swivel case 14, tilting shaft 16 and stern brackets 18.

An electric steering motor (actuator) 22 for operating a shaft 20 which is housed in the swivel case 14 to be rotatable about the vertical axis and a power tilt-trim unit (trim angle regulation mechanism; hereinafter called the "trim unit") 24 for regulating a tilt angle and trim angle of the outboard motor 10 relative to the hull 12 by tilting up/down and trimming up/down are installed near the swivel case 14. A rotational output of the steering motor 22 is transmitted to the shaft 20 via a speed reduction gear mechanism 26 and a mount frame 28, whereby the outboard motor 10 is steered about the shaft 20 as a steering axis to the right and left directions (steered about the vertical axis).

The trim unit 24 integrally comprises a hydraulic cylinder 24a for adjusting the tilt angle, a hydraulic cylinder 24b for adjusting the trim angle, and an electric tilt/trim angle regulation motor (actuator) 24c connected to the hydraulic cylinders 24a, 24b through a hydraulic circuit (not shown). In the trim unit 24, the motor 24c is operated in response to a tilt up/down signal or trim up/down signal, and consequently the hydraulic cylinders 24a, 24b are extended/contracted upon being supplied with operating oil so that the swivel case 14 is rotated about the tilting shaft 16 as a rotational axis, thereby tiling up/down and trimming up/down the outboard motor 10.

The trim unit 24 (more precisely, the motor 24c) is operated using a duty ratio (i.e., is PWM-controlled), and a change in the trim angle (i.e., the trim-up speed) is variable in stages or continuously.

An internal combustion engine (hereinafter referred to as the "engine") 30 is disposed in the upper portion of the outboard motor 10. The engine 30 comprises a spark-ignition, water-cooling gasoline engine with a displacement of 2,200 cc. The engine 30 is located above the water surface and covered by an engine cover 32.

An air intake pipe 34 of the engine 30 is connected to a throttle body 36. The throttle body 36 has a throttle valve 38 installed therein and an electric throttle motor (actuator) 40 for opening and closing the throttle valve 38 is integrally disposed thereto.

The output shaft of the throttle motor 40 is connected to the throttle valve 38 via a speed reduction gear mechanism (not shown). The throttle motor 40 is operated to open and close the throttle valve 38, thereby regulating the flow rate of the air sucked in the engine 30 to control an engine speed NE of the engine 30.

The outboard motor 10 further comprises a propeller shaft (power transmission shaft) 44 that is supported to be rotatable about the horizontal axis and attached with a propeller 42 at its one end to transmit power output of the engine 30 thereto, and a transmission (automatic transmission) 46 that is interposed at a location between the engine 30 and propeller shaft 44 and has a plurality of gear positions, i.e., first, second and third speeds.

The propeller shaft 44 is positioned so that its axis line 44a is substantially parallel to the traveling direction of the boat 1 in the initial condition of the trim unit 24 (condition where the trim angle θ is at the initial angle). The transmission 46 comprises a transmission mechanism 50 that is selectively changeable in gear positions and a shift mechanism 52 that can change a shift position among forward, reverse and neutral positions.

Figure 4:
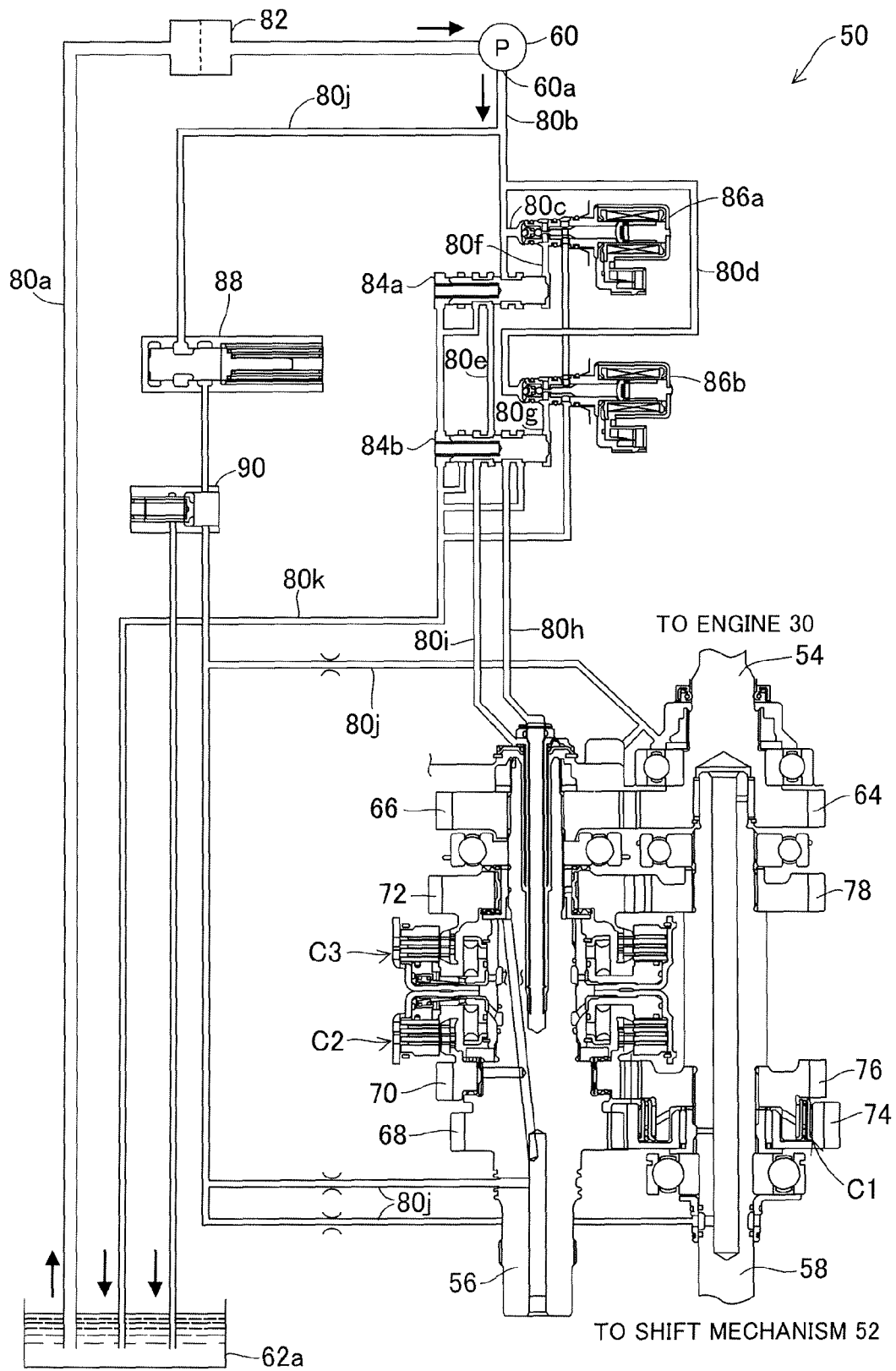
FIG. 4 is a hydraulic circuit diagram schematically showing a hydraulic circuit of a transmission mechanism shown in FIG. 2.

FIG. 4 is a hydraulic circuit diagram schematically showing a hydraulic circuit of the transmission mechanism 50.

As shown in FIGS. 2 and 4, the transmission mechanism 50 comprises a parallel-axis type transmission mechanism with distinct gear positions (ratios), which includes an input shaft (drive shaft) 54 connected to the crankshaft (not shown in the figures) of the engine 30, a countershaft 56 connected to the input shaft 54 through a gear, and a first connecting shaft 58 connected to the countershaft 56 through several gears. Those shafts 54, 56, 58 are installed in parallel. Thus, the transmission 46 is interposed at a location between the input shaft (drive shaft) 54 and propeller shaft 44.

The countershaft 56 is connected with a hydraulic pump (gear pump; shown in FIGS. 2 and 4) 60 that pumps up the operating oil (lubricating oil) and forwards it to transmission clutches and lubricated portions of the transmission mechanism 50 (explained later). The foregoing shafts 54, 56, 58, hydraulic pump 60 and the like are housed in a case 62 (shown only in FIG. 2). An oil pan 62a for receiving the operating oil is formed at the bottom of the case 62.

In the so-configured transmission mechanism 50, the gear installed on the shaft to be rotatable relative thereto is fixed on the shaft through the transmission clutch so that the transmission 46 is selectively changeable in the gear position to establish one of the three speeds (i.e., first to third speeds), and the output of the engine 30 is changed with the gear ratio determined by the established (selected) gear position (speed; gear) and transmitted to the propeller 42 through the shift mechanism 52 and propeller shaft 44. A gear ratio of the gear position (speed) is set to be the highest in the first speed and decreases as the speed changes to second and then third speed.

The further explanation on the transmission mechanism 50 will be made. As clearly shown in FIG. 4, the input shaft 54 is supported with an input primary gear 64. The countershaft 56 is supported with a counter primary gear 66 to be meshed with the input primary gear 64, and also supported with a counter first-speed gear 68, counter second-speed gear 70 and counter third-speed gear 72.

The first connecting shaft 58 is supported with an output first-speed gear 74 to be meshed with the counter first-speed gear 68, an output second-speed gear 76 to be meshed with the counter second-speed gear 70, and an output third-speed gear 78 to be meshed with the counter third-speed gear 72.

In the above configuration, when the output first-speed gear 74 supported to be rotatable relative to the shaft 58 is brought into a connection with the shaft 58 through a first-speed clutch C1, the first speed (gear position) is established. The first-speed clutch C1 comprises a one-way clutch. When a second-speed or third-speed hydraulic clutch C2 or C3 (explained later) is supplied with hydraulic pressure so that the second or third speed (gear position) is established and the rotational speed of the shaft 58 becomes greater than that of the output first-speed gear 74, the first-speed clutch C1 makes the output first-speed gear 74 rotate idly (i.e., rotate without being meshed).

When the counter second-speed gear 70 supported to be rotatable relative to the countershaft 56 is brought into a connection with the countershaft 56 through the second-speed hydraulic clutch (transmission clutch) C2, the second speed (gear position) is established. Further, when the counter third-speed gear 72 supported to be rotatable relative to the countershaft 56 is brought into a connection with the countershaft 56 through the third-speed hydraulic clutch (transmission clutch) C3, the third speed (gear position) is established. The hydraulic clutches C2, C3 connect the gears 70, 72 to the countershaft 56 upon being supplied with the operating oil, while making the gears 70, 72 rotate idly when the operating oil is not supplied.

The interconnections between the gears and shafts through the clutches C1, C2, C3 are performed by controlling hydraulic pressure supplied from the pump 60 to the hydraulic clutches C2, C3.

The further explanation will be made with reference to FIG. 4. When the oil pump 60 is driven by the engine 30, it pumps up the operating oil in the oil pan 62a through an oil passage 80a and strainer 82 and forwards it from a discharge port 60a to a first switching valve 84a through an oil passage 80b and to first and second electromagnetic solenoid valves (linear solenoid valves) 86a, 86b through oil passages 80c, 80d.

The first switching valve 84a is connected to the second switching valve 84b through an oil passage 80e. Each of the valves 84a, 84b has a movable spool installed therein and the spool is urged by a spring at its one end (left end in the drawing) toward the other end. The valves 84a, 84b are connected on the sides of the other ends of the spools with the first and second solenoid valves 86a, 86b through oil passages 80f, 80g, respectively.

Upon being supplied with current (i.e., made ON), a spool housed in the first solenoid valve 86a is displaced to output the hydraulic pressure supplied from the pump 60 through the oil passage 80c to the other end side of the spool of the first switching valve 84a. Accordingly, the spool of the first switching valve 84a is displaced to its one end side, thereby forwarding the operating oil in the oil passage 80b to the oil passage 80e.

Similarly to the first solenoid valve 86a, upon being supplied with current (i.e., made ON), a spool of the second solenoid valve 86b is displaced to output the hydraulic pressure supplied from the pump 60 through the oil passage 80d to the other end side of the spool of the second switching valve 84b. Accordingly, the spool of the second switching valve 84b is displaced to its one end side, thereby forwarding the operating oil in the oil passage 80e to the second-speed hydraulic clutch C2 through the oil passage 80h. In contrast, when the second solenoid valve 86b is not supplied with current (made OFF) and no hydraulic pressure is outputted to the other end side of the second switching valve 84b, the operating oil in the oil passage 80e is forwarded to the third-speed hydraulic clutch C3 through the oil passage 80i.

When the first and second solenoid valves 86a, 86b are both made OFF, the hydraulic pressure is not supplied to the hydraulic clutches C2, C3 and hence, the output first-speed gear 74 and shaft 58 are interconnected through the first-speed clutch C1 so that the first speed is established.

When the first and second solenoid valves 86a, 86b are both made ON, the hydraulic pressure is supplied to the second-speed hydraulic clutch C2 and accordingly, the counter second-speed gear 70 and countershaft 56 are interconnected so that the second speed is established. Further, when the first solenoid valve 86a is made ON and the second solenoid valve 86b is made OFF, the hydraulic pressure is supplied to the third-speed hydraulic clutch C3 and accordingly, the counter third-speed gear 72 and countershaft 56 are interconnected so that the third speed is established.

Thus, one of the gear positions of the transmission 46 is selected (i.e., transmission control is conducted) by controlling ON/OFF of the first and second switching valves 84a, 84b.

Note that the operating oil (lubricating oil) from the hydraulic pump 60 is also supplied to the lubricated portions (e.g., the shafts 54, 56, 58, etc.) of the transmission 46 through the oil passage 80b, an oil passage 80j, a regulator valve 88 and a relief valve 90. Also, the first and second switching valves 84a, 84b and the first and second solenoid valves 86a, 86b are connected with an oil passage 80k adapted to relieve pressure.

The explanation on FIG. 2 is resumed. The shift mechanism 52 comprises a second connecting shaft 52a that is connected to the first connecting shaft 58 of the transmission mechanism 50 and installed parallel to the vertical axis to be rotatably supported, a forward bevel gear 52b and reverse bevel gear 52c that are connected to the shaft 52a to be rotated, a clutch 52d that can engage the propeller shaft 44 with either one of the forward bevel gear 52b and reverse bevel gear 52c, and other components.

The interior of the engine cover 32 is disposed with an electric shift motor (actuator) 92 that drives the shift mechanism 52. The output shaft of the shift motor 92 can be connected via a speed reduction gear mechanism 94 with the upper end of a shift rod 52e of the shift mechanism 52. When the shift motor 92 is operated, its output appropriately displaces the shift rod 52e and a shift slider 52f to move the clutch 52d to change the shift position among the forward, reverse and neutral positions.

When the shift position is forward or reverse, the rotational output of the shaft 58 is transmitted via the shift mechanism 52 to the propeller shaft 44 to rotate the propeller 42 in one of the directions making the boat 1 move forward or rearward. The outboard motor 10 is equipped with a power source (not shown) such as a battery or the like attached to the engine 30 to supply operating power to the motors 22, 24c, 40, 92, etc.

As shown in FIG. 3, a throttle opening sensor (throttle opening change amount detector) 96 is installed near the throttle valve 38 and produces an output or signal indicative of opening of the throttle valve 38, i.e., throttle opening TH. A neutral switch 100 is installed near the shift rod 52e and produces an ON signal when the shift position of the transmission 46 is neutral and an OFF signal when it is forward or reverse. A crank angle sensor (engine speed detector) 102 is installed near the crankshaft of the engine 30 and produces a pulse signal at every predetermined crank angle.

A trim angle sensor (trim angle detector, i.e., rotation angle sensor such as a rotary encoder) 104 is installed near the tilting shaft 16 and produces an output or signal corresponding to a trim angle θ of the outboard motor 10 (i.e., a rotation angle of the outboard motor 10 about its pitching axis relative to the hull 12). A current sensor (drive current detector) 106 is installed near the tilt/trim angle regulation motor 24c and produces an output or signal indicative of drive current I of the motor 24c.

The outputs of the foregoing sensors and switch are sent to an Electronic Control Unit (ECU) 110 disposed in the outboard motor 10. The ECU 110 which has a microcomputer comprising a CPU, ROM, RAM and other devices is installed in the engine cover 32 of the outboard motor 10.

As shown in FIG. 1, a steering wheel 114 is installed near a cockpit (the operator's seat) 112 of the hull 12 to be manipulated or rotated by the operator (not shown). A steering angle sensor 116 attached on a shaft (not shown) of the steering wheel 114 produces an output or signal corresponding to the steering angle applied or inputted by the operator through the steering wheel 114.

A remote control box 120 provided near the cockpit 112 is equipped with a shift/throttle lever (throttle lever) 122 installed to be manipulated by the operator. The lever 122 can be moved or swung in the front-back direction from the initial position and is used by the operator to input a forward/reverse change command and an engine speed regulation command including an acceleration/deceleration command or instruction for the engine 30. A lever position sensor 124 is installed in the remote control box 120 and produces an output or signal corresponding to a position of the lever 122.

An acceleration sensor (pitching detector) 126 for detecting acceleration acting on the hull 12 is disposed near the cockpit 112 and in the center of gravity of the hull 12. The acceleration sensor 126 produces an output or signal indicative of acceleration acting on the hull 12 in its vertical (gravitational) direction, etc.

A switch 130 is also provided near the cockpit 112 to be manually operated by the operator to input a fuel consumption decreasing command for decreasing fuel consumption of the engine 30. The switch 130 is manipulated or pressed when the operator desires to travel the boat 1 with high fuel efficiency, and upon the manipulation, it produces a signal (ON signal) indicative of the fuel consumption decreasing command. The outputs of the sensors 116, 124, 126 and switch 130 are also sent to the ECU 110.

Based on the inputted outputs, the ECU 110 controls the operation of the motors 22, 40, 92, while performing the transmission control of the transmission 46 and the trim angle control for regulating the trim angle θ through the trim unit 24. Thus, the outboard motor control apparatus according to the embodiments is a Drive-By-Wire type apparatus whose operation system (steering wheel 114, lever 122) has no mechanical connection with the outboard motor 10.

Figure 5:
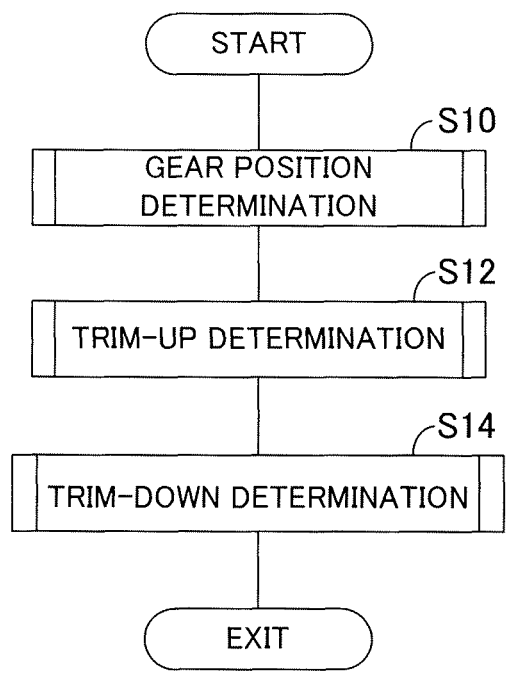
FIG. 5 is a flowchart showing transmission control operation and trim angle control operation by an electronic control unit shown in FIG. 1.

FIG. 5 is a flowchart showing the transmission control operation and trim angle control operation by the ECU 110. The illustrated program is executed by the ECU 110 at predetermined intervals, e.g., 100 milliseconds.

The program begins at S10, in which the operation for determining which gear position of the transmission 46 from among the first to third speeds is to be selected, is conducted.

Figure 6:
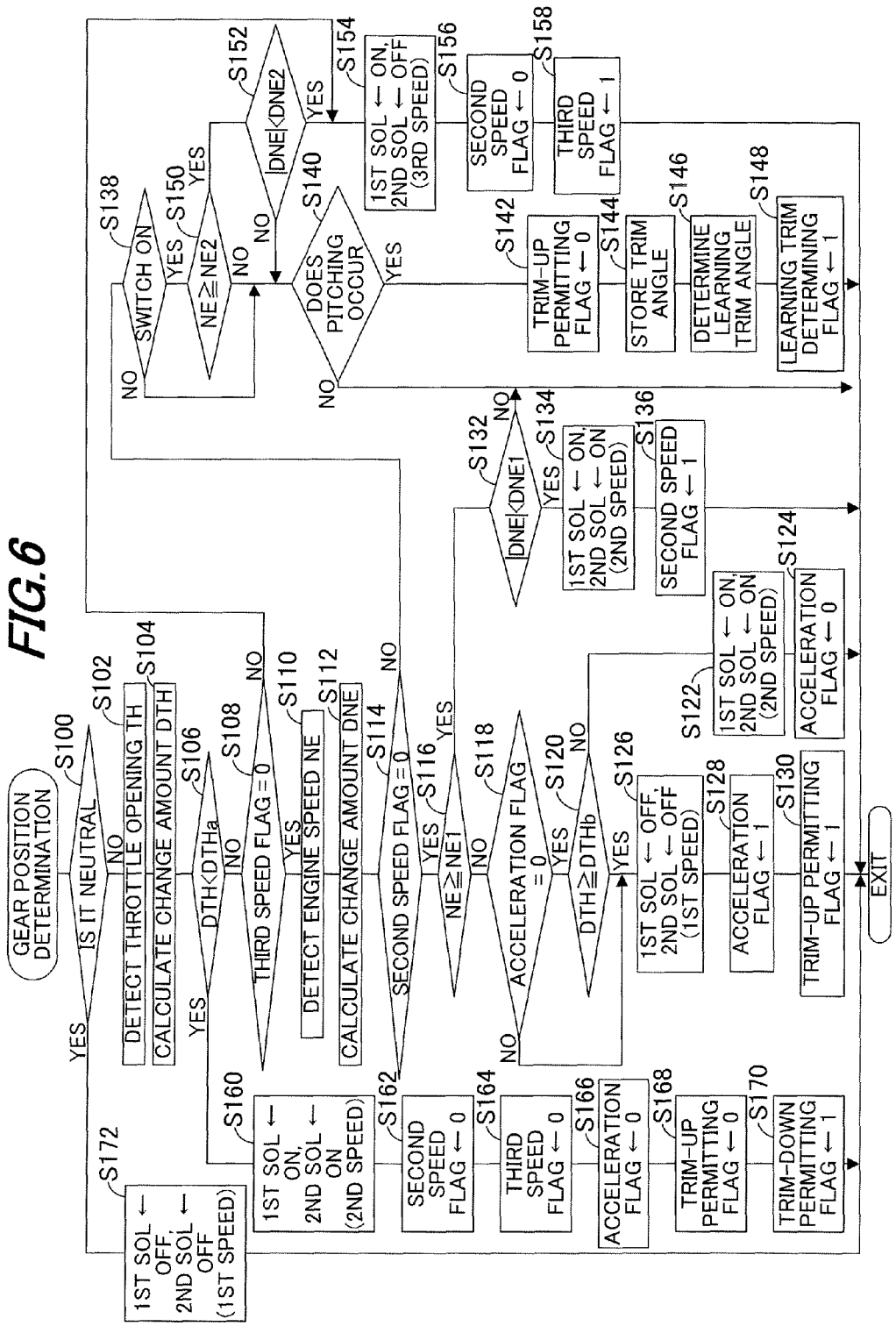
FIG. 6 is a subroutine flowchart showing the operation of gear position determination of the FIG. 5 flowchart.

FIG. 6 is a subroutine flowchart showing the operation of gear position determination.

In S100, it is determined whether the shift position of the transmission 46 is neutral. This determination is made by checking as to whether the neutral switch 100 outputs the ON signal. When the result in S100 is negative, i.e., it is determined to be in gear, the program proceeds to S102, in which the throttle opening TH is detected or calculated from the output of the throttle opening sensor 96, and to S104, in which a change amount (variation) DTH of the detected throttle opening TH per unit time (e.g., 500 milliseconds) is detected or calculated.

The program proceeds to S106, in which it is determined whether the deceleration is instructed to the engine 30 by the operator, i.e., whether the engine 30 is in the operating condition to decelerate the boat 1. This determination is made by checking as to whether the throttle valve 38 is operated in the closing direction, i.e., whether the change amount DTH is less than a deceleration-determining predetermined value (second predetermined value) DTHa (e.g., −0.5 degree).

Specifically, when the change amount DTH is less than the predetermined value DTHa set to a negative value, the throttle valve 38 is determined to be operated in the closing direction (i.e., the deceleration is instructed to the engine 30) and when the change amount DTH is equal to or greater than the predetermined value DTHa, the throttle valve 38 is determined to be substantially stopped or operated in the opening direction (i.e., the deceleration is not instructed).

When the result in S106 is negative, the program proceeds to S108, in which it is determined whether the bit of an after-acceleration third-speed changed flag (explained later; hereinafter called the "third speed flag") which indicates that the gear position has been changed to the third speed after the acceleration was completed, is 0. Since the initial value of this flag is 0, the result in S108 in the first program loop is generally affirmative and the program proceeds to S110.

In S110, the engine speed NE is detected or calculated from the output of the crank angle sensor 102, and to S112, in which a change amount (variation) DNE of the engine speed NE is detected or calculated. The change amount DNE is obtained by subtracting the engine speed NE detected in the present program loop from that detected in the previous program loop.

Next, the program proceeds to S114, in which it is determined whether the bit of an after-acceleration second-speed changed flag (hereinafter called the "second speed flag") is 0. The bit of this flag is set to 1 when the gear position is changed from the first speed to the second speed after the acceleration is completed, and otherwise, reset to 0.

Since the initial value of the second speed flag is also 0, the result in S114 in the first program loop is generally affirmative and the program proceeds to S116, in which it is determined whether the engine speed NE is equal to or greater than a first predetermined speed (second predetermined speed) NE1. The first predetermined speed NE1 will be explained later.

Since the engine speed NE is less than the first predetermined speed NE1 generally in a program loop immediately after the engine start, the result in S116 is negative and the program proceeds to S118, in which it is determined whether the bit of an acceleration determining flag (explained later; indicated by "acceleration flag" in the drawing) is 0. Since the initial value of this flag is also 0, the result in S118 in the first program loop is generally affirmative and the program proceeds to S120.

In S120, it is determined whether the acceleration (precisely, the rapid acceleration) is instructed to the engine 30 by the operator, i.e., whether the engine 30 is in the operating condition to accelerate the boat 1 (rapidly). This determination is made by checking as to whether the throttle valve 38 is operated in the opening direction rapidly.

Specifically, the change amount DTH of the throttle opening TH detected in S104 is compared with an acceleration-determining predetermined value (first predetermined value) DTHb and when the change amount DTH is equal to or greater than the predetermined value DTHb, it is determined that the throttle valve 38 is operated in the opening direction rapidly, i.e., the acceleration is instructed to the engine 30. The predetermined value DTHb is set to a value (positive value, e.g., 0.5 degree) greater than the deceleration-determining predetermined value DTHa, as a criterion for determining whether the acceleration is instructed to the engine 30.

When the result in S120 is negative, i.e., it is determined that neither the acceleration nor the deceleration is instructed to the engine 30, the program proceeds to S122, in which the first and second solenoid valves 86a, 86b (indicated by "1ST SOL," "2ND SOL" in the drawing) are both made ON to select the second speed in the transmission 46, and to S124, in which the bit of the acceleration determining flag is reset to 0.

On the other hand, when the result in S120 is affirmative, the program proceeds to S126, in which the first and second solenoid valves 86a, 86b are both made OFF to change the gear position (shift down the gear) of the transmission 46 from the second speed to the first speed. As a result, the output torque of the engine 30 is amplified through the transmission 46 (more precisely, the transmission mechanism 50) which has been shifted down to the first speed, and transmitted to the propeller 42 via the propeller shaft 44, thereby improving the acceleration performance.

Then the program proceeds to S128, in which the bit of the acceleration determining flag is set to 1. Specifically, the bit of this flag is set to 1 when the change amount DTH of the throttle opening TH is equal to or greater than the acceleration-determining predetermined value DTHb and the transmission 46 is changed from the second speed to the first speed, and otherwise, reset to 0. Upon setting of the bit of the acceleration determining flag to 1, the result in S118 in the next and subsequent loops becomes negative and the program skips S120.

Thus, since the transmission 46 is set in the second speed during a period from when the engine 30 is started until the acceleration is instructed (i.e., during the normal operation), it becomes possible to ensure the usability of the outboard motor 10 similarly to that of an outboard motor having no transmission.

Next, the program proceeds to S130, in which the bit of a trim-up permitting flag (initial value 0) is set to 1, whereafter the program is terminated. Specifically, the bit of this flag being set to 1 means that the change amount DTH is equal to or greater than the predetermined value DTHb and the transmission 46 is changed to the first speed, in other words, the trim-up operation to be conducted based on the engine speed NE is permitted, while being reset to 0 means that the trim-up operation is not needed, i.e., for example, the deceleration is instructed to the engine 30.

After the transmission 46 is changed to the first speed, when the engine speed NE is gradually increased and the acceleration through the torque amplification in the first speed is completed (i.e., the acceleration range is saturated), the engine speed NE reaches the first predetermined speed NE1. Subsequently, in the next program loop, the result in S116 becomes affirmative and the program proceeds to S132 onward. The first predetermined speed NE1 is set to a relatively high value (e.g., 6000 rpm) as a criterion for determining whether the acceleration in the first speed is completed.

In S132, it is determined whether the engine speed NE is stable, i.e., the engine 30 is stably operated. This determination is made by comparing an absolute value of the change amount DNE of the engine speed NE with a first prescribed value DNE1. When the absolute value is less than the first prescribed value DNE1, the engine speed NE is determined to be stable. The first prescribed value DNE1 is set as a criterion (e.g., 500 rpm) for determining whether the engine speed NE is stable, i.e., the change amount DNE is relatively small.

When the result in S132 is negative, the program is terminated with the first speed being maintained, and when the result is affirmative, the program proceeds to S134, in which the first and second solenoid valves 86a, 86b are both made ON to change the transmission 46 (shift up the gear) from the first speed to the second speed, and to S136, in which the bit of the second speed flag is set to 1. It causes the increase in the rotational speed of the shaft 52a and that of the propeller shaft 44, so that the boat speed reaches the maximum speed (in a range of the engine performance), thereby improving the speed performance.

Upon setting of the bit of the second speed flag to 1 in S136, the result in S114 in the next and subsequent loops becomes negative and the program proceeds to S138. Thus, when the bit of the second speed flag is set to 1, i.e., when the gear position is changed to the second speed after the acceleration in the first speed is completed, the process of S138 onward is conducted.

In S138, it is determined whether the switch 130 outputs the ON signal, i.e., whether the fuel consumption decreasing command for the engine 30 is inputted by the operator. When the result in S138 is negative, the program proceeds to S140, in which the pitching (vibration or shake in the vertical direction) of the boat 1, i.e., the hull 12 occurs.

The pitching occurrence is determined based on the output of the acceleration sensor 126, specifically, it is determined by detecting or calculating vibration acceleration Gz acting on the hull 12 in the vertical direction based on the output of the acceleration sensor 126, and determining whether an absolute value of the vibration acceleration Gz is within a permissible range. When the vibration acceleration Gz is determined to be out of the permissible range multiple (e.g., two) times sequentially, the pitching is determined to occur. The permissible range is set to a range (e.g., 0 to 0.5 G) as a criterion for determining whether the vertical vibration of the hull 12 is relatively small and no pitching occurs.

When the result in S140 is negative, the remaining steps are skipped and when the result is affirmative, the program proceeds to S142, in which the bit of the trim-up permitting flag is reset to 0. Then the program proceeds to S144, in which the present trim angle θ is detected based on the output of the trim angle sensor 104, i.e., the trim angle θ at the time when the pitching occurs is detected and stored, and to S146, in which a value obtained by subtracting a prescribed angle (e.g., 3 degrees) from the stored trim angle θ is defined as a learning trim angle θa (explained later).

The program proceeds to S148, in which the bit of a learning trim determining flag (initial value 0) is set to 1, whereafter the program is terminated. Specifically, the bit of this flag being set to 1 means that the learning trim angle θa has been determined On the other hand, when the result in S138 is affirmative, the program proceeds to S150, in which it is determined whether the engine speed NE is equal to or greater than a second predetermined speed (third predetermined speed) NE2. The second predetermined speed NE2 is set to a value (e.g., 5000 rpm) slightly lower than the first predetermined speed NE1, as a criterion for determining whether it is possible to change the gear position to the third speed (explained later).

When the result in S150 is affirmative, the program proceeds to S152, in which, similarly to S132, it is determined whether the engine speed NE is stable. Specifically, the absolute value of the change amount DNE of the engine speed NE is compared with a second prescribed value DNE2. When the absolute value is less than the second prescribed value DNE2, the engine speed NE is determined to be stable. The second prescribed value DNE2 is set as a criterion (e.g., 500 rpm) for determining whether the change amount DNE is relatively small and the engine speed NE is stable.

When the result in S152 or S150 is negative, the program proceeds to S140 mentioned above and when the result in S152 is affirmative, the program proceeds to S154, in which the first solenoid valve 86*a* is made ON and the second solenoid valve 86*b* is made OFF to change the transmission 46 (shift up the gear) from the second speed to the third speed. As a result, the engine speed NE is decreased, thereby decreasing the fuel consumption, i.e., improving the fuel efficiency.

Next, the program proceeds to S156, in which the bit of the second speed flag is reset to 0, and to S158, in which the bit of the third speed flag is set to 1. Thus, the third speed flag is set to 1 when the gear position is changed from the second speed to the third speed after the acceleration is completed, and otherwise, reset to 0. In a program loop after the bit of the third speed flag is set to 1, the result in S108 is negative and the process of S154 to S158 is conducted, whereafter the program is terminated with the third speed being maintained.

When the result in S106 is affirmative, i.e., when the change amount DTH is less than the predetermined value DTHa, the program proceeds to S160, in which the first and second solenoid valves 86*a*, 86*b* are both made ON to change the transmission 46 to the second speed. Then the program proceeds to S162, S164 and S166, in which all the bits of the second speed flag, third speed flag and acceleration determining flag are reset to 0.

Then the program proceeds to S168, in which the bit of the trim-up permitting flag is reset to 0 and to S170, in which the bit of a trim-down permitting flag (initial value 0) is set to 1. The bit of the trim-down permitting flag being set to 1 means that the change amount DTH is less than the predetermined value DTHa and the trim-down operation (explained later) is permitted, while being reset to 0 means that the trim-down operation is not needed.

When the lever 122 is manipulated by the operator to change the shift position of the transmission 46 to neutral, the result in S100 is affirmative and the program proceeds to S172, in which the first and second solenoid valves 86*a*, 86*b* are both made OFF to change the transmission 46 from the second speed to the first speed.

Returning to the explanation on the FIG. 5 flowchart, the program proceeds to S12, in which it is determined whether the trim-up operation of the outboard motor 10 should be conducted.

Figure 7:
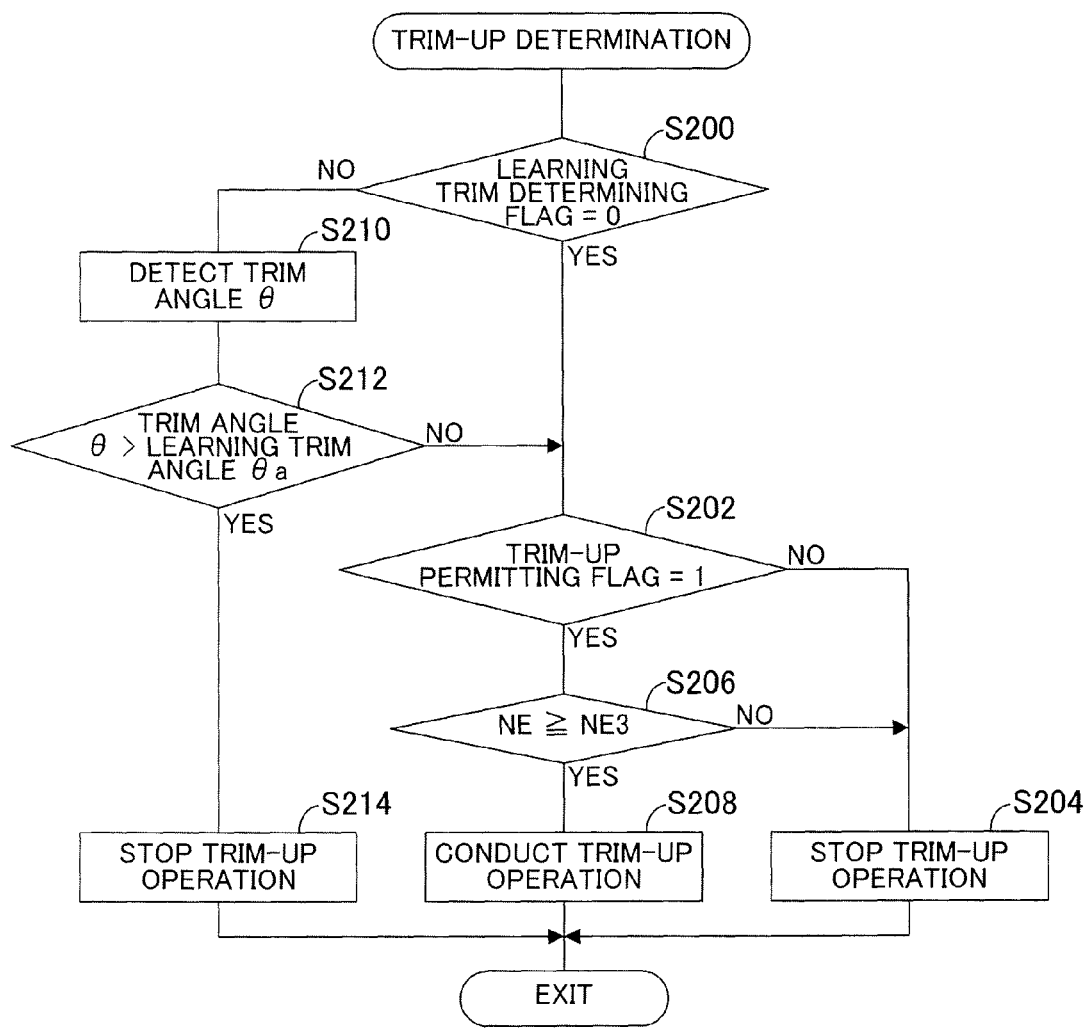
FIG. 7 is a subroutine flowchart showing the operation of trim-up determination of the FIG. 5 flowchart.

FIG. 7 is a subroutine flowchart showing the operation of trim-up determination. As shown in FIG. 7, in S200, it is determined whether the bit of the learning trim determining flag is 0. Since the initial value of this flag is 0, the result in S200 in the first program loop is generally affirmative and the program proceeds to S202, in which the bit of the trim-up permitting flag is 1.

When the result in S202 is negative, since it means that the trim-up operation is not needed, the program proceeds to S204, in which the trim-up operation is stopped, more precisely, not conducted. When the result in S202 is affirmative, i.e., when the change amount DTH is equal to or greater than the predetermined value DTHb and the transmission 46 is changed to the first speed, the program proceeds to S206, in which it is determined based on the engine speed NE whether it is immediately before the acceleration in the first speed is completed and the transmission 46 is changed back from the first speed to the second speed.

Specifically, the engine speed NE is compared to a third predetermined speed (first predetermined speed) NE3 set lower than the first predetermined speed NE1 which is the threshold value used when the transmission 46 is changed back from the first speed to the second speed. When the engine speed NE is equal to or greater than the third predetermined value NE3, it is determined to be immediately before the acceleration in the first speed is completed and the transmission 46 is changed back from the first speed to the second speed. The third predetermined speed NE3 is set as a criterion (e.g., 5000 rpm) for determining whether it is immediately before the acceleration is completed.

When the result in S206 is negative, since it is not the time to start the trim-up operation, the program proceeds to S204 and the program is terminated without conducting the trim-up operation. On the other hand, when the result in S206 is affirmative, the program proceeds to S208, in which the trim unit 24 is operated to start and conduct the trim-up operation.

When the result in S200 in the next loop is negative, i.e., when the pitching of the hull 12 occurs and the learning trim angle θa is determined, the program proceeds to S210, in which the trim angle θ is detected and to S212, in which the detected trim angle θ exceeds the learning trim angle θa.

Since, as mentioned in S146, the learning trim angle θa is determined by subtracting the prescribed angle from the trim angle θ at the time of pitching occurrence, when the process in S212 is conducted for the first time, the trim angle θ has already exceeded the learning trim angle θa. Therefore, the result in S212 is naturally affirmative and the program proceeds to S214, in which the trim-up operation is stopped.

In the case where, after the trim-up operation is stopped, the trim angle θ is regulated back to the initial angle (i.e., 0 degree) through the trim-down operation which will be explained later, since the bit of the learning trim determining flag has been already set to 1, the result in S200 in the next and subsequent program loops is negative and the program proceeds to S210 and S212.

When the trim angle θ is at the initial angle, the result in S212 is negative and the program proceeds to the process of S202 to S208 to determine whether the trim-up operation should be conducted based on the change amount DTH and engine speed NE. In the case where the trim-up operation is started in S208 and the trim angle θ reaches the learning trim angle θa, the result in S212 is affirmative and the program proceeds to S214, in which the trim-up operation is stopped.

The learning trim angle θa is a value obtained by subtracting the prescribed angle from the trim angle θ at the time the pitching occurs in the previous program loop (in other words, corresponding to a trim angle before the pitching occurs). Therefore, owing to the configuration to stop the trim-up operation when the trim angle θ reaches the learning trim angle θa, it becomes possible to avoid a trouble such as pitching caused by excessive trim-up operation.

Further, when the first speed is selected in the transmission 46 during the acceleration and the engine speed NE is equal to or greater than the third predetermined speed NE3, the trim-up operation is started and the operation of the trim unit 24 is controlled so that the trim angle θ converges to a predetermined angle (i.e., the learning trim angle θa when conducting the trim-up operation for the second time). With this, the trim-up operation can be started before the acceleration is completed and the transmission 46 is changed back from the first speed to the second speed, and the trim angle θ of the outboard motor 10 can be regulated to decrease the water resistance against the boat 1 so that the thrust is increased, thereby increasing the boat speed.

Returning to the explanation on the FIG. 5 flowchart, the program proceeds to S14, in which it is determined whether the trim-down operation of the outboard motor 10 should be conducted.

Figure 8:
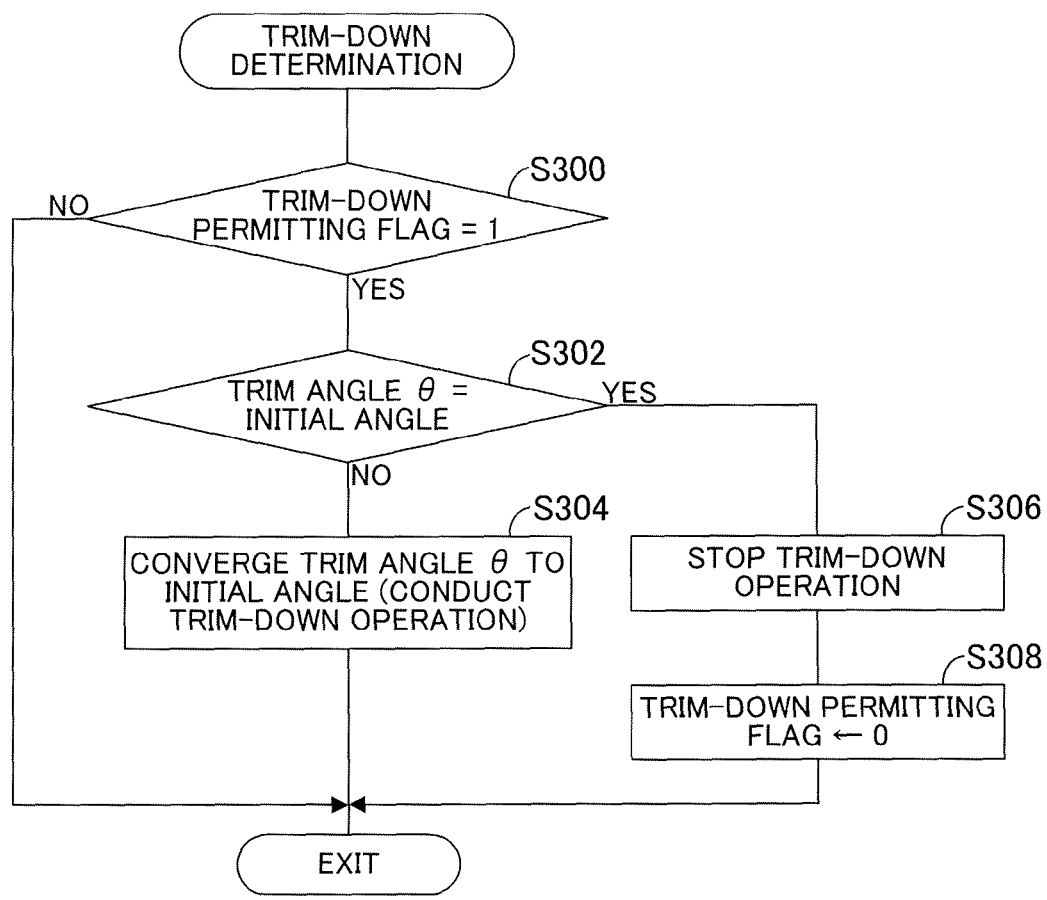
FIG. 8 is a subroutine flowchart showing the operation of trim-down determination of the FIG. 5 flowchart.

FIG. 8 is a subroutine flowchart showing the operation of trim-down determination. As shown in FIG. 8, in S300, it is determined whether the bit of the trim-down permitting flag is 1. When the result is negative, the remaining steps are skipped and when the result is affirmative, i.e., when the change amount DTH of the throttle opening TH is less than the deceleration-determining predetermined value DTHa, the program proceeds to S302, in which it is determined whether the trim angle θ is at the initial angle.

When the result in S302 is negative, i.e., when the trim angle θ is at the predetermined angle (the learning trim angle θa) due to the trim-up operation in S208, the program proceeds to S304, in which the trim-down operation is started and the operation of the trim unit 24 is controlled so that the trim angle θ converges to the initial angle.

When the result in S302 is affirmative, the program proceeds to S306, in which the trim-down operation is stopped and to S308, in which the bit of the trim-down permitting flag is reset to 0, whereafter the program is terminated.

Figure 9:
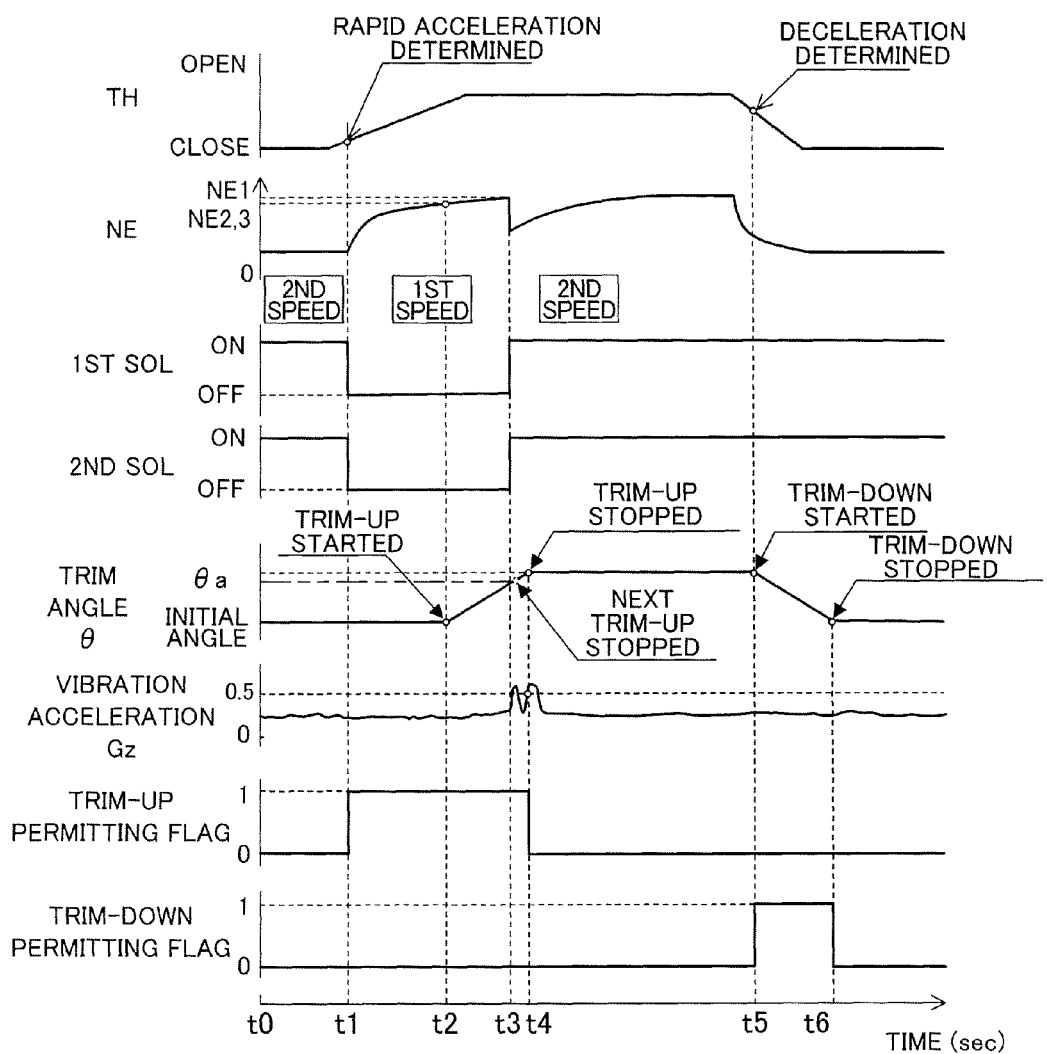
FIG. 9 is a time chart for explaining the operation of the flowcharts in FIGS. 5 to 8.
Figure 10:
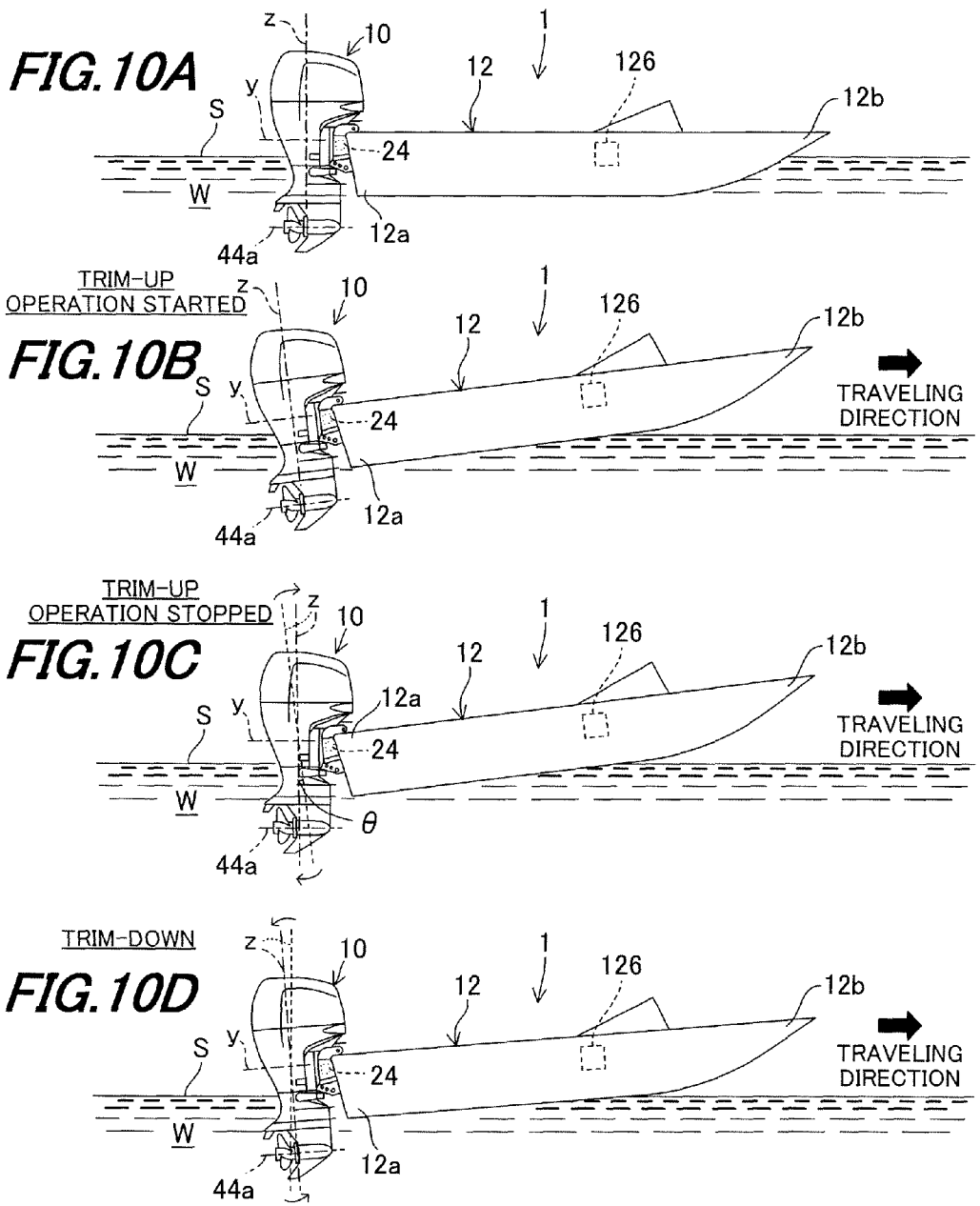
FIGS. 10 are explanatory views for explaining the operation of the flowcharts in FIGS. 5 to 8.

FIG. 9 is a time chart for explaining the operation of the foregoing flowcharts and FIGS. 10A to 10D are explanatory views thereof. In FIG. 10, a symbol y indicates the front-back direction of the outboard motor 10, a symbol z the vertical direction thereof, a symbol W seawater or freshwater, and a symbol S the water surface. The front-back direction y and vertical direction z represent those with respect to the outboard motor 10 and they may differ from the gravitational direction and horizontal direction depending on the tilt angle or trim angle of the outboard motor 10.

As shown in FIG. 9, in the normal operation from the time t0 to t1, the transmission 46 is set in the second speed (S122). Then, when the throttle valve 38 is opened upon the manipulation of the lever 122 by the operator and, at the time t1, the change amount DTH is equal to or greater than the predetermined value DTHb (S120), the gear position is changed from the second speed to the first speed (S126). At this time, the bit of the trim-up permitting flag is set to 1 (S130).

As shown in FIG. 10A, at the time t0 to t1, the hull 12 and outboard motor 10 are both in the horizontal position and the trim angle θ is at the initial angle (0 degree). When the gear position is changed to the first speed upon the acceleration at the time t1 and the boat speed is increased, as shown in FIG. 10B, the bow 12b of the hull 12 is lifted up and the stern 12a thereof is sunk down (the boat speed lies the so-called "hump" region). As can be seen from the drawing, the axis line 44a of the propeller shaft 44 is not parallel with the traveling direction of the boat 1.

When the acceleration is continued so that the engine speed NE is gradually increased and reaches the third predetermined speed NE3 or more at the time t2, the trim-up operation of the outboard motor 10 is started (S206, S208). Subsequently, when the engine speed NE is further increased and becomes equal to or greater than the first predetermined speed NE1 (S116) and the change amount DNE is determined to be less than the first prescribed value DNE1 (S132, time t3), the gear position is changed from the first speed to the second speed (S134).

When, at the time t4, the vibration acceleration Gz is determined to be out of the permissible range two times and it is determined that the pitching of the hull 12 occur accordingly, the bit of the trim-up permitting flag is reset to 0 and the trim-up operation is stopped (S140 to S148, S200, S210 to S214).

In the case where the next trim-up operation is conducted, as indicated by an imaginary line in FIG. 9, when the trim angle θ becomes the learning trim angle θa which is determined by subtracting the prescribed angle from the trim angle of at the time t4 (at which the pitching occurs), the trim-up operation is stopped.

The condition where, after the trim-up operation is stopped, the trim angle θ is at the predetermined angle (i.e., the learning trim angle θa when the trim-up operation is conducted for the second time) is shown in FIG. 10C. As clearly shown, since the outboard motor 10 is trimmed up to regulate the trim angle θ to the predetermined angle, the axis line 44a of the propeller shaft 44 (i.e., the direction of thrust of the outboard motor 10) can be positioned substantially parallel with the traveling direction of the boat 1. As a result, the resistance against the hull 12 from the water surface S can be decreased, while the thrust of the hull 12 can be increased, thereby increasing the boat speed.

After that, when, at the time t5, the lever 122 is manipulated by the operator and the change amount DTH is less than the predetermined value DTHa, the bit of the trim-down permitting flag is set to 1 (S106, S170) and the trim-down operation of the outboard motor 10 is started (S300 to S304). Then, at the time t6, when the trim angle θ is regulated back to the initial angle, the bit of the trim-down permitting flag is reset to 0 and the trim-down operation is stopped (S302, S306, S308).

As mentioned in the foregoing, the outboard motor control apparatus according to the first embodiment is configured such that the operation of the transmission 46 is controlled to change the gear position from the second speed to the first speed when the second speed is selected in the transmission 46 and the change amount DTH of the throttle opening TH is equal to or greater than the first predetermined value (acceleration-determining predetermined value DTHb) (i.e., when the acceleration is instructed to the engine 30) (S10, S120, S126), and the trim angle regulation mechanism (trim unit) 24 is operated to start the trim-up operation based on the engine speed NE (S12, S206, S208).

With this, when, for example, it is immediately before the gear position is changed (returned) from the first speed to the second speed after the acceleration of the engine 30 is completed, the trim-up operation can be implemented. In other words, the outboard motor 10 can be trimmed up before the gear position is changed from the first speed to the second speed, thereby increasing the boat speed. Therefore, even when the gear position is changed from the first speed to the second speed after the acceleration is completed and the torque to be transmitted to the propeller 42 is decreased, since the boat speed is still increased by regulating the trim angle θ, it becomes possible to avoid an unnatural feel caused by the decrease in the boat speed from being given to the operator.

In the apparatus, the trim-up operation is started when the engine speed NE is equal to or greater than the first predetermined speed (third predetermined speed NE3) (S12, S206, S208). Specifically, since the predetermined speed NE3 is set to a value corresponding to that of immediately before the acceleration is completed and the gear position is changed back from the first speed to the second speed, in addition to the above effects, the trim-up operation can be started at the right time.

In the apparatus, the trim angle θ converges to the predetermined angle (learning trim angle θa) when the trim-up operation is started (S12, S200 to S214). With this, in addition to the above effects, the predetermined angle can be set to a value with which, for instance, the water resistance against the boat 1 is decreased so that the thrust is increased, thereby trimming up the outboard motor 10. Accordingly, it becomes possible to reliably increase the boat speed through the trim-up operation before the gear position is changed from the first speed to the second speed.

In the apparatus, the trim-down operation is started so that the trim angle θ converges to the initial angle when the change amount DTH of the throttle opening is less than the second predetermined value (deceleration-determining predetermined value DTHa) (S10, S14, S106, S170, S300 to S308). With this, in addition to the above effects, the trim angle θ which is regulated to the predetermined angle, for example, can be converged to the initial angle at the right time in accordance with the operating condition of the outboard motor 10. Also, in the case where the trim angle θ is regulated to the predetermined angle next time, since the outboard motor 10 can be trimmed up from the initial angle, it becomes possible to reliably and easily regulate the trim angle θ to the predetermined angle.

In the apparatus, the pitching of the boat 1, i.e., hull 12 is detected (S10, S140) and the predetermined angle is determined based on the trim angle θ at the time when the pitching occurs (S10, S146). With this, in addition to the above effects, a value obtained by subtracting the prescribed angle from the trim angle θ at the time the pitching occurs can be applied as the predetermined angle (learning trim angle θa). Therefore, when the next trim-up operation is conducted, the trim-up operation can be stopped before the pitching occurs, i.e., the predetermined angle can be set more appropriately.

An outboard motor control apparatus according to a second embodiment of the invention will be explained.

Figure 11:
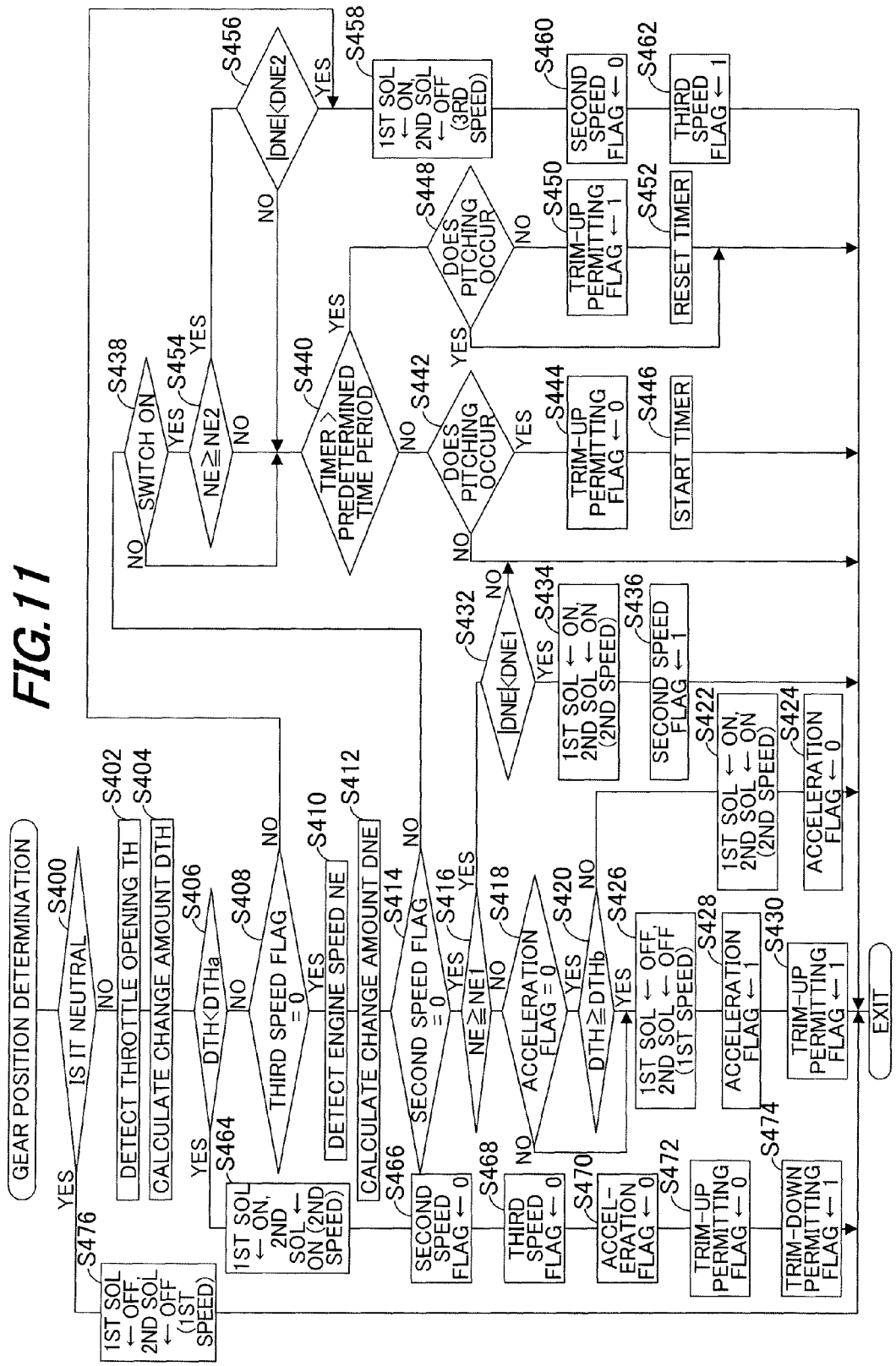
FIG. 11 is a subroutine flowchart similar to FIG. 6, but showing an alternative example of the operation of gear position determination of the FIG. 5 flowchart by an electronic control unit of an outboard motor control apparatus according to a second embodiment of the invention.

FIG. 11 is a subroutine flowchart similar to FIG. 6, but showing an alternative example of the operation of gear position determination of the FIG. 5 flowchart by the ECU 110.

The process of S400 to S438 is conducted similarly to S100 to S138 of the FIG. 6 flowchart. When the result in S438 is negative, the program proceeds to S440, in which it is determined whether a value of a trim-up restart timer (described later) exceeds a value indicating a predetermined time period. Since the initial value of the timer is 0, the result in the first program loop is negative and the program proceeds to S442, in which it is determined whether the pitching of the hull 12 occurs.

When the result in S442 is negative, the remaining steps are skipped and when the result is affirmative, the program proceeds to S444, in which the bit of the trim-up permitting flag is reset to 0. Consequently, the trim-up operation is stopped through another process which will be explained later. Then, in S446, the trim-up restart timer (up counter) is started to measure a time period since the trim-up operation is stopped.

In the next and ensuing program loops, when the result in S440 is affirmative, i.e., when the predetermined time period has elapsed since the trim-up operation stop, the program proceeds to S448, in which, similarly to S442, the pitching determination is again made. When the result in S448 is negative, the program proceeds to S450, in which the bit of the trim-up permitting flag is set to 1 and to S452, in which the timer value is reset to 0.

Consequently, the trim-up operation is restarted through another process which will be explained later. The predetermined time period is set as a criterion (e.g., 5 seconds) for determining whether the trim-up operation that is stopped due to the pitching occurrence can be restarted (because there should be no pitching anymore after that period). When the result in S448 is affirmative, S450 and S452 are skipped.

When the result in S438 is affirmative, the program proceeds to S454, and up to S476, the process is conducted similarly to S150 to S172 of the FIG. 6 flowchart.

Figure 12:
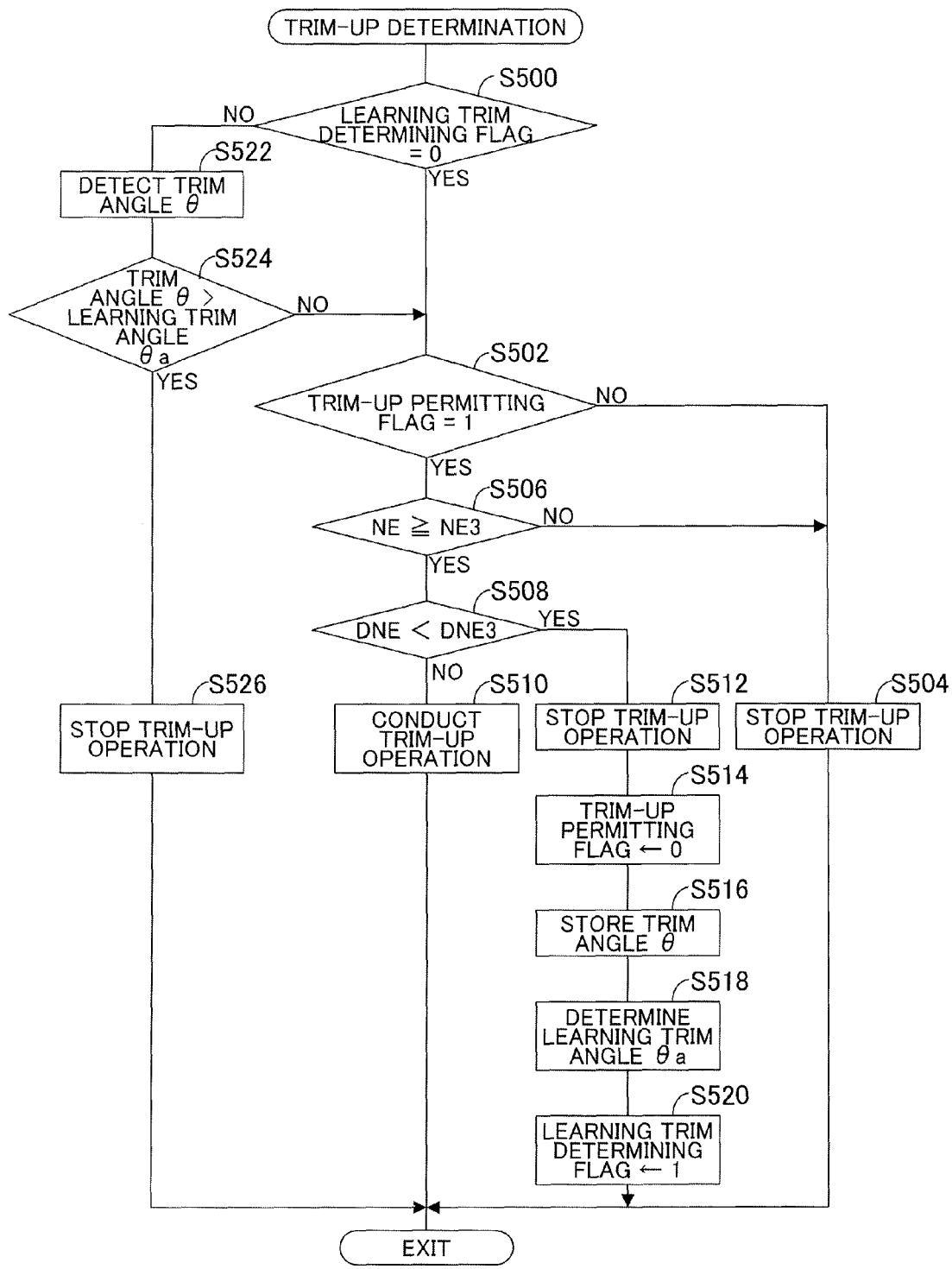
FIG. 12 is a subroutine flowchart similar to FIG. 7, but showing an alternative example of the operation of trim-up determination of the FIG. 5 flowchart.

FIG. 12 is a subroutine flowchart similar to FIG. 7, but showing an alternative example of the operation of trim-up determination of the FIG. 5 flowchart.

The process of S500 to S506 is conducted similarly to S200 to S206 of the FIG. 7 flowchart.

When the result in S506 is negative, since it is not the time to start the trim-up operation, the program proceeds to S504 and the program is terminated without conducting the trim-up operation. On the other hand, when the result in S506 is affirmative, the program proceeds to S508, in which it is determined whether the engine speed NE is saturated in a high speed range, i.e., whether the engine 30 is stable in the high speed operating condition and the boat speed has reached the maximum speed or thereabout. This determination is made by comparing the change amount DNE of the engine speed NE with a third prescribed value DNE3 (prescribed value; e.g., 0 rpm). When the change amount DNE is less than the third prescribed value DNE3 (i.e., is a negative value), it is determined or estimated that the engine speed NE is saturated in the high speed range and the boat speed is at or about the maximum speed.

When the process of S508 is first conducted, since it is immediately after the engine speed NE is determined to be equal to or greater than the third predetermined speed NE3 in S506, the engine speed NE is not saturated in the high speed range. Therefore, the result in S508 is generally negative and the program proceeds to S510, in which the trim unit 24 is operated to start and conduct the trim-up operation. Specifically, when the engine speed NE is equal to or greater than the third predetermined speed NE3, the trim-up operation is started. Thus, the trim-up operation is started before the acceleration is completed and the transmission 46 is changed back from the first speed to the second speed, thereby increasing the boat speed.

In the next program loop, when the result in S508 is affirmative, the program proceeds to S512, in which the trim-up operation is stopped. Thus, in the case where, as described above for instance, the trim-up operation is once stopped due to the pitching occurrence and restarted after the elapse of the predetermined time period, the restarted trim-up operation is stopped based on the change amount DNE, i.e., when the change amount DNE is less than the third prescribed value DNE3 (more exactly, when the boat speed is estimated to have reached the maximum speed or thereabout).

Next, the program proceeds to S514, in which the bit of the trim-up permitting flag is reset to 0. Then the program proceeds to S516, in which the present trim angle θ is detected based on the output of the trim angle sensor 104, i.e., the trim angle θ at the time when the restarted trim-up operation is stopped is detected and stored, and to S518, in which the stored trim angle θ is defined as a learning trim angle θa (explained later).

The program proceeds to S520, in which the bit of the learning trim determining flag is set to 1, whereafter the program is terminated.

Further, after the learning trim angle θa is defined, when, for example, the trim angle θ is returned to the initial angle through the trim-down operation and the trim-up operation is conducted under this condition, i.e., in the program loop in which the next trim-up operation is conducted, the result in S500 is negative and the program proceeds to S522, in which the trim angle θ is detected and to S524, in which it is determined whether the detected trim angle θ exceeds the learning trim angle θa.

When the trim angle θ is at the initial angle, the result in S524 is negative and the program proceeds to the process of S502 to S510 to determine whether the trim-up operation should be conducted based on the engine speed NE. Then when the trim-up operation is started and the trim angle θ reaches the learning trim angle θa, the result in S524 is affirmative and the program proceeds to S526, in which the trim-up operation is stopped. Thus, in the next trim-up operation, the operation of the trim unit 24 is controlled so that the trim angle θ converges to the stored trim angle (learning trim angle θa).

The explanation on the operation of trim-down determination in S14 is omitted, as it is the same as in the first embodiment.

Figure 13:
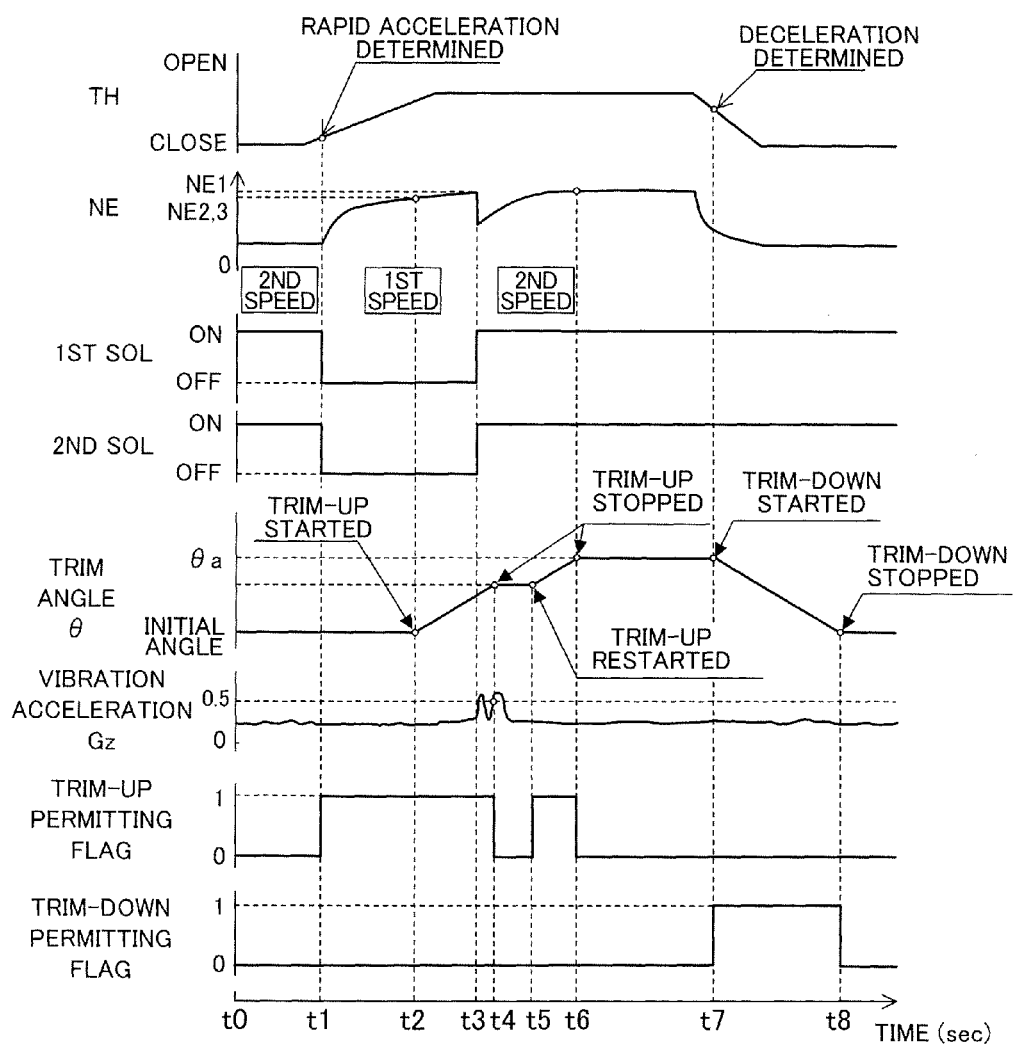
FIG. 13 is a time chart for explaining the operation of the flowcharts in FIGS. 5, 11, 12, etc.

FIG. 13 is a time chart similar to FIG. 9, but for explaining the operation of the above flowcharts.

The explanation on the time t0 to t4 is omitted here, as it is the same as in the first embodiment.

After the trim-up operation is stopped at the time t4, when the predetermined time period elapses (time t5), the bit of the trim-up permitting flag is set to 1 to restart the trim-up operation (S440, S450, S502, S510). At the time t6, when the change amount DNE is less than the third prescribed value DNE3, the bit of the trim-up permitting flag is reset to 0 to stop the restarted trim-up operation (S508, S512, S514) and the trim angle θ at the moment is defined as the learning trim angle θa (S516, S518).

Although not illustrated, when the change amount DNE is already less than the third prescribed value DNE3 at the time t5 at which the predetermined time period elapses, the trim-up operation is not restarted and the trim angle θ at the moment (time t5) is maintained. Also although not illustrated, in the case where, after the learning trim angle θa is defined, the trim angle θ is returned to the initial angle and the next trim-up operation is conducted, when the trim angle θ reaches the learning trim angle θa, the trim-up operation is stopped.

The explanation on the time t7 to t8 is omitted here, as it is the same as that on the time t5 and t6 in the first embodiment.

As mentioned in the foregoing, the outboard motor control apparatus according to the second embodiment is configured such that the pitching of the boat is detected (S10, S442) and the trim-up operation is stopped when the pitching is detected (S10, S12, S442, S444, S502, S504). With this, since the trim-up operation can be stopped immediately after the pitching occurs, it becomes possible to prevent the pitching caused by excessive trim-up operation to the maximum extent.

In the apparatus, the trim-up operation is restarted when the predetermined time period elapses (and also no pitching is detected) after the trim-up operation is stopped (S10, S12, S440, S448, S450, S502, S510), and the restarted trim-up operation is stopped when the change amount DNE is less than the prescribed value (third prescribed value DNE3). With this, in addition to the above effects, the trim-up operation can be restarted when the predetermined time period has elapsed and there is no pitching anymore. Further, since the prescribed value DNE3 is set to a value with which, for instance, it is possible to estimate that the acceleration is completed and the boat speed is at or about the maximum speed, the restarted trim-up operation can be stopped at the right time.

In the apparatus, the trim angle θ at the time when the restarted trim-up operation is stopped is stored and the trim angle is converged to the stored trim angle (learning trim angle θa) when the trim-up operation is next conducted (S12, S500, S516 to S526). With this, in addition to the above effects, when the next trim-up operation is conducted, the appropriate trim angle θ can be achieved reliably.

The remaining configuration as well as the effects is the same as that in the first embodiment.

An outboard motor control apparatus according to a third embodiment of the invention will be explained.

The third embodiment is configured so that, when a trouble occurs in control of the trim unit 24, the control is stopped.

Figure 14:
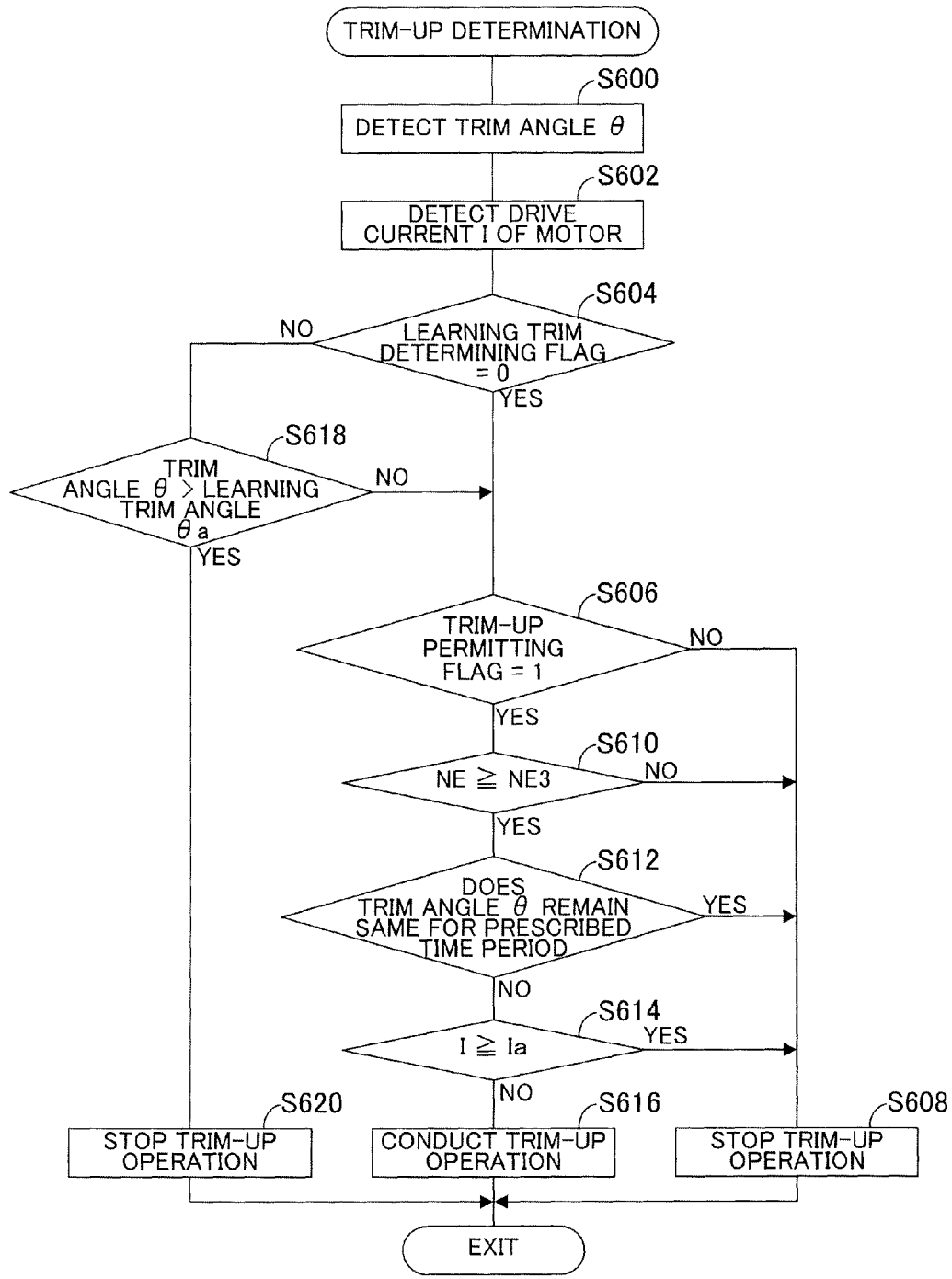
FIG. 14 is a subroutine flowchart similar to FIG. 7, but showing an alternative example of the operation of trim-up determination of the FIG. 5 flowchart by an electronic control unit of an outboard motor control apparatus according to a third embodiment of the invention.

Specifically, in the FIG. 5 flowchart, after the operation of gear position determination (S10), the program proceeds to conduct the operation of trim-up determination (S12). FIG. 14 is a subroutine flowchart showing an alternative example of the operation.

As shown in FIG. 14, in S600, based on the output of the trim angle sensor 104, the trim angle θ is detected or calculated and in S602, based on the output of the current sensor 106, the drive current I of the motor 24c is detected or calculated.

Then the program proceeds to S604, and up to S610, the process is conducted similarly to S200 to S206 of the FIG. 7 flowchart.

When the result in S610 is negative, since it is not the time to start the trim-up operation, the program proceeds to S608 and the program is terminated without conducting the trim-up operation. On the other hand, when the result in S610 is affirmative, the program proceeds to S612, in which it is determined whether a trouble occurs in the control of the trim unit 24.

To be specific, in S612, it is determined whether, despite that the operation of the trim unit 24 is controlled (to trim up in this loop), the trim angle θ remains the same, i.e., stays unchanged continuously for a prescribed time period (e.g., 1 second). When the process of S612 is first conducted, since it is before the trim-up operation is started, the result is negative and the program proceeds to S614.

In S614, it is determined whether a trouble occurs in which the excessive current flows in the motor 24c. More exactly, when the drive current I of the motor 24c is equal to or greater than a predetermined current Ia, a trouble is determined to occur. The predetermined current Ia is set as a criterion (e.g., 30A) for determining that, when the drive current I is at or below this value, a trouble occurs in the motor 24c.

When the result in S614 is negative, i.e., when no trouble occurs in the trim unit control, the program proceeds to S616, in which the trim unit 24 is operated to start and conduct the trim-up operation.

In a program loop after the trim-up operation is started, when the result in S612 or S614 is affirmative, the program proceeds to S608, in which the trim unit control (to trim up in this loop) is stopped. Thus, it is determined whether a trouble occurs in the control of the trim unit 24. More specifically, in the trim unit control, when the trim angle θ remains the same continuously for the prescribed time period or when the drive current I of the motor 24c is equal to or greater than the predetermined current Ia, the trouble is determined to occur, and in response to this determination, the trim unit control is stopped.

When the result in S604 is negative, i.e., when, in S146 and S148, the pitching of the hull 12 occurs and the learning trim angle θa is defined, the program proceeds to S618, in which it is determined whether the trim angle θ exceeds the learning trim angle θa.

The process of S618 and S620 is conducted similarly to S212 and S214 of the FIG. 7 flowchart.

Figure 15:
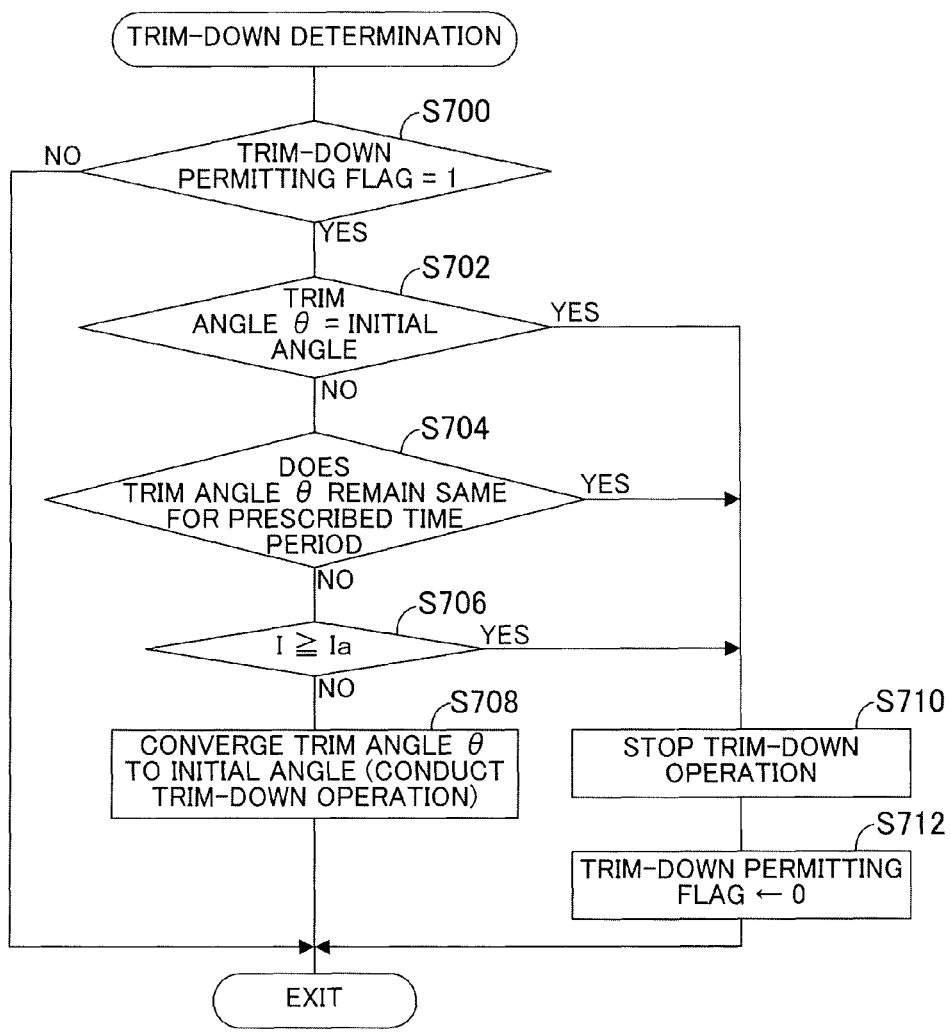
FIG. 15 is a subroutine flowchart similar to FIG. 8, but showing an alternative example of the operation of trim-down determination of the FIG. 5 flowchart.

FIG. 15 is a subroutine flowchart showing an alternative example of the operation of trim-down determination of the FIG. 5 flowchart.

The process of S700 and S702 is conducted similarly to S300 and S302 of the FIG. 8 flowchart.

When the result in S702 is negative, the program proceeds to S704 onward, in which, similarly to the foregoing process of S612 and the following steps, it is determined whether a trouble occurs in the control of the trim unit 24.

To be specific, in S704, it is determined whether, despite that the operation of the trim unit 24 is controlled (to trim down in this loop), the trim angle θ remains the same continuously for a prescribed time period (e.g., 1 second). When the process of S704 is first conducted, since it is before the trim-down operation is started, the result is negative and the program proceeds to S706.

In S706, similarly to S614, it is determined whether the drive current I of the motor 24c is equal to or greater than the predetermined current Ia, and when the result is affirmative, it is determined that a trouble occurs, i.e., the excessive current flows in the motor 24c. When the result in S706 is negative, i.e., when no trouble occurs in the trim unit control, the program proceeds to S708, in which the trim unit 24 operation is controlled to start the trim-down operation so that the trim angle θ is converged to the initial angle.

In a program loop after the trim-down operation is started, when the result in S704 or S706 is affirmative, the program proceeds to S710, in which the trim unit control (to trim down in this loop) is stopped and to S712, the bit of the trim-down permitting flag is reset to 0, whereafter the program is terminated. Thus, during the trim-down operation, similarly to during the trim-up operation, it is determined whether a trouble occurs in the control of the trim unit 24, and when the trouble is determined to occur, the trim unit control is stopped.

When no trouble occurs and the trim angle θ becomes the initial angle, the result in S702 is affirmative and the aforementioned process in S710 and S712 is conducted.

Figure 16:
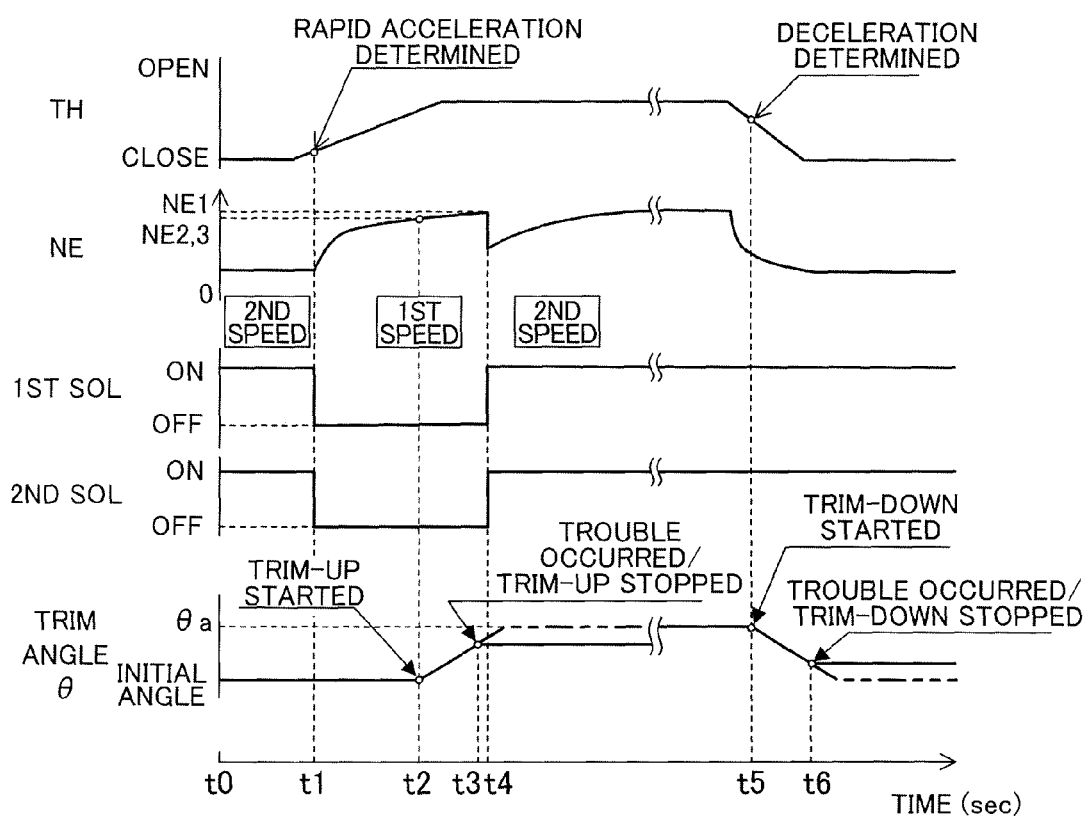
FIG. 16 is a time chart for explaining the operation of the flowcharts in FIGS. 5, 14, 15, etc.

FIG. 16 is a time chart for explaining the above operation in the case that a trouble occurs.

The explanation on the time t0 to t1 is omitted here, as it is the same as in the first embodiment.

After the gear position is changed from the second speed to the first speed at the time t1, when the acceleration is still continued so that the engine speed NE is gradually increased and reaches the third predetermined speed NE3 or more at the time t2, the trim unit 24 operation is controlled to start the trim-up operation of the outboard motor 10 (S610, S616). During the trim-up operation, when, at the time t3, the drive current I of the motor 24c is equal to or greater than the predetermined current Ia for instance, it is determined that a trouble occurs in the trim unit control and the control (i.e., the trim-up operation) is stopped (S614, S608). When no trouble occurs, as shown by an imaginary line in FIG. 9, the trim-up operation is continued until the trim angle θ reaches the learning trim angle θa.

When the engine speed NE is further increased and becomes equal to or greater than the first predetermined speed NE1 (S116) and the change amount DNE is determined to be less than the first prescribed value DNE1 (S132, time t4), the gear position is changed from the first speed to the second speed regardless of whether a trouble occurs (S134).

Next, the explanation on the case of the trim-down operation is made. At the time t5, when the lever 122 is manipulated by the operator and the change amount DTH is less than the predetermined value DTHa (S106, S170), the operation of the trim unit 24 is controlled to start the trim-down operation of the outboard motor 10 (S700, S708).

During the trim-down operation, when, at the time t6, the drive current I of the motor 24c is equal to or greater than the predetermined current Ia for instance, it is determined that a trouble occurs in the trim unit control and the control (i.e., the trim-down operation) is stopped (S706, S710). When no trouble occurs, as shown by an imaginary line, the trim-down operation is continued until the trim angle θ is returned to the initial angle.

As mentioned in the foregoing, the outboard motor control apparatus according to the third embodiment is configured such that it is determined whether a trouble occurs in control of the trim angle regulation mechanism 24 (S12, S612, S614, S14, S704, S706) and the control of the trim angle regulation mechanism 24 is stopped (i.e., is not continued) when it is determined that the trouble occurs (S608, S710). With this, it becomes possible to avoid a trouble such as a locked condition of the motor 24c, thereby preventing a failure of the trim angle regulation mechanism 24.

In the apparatus, the trim angle regulation mechanism 24 includes the motor 24c for regulating the trim angle and in control of the mechanism 24, when the trim angle θ remains the same continuously for the prescribed time period or when the drive current I of the motor 24c is equal to or greater than the predetermined current Ia, the trouble occurrence is determined (S608, S612, S614, S704, S706, S710). With this, it becomes possible to accurately determine whether a trouble occurs.

The remaining configuration as well as the effects is the same as that in the above embodiments.

An outboard motor control apparatus according to a fourth embodiment of the invention will be explained.

Figure 17:
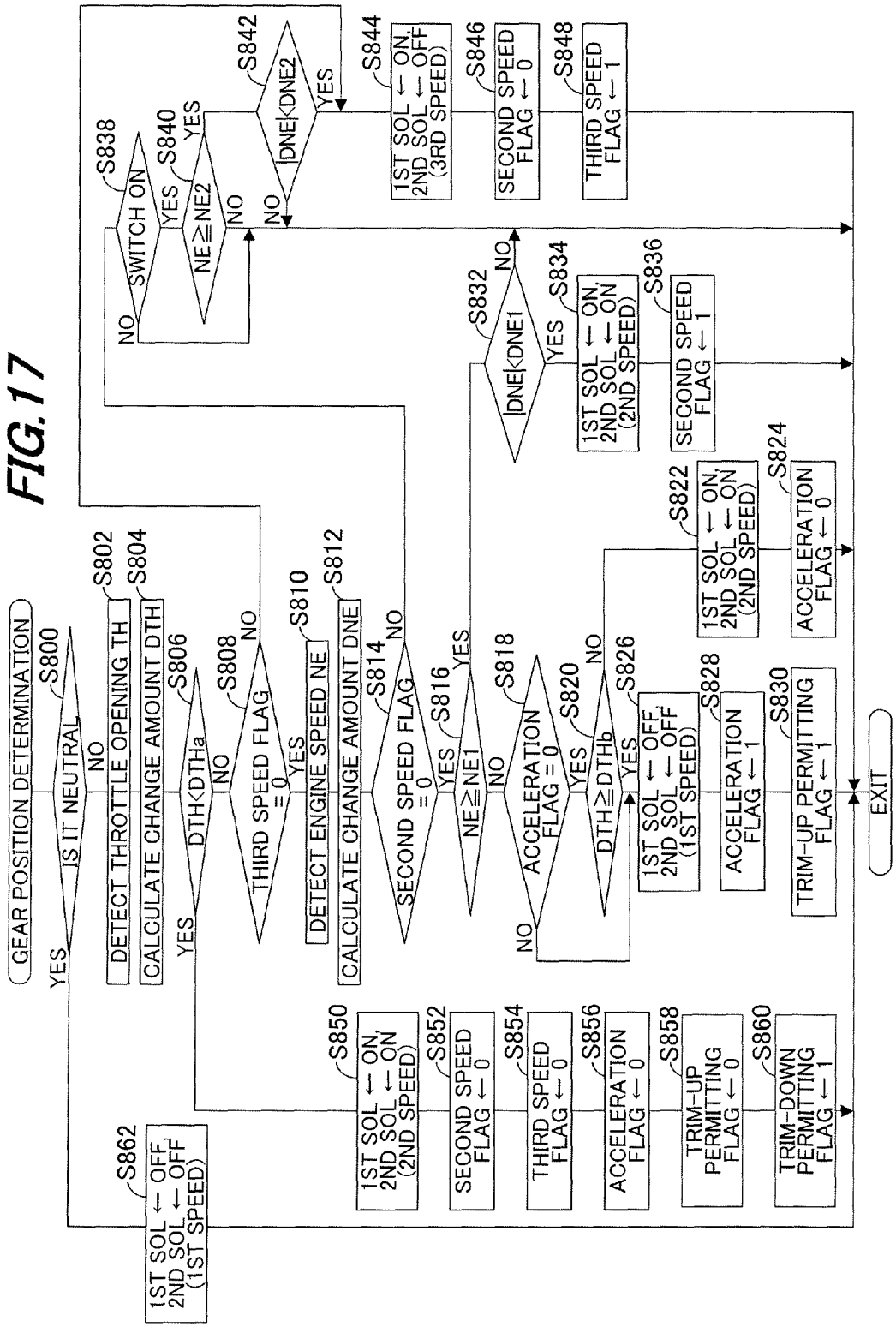
FIG. 17 is a subroutine flowchart similar to FIG. 6, but showing an alternative example of the operation of gear position determination of the FIG. 5 flowchart by an electronic control unit of an outboard motor control apparatus according to a fourth embodiment of the invention.

FIG. 17 is a subroutine flowchart similar to FIG. 6, but showing an alternative example of the operation of gear position determination of the FIG. 5 flowchart.

The process of S800 to S838 is conducted similarly to S100 to S138 of the FIG. 6 flowchart. When the result in S838 is negative, the remaining steps are skipped and when the result is affirmative, the program proceeds to S840, in which it is determined whether the engine speed NE is equal to or greater than the second predetermined speed NE2.

When the result in S840 is affirmative, the program proceeds to S842, in which the process is conducted similarly to S152 of the FIG. 6 flowchart.

When the result in S842 or S840 is negative, the remaining steps are skipped and when the result in S842 is affirmative, the program proceeds to S844, and up to S848, the process is conducted similarly to S154 to S158 of the FIG. 6 flowchart. Also, since the process of S850 to S862 is similar to that of S160 to S172 of the FIG. 6 flowchart, the explanation thereof is omitted.

Figure 18:
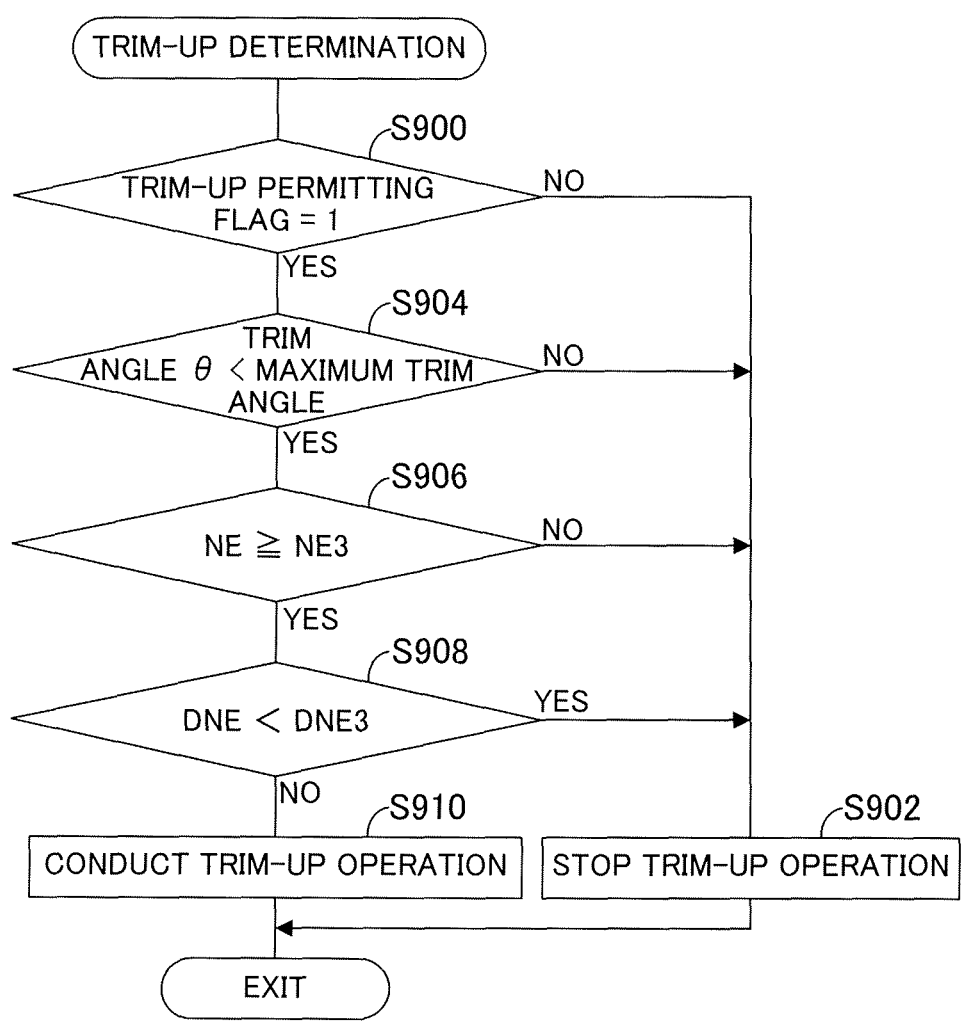
FIG. 18 is a subroutine flowchart similar to FIG. 7, but showing an alternative example of the operation of trim-up determination of the FIG. 5 flowchart.

FIG. 18 is a subroutine flowchart showing an alternative example of the operation of trim-up determination of the FIG. 5 flowchart.

In S900, it is determined whether the bit of the trim-up permitting flag is 1. When the result in S900 is negative, since it means that the trim-up operation is not needed, the program proceeds to S902, in which the trim-up operation is stopped, more precisely, not conducted. When the result in S900 is affirmative, i.e., when the change amount DTH is equal to or greater than the predetermined value DTHb and the transmission 46 is changed to the first speed, the program proceeds to S904, in which it is determined whether the trim angle θ is less than the maximum trim angle (the maximum value in the possible trim angle range which can be reached through the trim-up operation by the trim unit 24, e.g., 10 degrees).

When the result in S904 is negative, since it is impossible to further trim up the outboard motor 10, the program proceeds to S902, in which the trim-up operation is stopped or not conducted. On the other hand, when the result in S904 is affirmative, the program proceeds to S906, in which it is determined based on the engine speed NE whether it is immediately before the acceleration in the first speed is completed and the transmission 46 is changed back from the first speed to the second speed. Specifically, it is determined whether the engine speed NE is equal to or greater than the third predetermined value NE3

When the result in S906 is negative, since it is not the time to start the trim-up operation, the program proceeds to S902 and the program is terminated without conducting the trim-up operation. On the other hand, when the result in S906 is affirmative, the program proceeds to S908, in which whether the engine speed NE is saturated in a high speed range, i.e., whether the engine 30 is stable in the high speed operating condition and the boat speed has reached the maximum speed or thereabout. In S908, similarly to S508 in the FIG. 12 flowchart, when the change amount DNE is less than the third prescribed value DNE3 (i.e., is a negative value), it is determined or estimated that the engine speed NE is saturated in the high speed range and the boat speed is at or about the maximum speed.

When the process of S908 is first conducted, since it is immediately after the engine speed NE is determined to be equal to or greater than the third predetermined speed NE3 in S906, the engine speed NE is not saturated in the high speed range. Therefore, the result in S908 is generally negative and the program proceeds to S910, in which the trim unit 24 is operated to start and conduct the trim-up operation. Specifically, when the engine speed NE is equal to or greater than the third predetermined speed NE3, the trim-up operation is started. Thus, the trim-up operation is started before the acceleration is completed and the transmission 46 is changed back from the first speed to the second speed, thereby increasing the boat speed.

In the next program loop, when the result in S908 is affirmative, the program proceeds to S902, in which the trim-up operation is stopped. Thus, based on the change amount DNE, i.e., when the change amount DNE is less than the third prescribed value DNE3 (more exactly, when it is estimated that the boat speed has reached the maximum speed or thereabout), the trim-up operation is stopped.

The explanation on the operation of trim-down determination in S14 is omitted, as it is the same as in the first embodiment.

Figure 19:
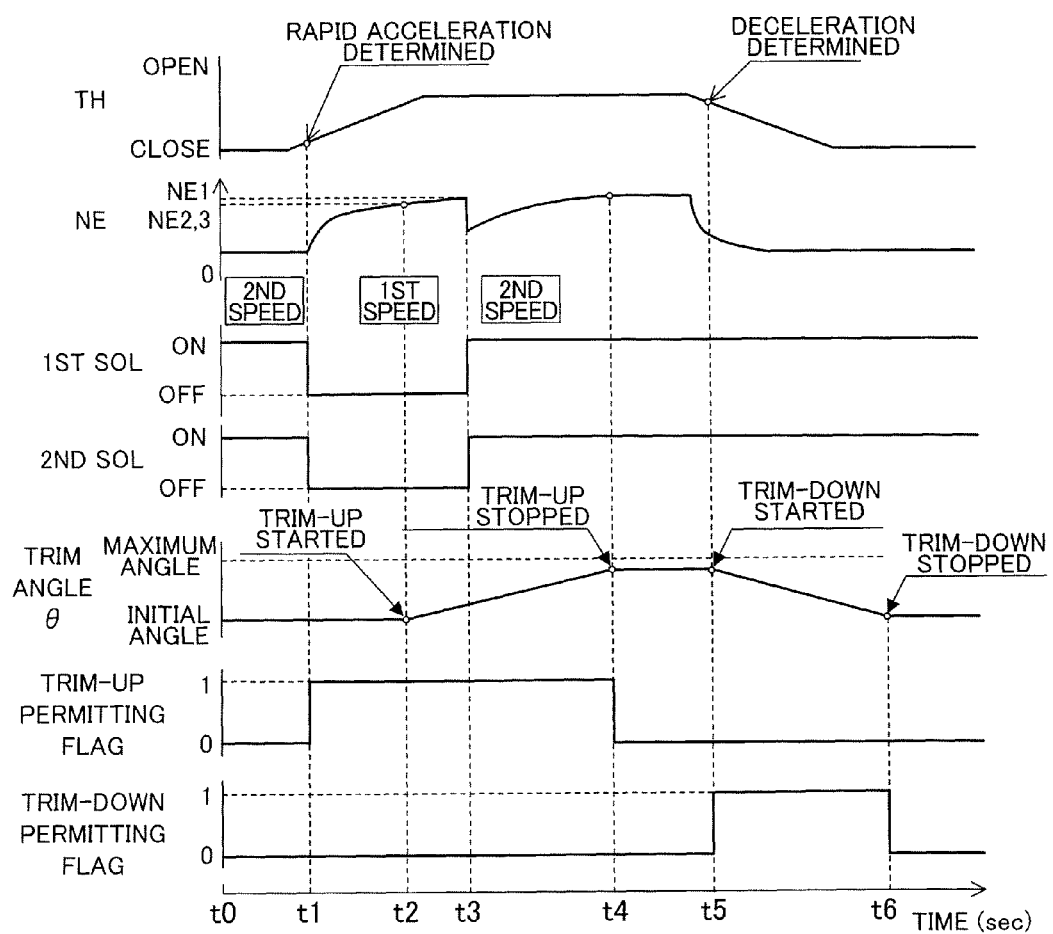
FIG. 19 is a time chart for explaining the operation of the flowcharts in FIGS. 5, 17, 18, etc.

FIG. 19 is a time chart similar to FIG. 9, but for explaining the operation of the above flowcharts.

The explanation on the time t0 to t3 is omitted here, as it is the same as in the first embodiment.

After the trim-up operation is started at the time t2, when, at the time t4, the change amount DNE is less than the third prescribed value DNE3, the trim-up operation is stopped (S908, S902).

The explanation on the time t5 onward is omitted here, as it is the same as that on the time t7 onward in the first embodiment.

As mentioned in the foregoing, the outboard motor control apparatus according to the fourth embodiment is configured such that, the trim-up operation is stopped based on the change amount DNE of the engine speed (S12, S902, S908). Specifically, when, for example, the change amount DNE represents the condition where the acceleration was completed and the boat speed has reached the maximum speed, the trim-up operation can be stopped in response thereto, thereby appropriately setting the trim angle θ after the trim-up operation.

In the apparatus, the trim-up operation is stopped when the change amount DNE is less than the prescribed value (third prescribed value DNE3) (S12, S902, S908). With this, in addition to the above effects, since the prescribed value DNE3 is set as a criterion for determining that the acceleration was completed and the boat speed has reached the maximum speed for instance, the trim-up operation can be stopped at the right time, thereby appropriately setting the trim angle θ after the trim-up operation.

The remaining configuration as well as the effects is the same as that in the above embodiments.

An outboard motor control apparatus according to a fifth embodiment of the invention will be explained.

In the fifth embodiment, the operation of gear position determination of the FIG. 5 flowchart is conducted the same as in the fourth embodiment, as shown in FIG. 17.

Figure 20:
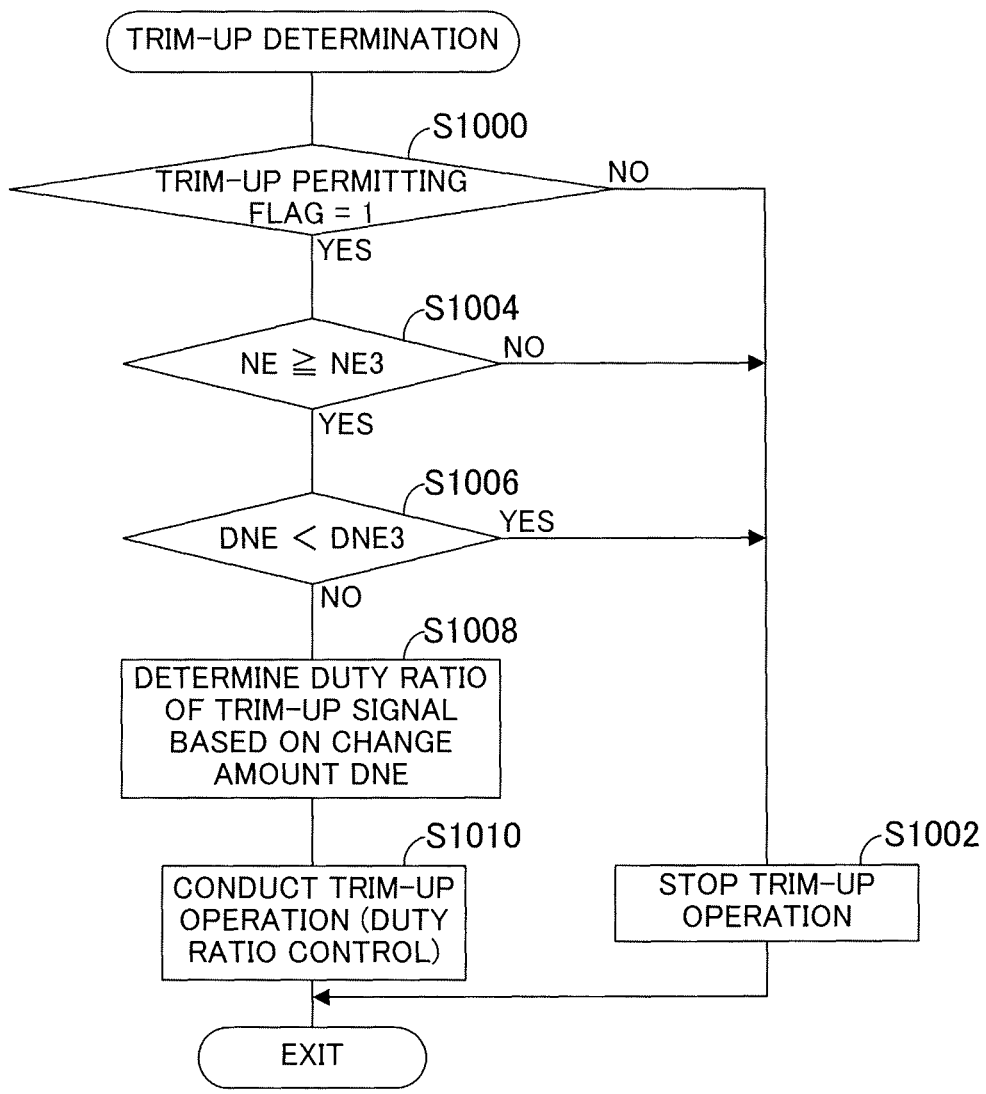
FIG. 20 is a subroutine flowchart similar to FIG. 18, but showing an alternative example of the operation of trim-up determination of the FIG. 5 flowchart by an electronic control unit of an outboard motor control apparatus according to a fifth embodiment of the invention.

FIG. 20 is a subroutine flowchart showing an alternative example of the operation of trim-up determination of the FIG. 5 flowchart.

In S1000, it is determined whether the bit of the trim-up permitting flag is 1. When the result in S1000 is negative, since it means that the trim-up operation is not needed, the program proceeds to S1002, in which the trim-up operation is stopped, more precisely, not conducted. When the result in S1000 is affirmative, the program proceeds to S1004.

The process of S1004 and S1006 is conducted similarly to S906 and S908 of the FIG. 18 flowchart.

When the process of S1006 is first conducted, the result is generally negative and the program proceeds to S1008, in which a duty ratio of a trim-up signal is determined based on the change amount DNE of the engine speed NE. A change amount of the trim angle θ per unit time during the trim-up operation is substantially proportional to the duty ratio of the trim-up signal and accordingly, the determination in S1008 amounts to determining the change amount of the trim angle θ.

Figure 21:
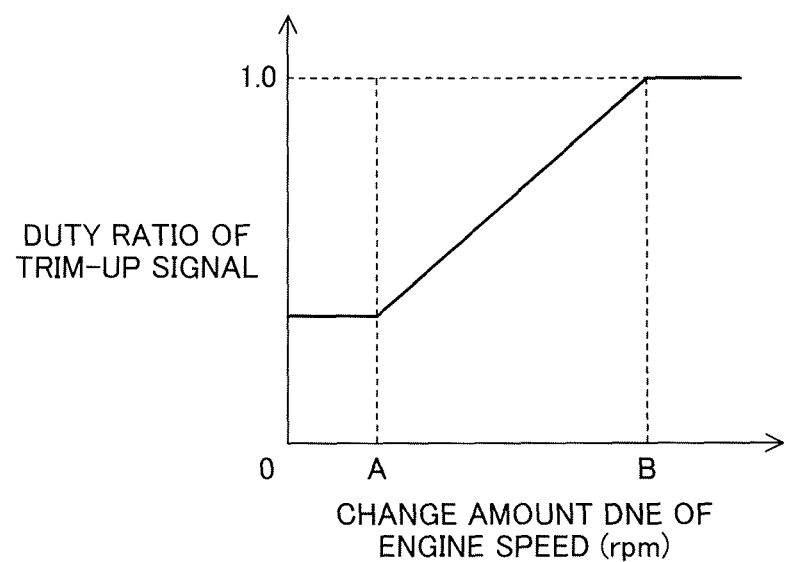
FIG. 21 is a graph showing table characteristics of a duty ratio of a trim-up signal relative to a change amount of engine speed, which is used in the operation of the FIG. 20 flowchart.

The process in S1008 is conducted by retrieving table values whose characteristics shown in FIG. 21 using the change amount DNE. FIG. 21 is a graph showing the table characteristics of the duty ratio of the trim-up signal relative to the change amount DNE.

As illustrated, the duty ratio is set to be substantially proportional to the change amount DNE. To be specific, the duty ratio stays constant at a relatively low value when the change amount DNE is within a range of 0 to a predetermined value A, and when the change amount DNE exceeds the value A, the duty ratio increases (decreases) with increasing (decreasing) change amount DNE. When the change amount DNE exceeds a predetermined value B greater than the value A, the duty ratio stays constant at a relatively high value.

After S1008, the program proceeds to S1010, in which the trim unit 24 is operated in accordance with the determined duty ratio of the trim-up signal to start and conduct the trim-up operation. Thus, when the engine speed NE is equal to or greater than the third predetermined speed NE3 and before the acceleration is completed and the transmission 46 is changed back from the first speed to the second speed, the trim-up operation can be started, thereby increasing the boat speed.

Explaining the change amount of the trim angle θ during the trim-up operation, when the change amount DNE is relatively large, i.e., when it is estimated that the boat speed is not close to the maximum speed yet, since the duty ratio is determined to be a relatively high value (e.g., 1.0 (100%)), a time period that the motor 24c is in the ON state becomes longer accordingly. As a result, the change amount of the trim angle θ is to be relatively large (i.e., trim-up speed is relatively high).

After that, as the change amount DNE is decreased and the boat speed approaches the maximum speed, since the duty ratio is gradually decreased, a time period that the motor 24c is in the ON state becomes shorter and consequently the change amount of trim angle θ is also gradually decreased. Thus, after the trim-up operation is started, the change amount of the trim angle θ per unit time is changed in accordance with the change amount DNE, thereby preventing the pitching from occurring at or about the maximum speed.

In the next program loop, when the result in S1006 is affirmative, the program proceeds to S1002, in which the trim-up operation is stopped. Thus, based on the change amount DNE, i.e., when the change amount DNE is less than the third prescribed value DNE3 (more exactly, when it is estimated that the boat speed has reached the maximum speed or thereabout), the trim-up operation is stopped.

The explanation on the operation of trim-down determination in S14 is omitted, as it is the same as in the first embodiment.

Figure 22:
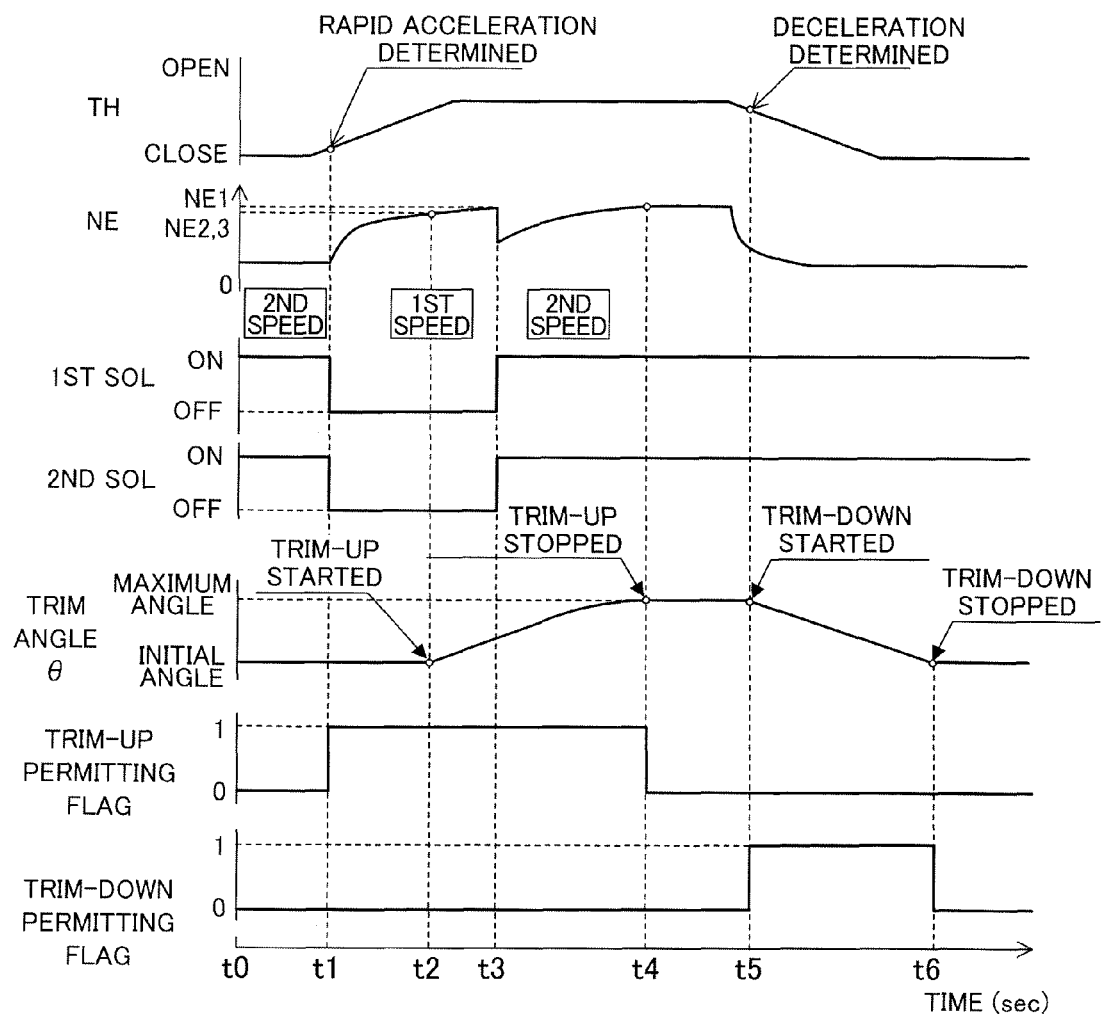
FIG. 22 is a time chart for explaining the operation of the flowcharts in FIGS. 5, 20, etc.

FIG. 22 is a time chart similar to FIG. 9, but for explaining the operation of the above flowcharts.

The explanation on the time t0 to t3 is omitted here, as it is the same as in the first embodiment.

After the trim-up operation is started at the time t2, when, at the time t4, the change amount DNE is less than the third prescribed value DNE3, the trim-up operation is stopped (S1006, S1002). Further, during the trim-up operation from the time t2 to t4, the change amount of the trim angle θ is changed in accordance with the change amount DNE, precisely, is decreased with decreasing change amount DNE (S1008, S1010).

The explanation on the time t5 onward is omitted here, as it is the same as that on the time t7 onward in the first embodiment.

As mentioned in the foregoing, the outboard motor control apparatus according to the fifth embodiment is configured such that, the change amount of the trim angle θ per unit time is changed in accordance with the change amount DNE of the engine speed NE after the trim-up operation is started (S12, S1008, S1010). With this, since the operating condition of the boat 1 can be determined based on the change amount DNE, it becomes possible to conduct the trim-up operation with the appropriate change amount of the trim angle θ per unit time in accordance with the operating condition, thereby preventing the pitching occurrence caused by the trim-up operation.

In the apparatus, the change amount of the trim angle θ is decreased as the change amount DNE is decreased (i.e., as the boat speed approaches the maximum speed) (S12, S1008, S1010). With this, in addition to the above effects, it becomes possible to conduct the trim-up operation with the appropriate change amount of the trim angle θ in accordance with the operating condition of the boat 1, thereby reliably preventing the pitching occurrence.

The remaining configuration as well as the effects is the same as that in the above embodiments.

An outboard motor control apparatus according to a sixth embodiment of the invention will be explained.

In the sixth embodiment, the change amount of the trim angle θ per unit time is changed in accordance with the engine speed NE, in place of the change amount DNE.

Figure 23:
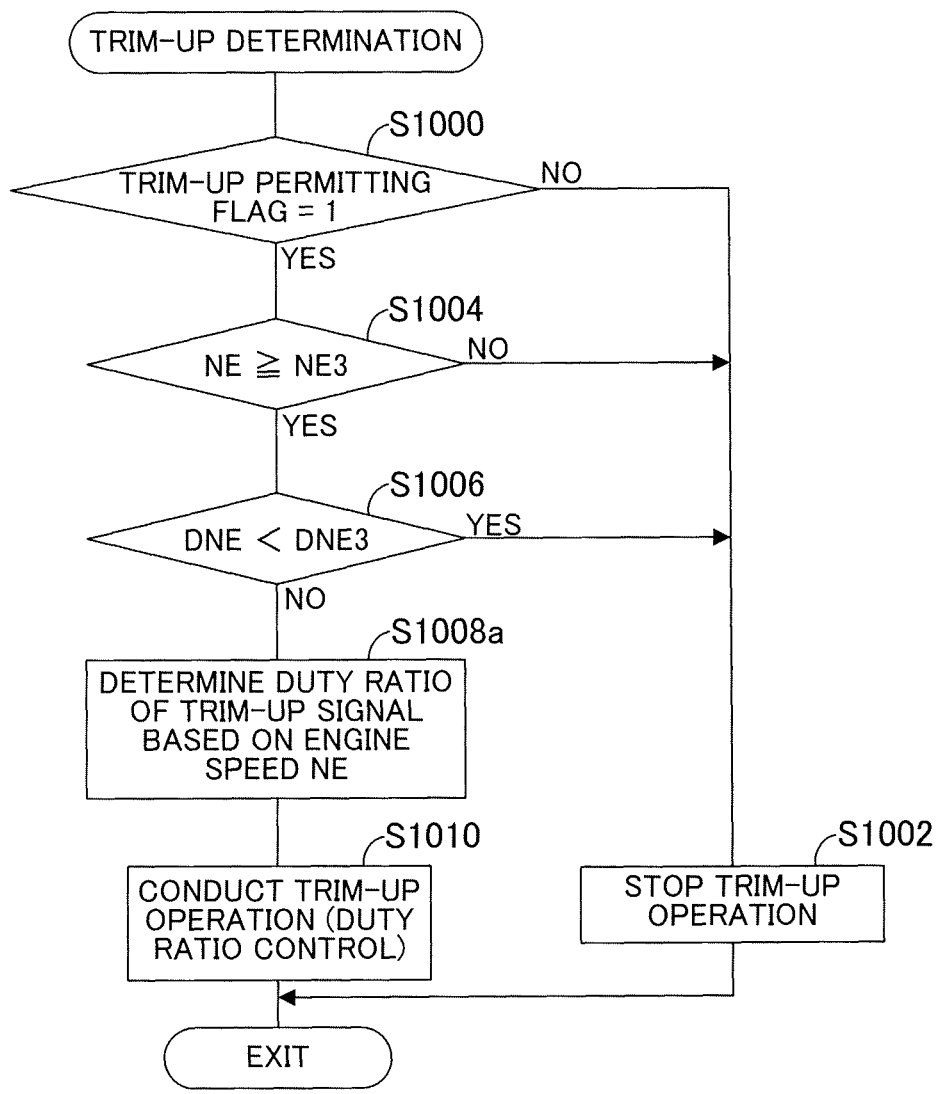
FIG. 23 is a subroutine flowchart similar to FIG. 20, but showing an alternative example of the operation of trim-up determination of the FIG. 5 flowchart by an electronic control unit of an outboard motor control apparatus according to a sixth embodiment of the invention.

FIG. 23 is a subroutine flowchart showing an alternative example of the operation of trim-up determination of the FIG. 5 flowchart. Note that constituent elements corresponding to those of FIG. 20 are assigned by the same reference symbols.

The process of steps up to S1006 is conducted as described in the fifth embodiment. When the result in S1006 is negative, the program proceeds to S1008a, in which a duty ratio of a trim-up signal is determined based on the engine speed NE.

Figure 24:
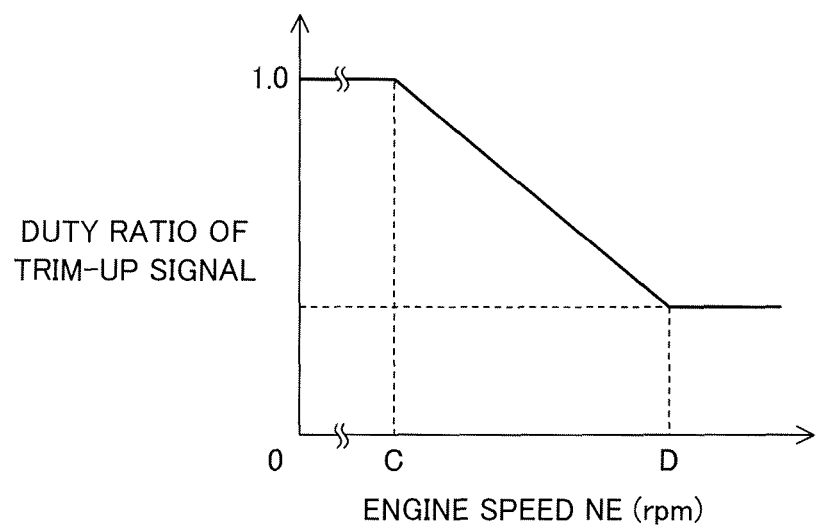
FIG. 24 is a graph showing table characteristics of a duty ratio of a trim-up signal relative to an engine speed, which is used in the operation of the FIG. 23 flowchart.

The process in S1008a is conducted by retrieving table values whose characteristics shown in FIG. 24 using the engine speed NE. FIG. 24 is a graph showing the table characteristics of the duty ratio of the trim-up signal relative to the engine speed NE.

As illustrated, the duty ratio is set to be substantially inversely proportional to the engine speed NE. To be specific, the duty ratio stays constant at a relatively high value when the engine speed NE is within a range of 0 to a predetermined value C set identical with, say, the third predetermined speed NE3, and when the engine speed NE exceeds the value C, the duty ratio decreases with increasing engine speed NE. When the engine speed NE exceeds a predetermined value D greater than the value C and set identical with, say, the first predetermined speed NE1, the duty ratio stays constant at a relatively low value.

Then the program proceeds to S1010, in which the trim unit 24 is operated in accordance with the duty ratio of the trim-up signal determined in S1008a to conduct the trim-up operation.

Specifically, when the engine speed NE is at or about the third predetermined speed NE3 for instance and it is estimated that the boat speed is not close to the maximum speed yet, since the duty ratio is determined to be a relatively high value (e.g., 1.0 (100%)), a time period that the motor 24c is in the ON state becomes longer accordingly. As a result, the change amount of the trim angle θ is to be relatively large.

After that, as the engine speed NE is increased and the boat speed approaches the maximum speed, since the duty ratio is gradually decreased, a time period that the motor 24c is in the ON state becomes shorter and consequently the change amount of trim angle θ is also gradually decreased.

As mentioned in the foregoing, the outboard motor control apparatus according to the sixth embodiment is configured such that, the change amount of the trim angle θ per unit time is changed in accordance with the engine speed NE after the trim-up operation is started (S12, S1008a, S1010). With this, since the operating condition of the boat 1 can be determined based on the engine speed NE, it becomes possible to conduct the trim-up operation with the appropriate change amount of the trim angle θ per unit time in accordance with the operating condition, thereby preventing the pitching occurrence caused by the trim-up operation.

In the apparatus, the change amount of the trim angle θ is decreased as the engine speed NE is increased (i.e., as the boat speed approaches the maximum speed) (S12, S1008a, S1010). With this, in addition to the above effects, it becomes possible to conduct the trim-up operation with the appropriate change amount of the trim angle θ in accordance with the operating condition of the boat 1, thereby reliably preventing the pitching occurrence.

The remaining configuration as well as the effects is the same as that in the above embodiments.

An outboard motor control apparatus according to a seventh embodiment of the invention will be explained.

Figure 25:
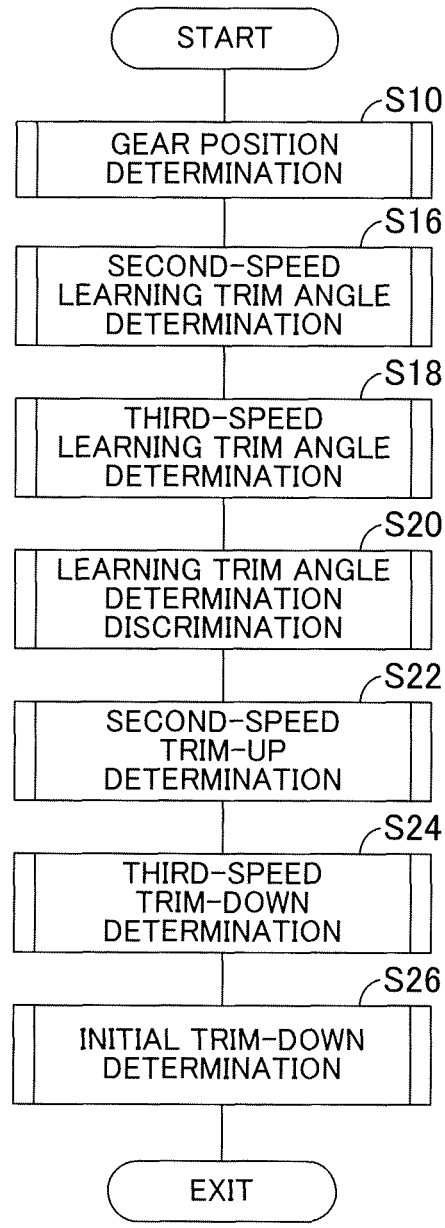
FIG. 25 is a flowchart similar to FIG. 5, but showing transmission control operation and trim angle control operation by an electronic control unit of an outboard motor control apparatus according to a seventh embodiment of the invention.

FIG. 25 is a flowchart similar to FIG. 5, but showing transmission control operation and trim angle control operation by the ECU 110.

The program begins at S10, in which the operation of gear position determination is conducted.

Figure 26:
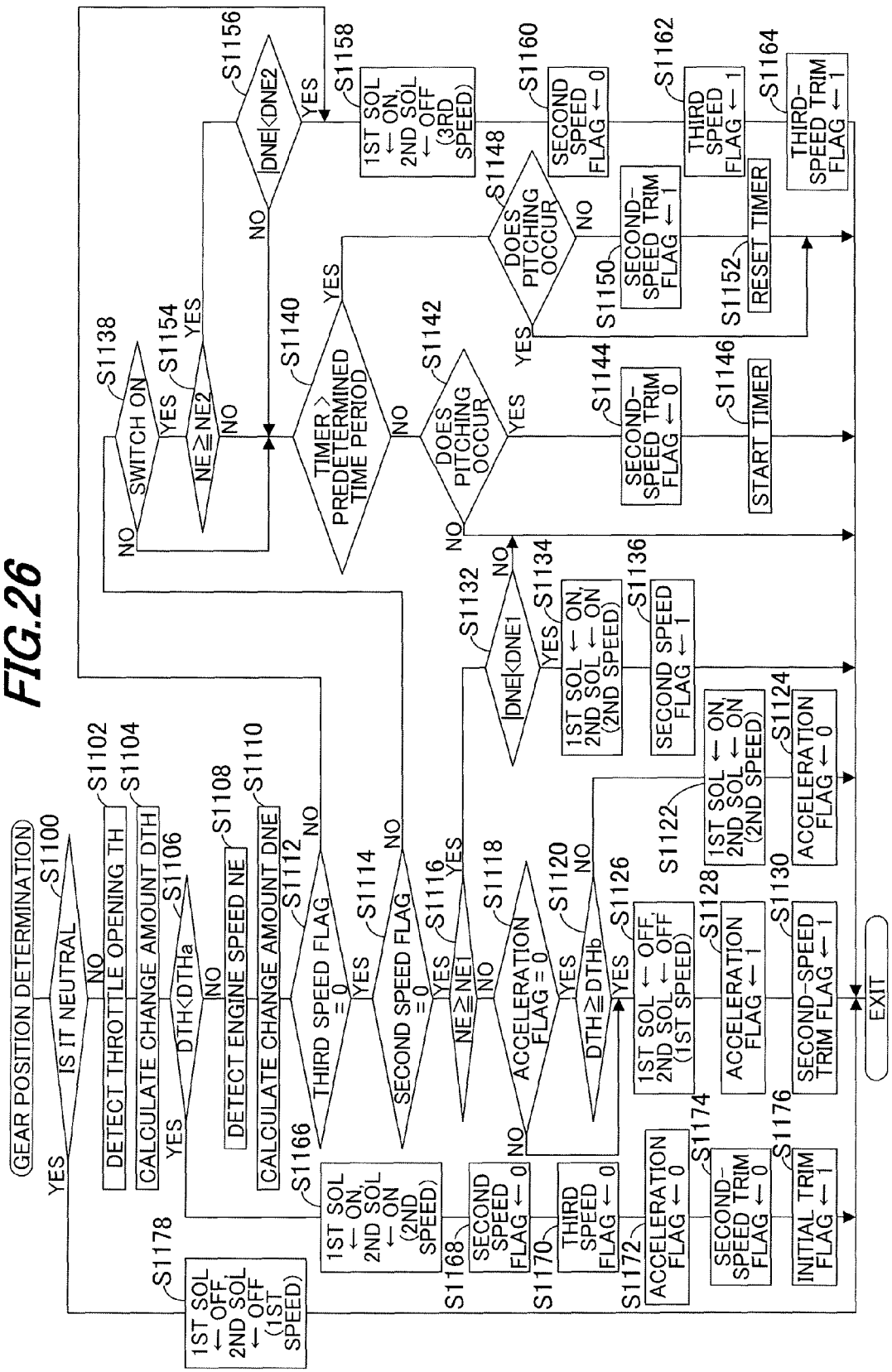
FIG. 26 is a subroutine flowchart similar to FIG. 6, but showing the operation of gear position determination of the FIG. 25 flowchart.

FIG. 26 is a subroutine flowchart showing the operation of the FIG. 25 flowchart.

The process of S1100 to S1106 is conducted similarly to S100 to S106 of the FIG. 6 flowchart.

When the result in S1106 is negative, the program proceeds to S1108, in which the engine speed NE is detected or calculated and to S1110, in which the change amount (variation) DNE of the engine speed NE is detected or calculated.

Then the program proceeds to S1112, in which, similarly to S108 of FIG. 6, it is determined whether the bit of the third speed flag is 0. The result in S1112 in the first program loop is generally affirmative and the program proceeds to S1114.

The process of S1114 to S1128 is conducted similarly to S114 to S128 of the FIG. 6 flowchart.

Then the program proceeds to S1130, in which the bit of a second-speed trim flag (initial value 0) is set to 1 and the program is terminated. Specifically, the bit of this flag being set to 1 means that the change amount DTH is equal to or greater than the predetermined value DTHb, the transmission 46 is changed to the first speed, and the trim-up operation is to be conducted in the operation of second-speed trim-up determination (explained later), while being reset to 0 means that the trim-up operation is not needed, i.e., for example, the deceleration is instructed to the engine 30.

The process of S1132 to S1138 is conducted similarly to S132 to S138 of the FIG. 6 flowchart.

When the result in S1138 is negative, the program proceeds to S1140, in which a value of the trim-up restart timer (described later) exceeds a value indicating a predetermined time period. Since the initial value of the timer is 0, the result is naturally negative and the program proceeds to S1142, in which it is determined whether the pitching of the hull 12 occurs.

When the result in S1142 is negative, the remaining steps are skipped and when the result is affirmative, the program proceeds to S1144, in which the bit of the second-speed trim flag is reset to 0. Consequently, the trim-up operation is stopped through the operation of second-speed trim-up determination which will be explained later. Then, in S1146, the trim-up restart timer (up counter) is started to measure a time period since the trim-up operation is stopped.

In the next and ensuing program loops, when the result in S1140 is affirmative, i.e., when the predetermined time period has elapsed since the trim-up operation stop, the program proceeds to S1148, in which, similarly to S1142, the pitching determination is again made. When the result in S1148 is negative, the program proceeds to S1150, in which the bit of the second-speed trim flag is set to 1 and to S1152, in which the timer value is reset to 0.

Consequently, the trim-up operation is restarted through the operation of second-speed trim-up determination which will be explained later. The predetermined time period is set, similarly to the second embodiment, as a criterion (e.g., 5 seconds) for determining whether the trim-up operation can be restarted (because there should be no pitching anymore). When the result in S1148 is affirmative, S1150 and S1152 are skipped.

When the result in S1138 is affirmative, the program proceeds to S1154, and up to S1162, the process is conducted similarly to S150 to S158 of the FIG. 6 flowchart.

The program proceeds to S1164, in which the bit of a third-speed trim flag (initial value 0) is set to 1. The bit of this flag being set to 1 means that the gear position is changed to the third speed and the trim-down operation is to be conducted in the operation of third-speed trim-down determination (explained later), while being reset to 0 means that the trim-down operation is not needed or completed. Note that, in a program loop after the bit of the third-speed flag is set to 1 in S1162, the result in S1112 is negative and the process of S1158 to S1164 is conducted, whereafter the program is terminated with the third speed being maintained.

When the result in S1106 is affirmative, the program proceeds to S1166, and up to S1172, the process is conducted similarly to S160 to S166 of the FIG. 6 flowchart.

Then the program proceeds to S1174, in which the bit of the second-speed trim flag is reset to 0 and to S1176, in which the bit of an initial trim flag (initial value 0) is set to 1. The bit of the initial trim flag being set to 1 means that it is necessary to regulate the trim angle θ to the initial angle (0 degree) by operating the trim unit 24, while being reset to 0 means that it is not necessary.

When the result in S1100 is affirmative, the program proceeds to S1178, in which the first and second solenoid valves 86*a*, 86*b* are both made OFF to change the transmission 46 from the second speed to the first speed.

Returning to the explanation on the FIG. 25 flowchart, the program proceeds to S16, in which a trim angle when the gear position is in the second speed and the boat speed reaches the maximum speed is learned or stored to determine a second-speed learning trim angle δ, and to S18, in which a trim angle when the gear position is in the third speed and the boat speed reaches the maximum speed is learned or stored to determine a third-speed learning trim angle ε.

Figure 27:
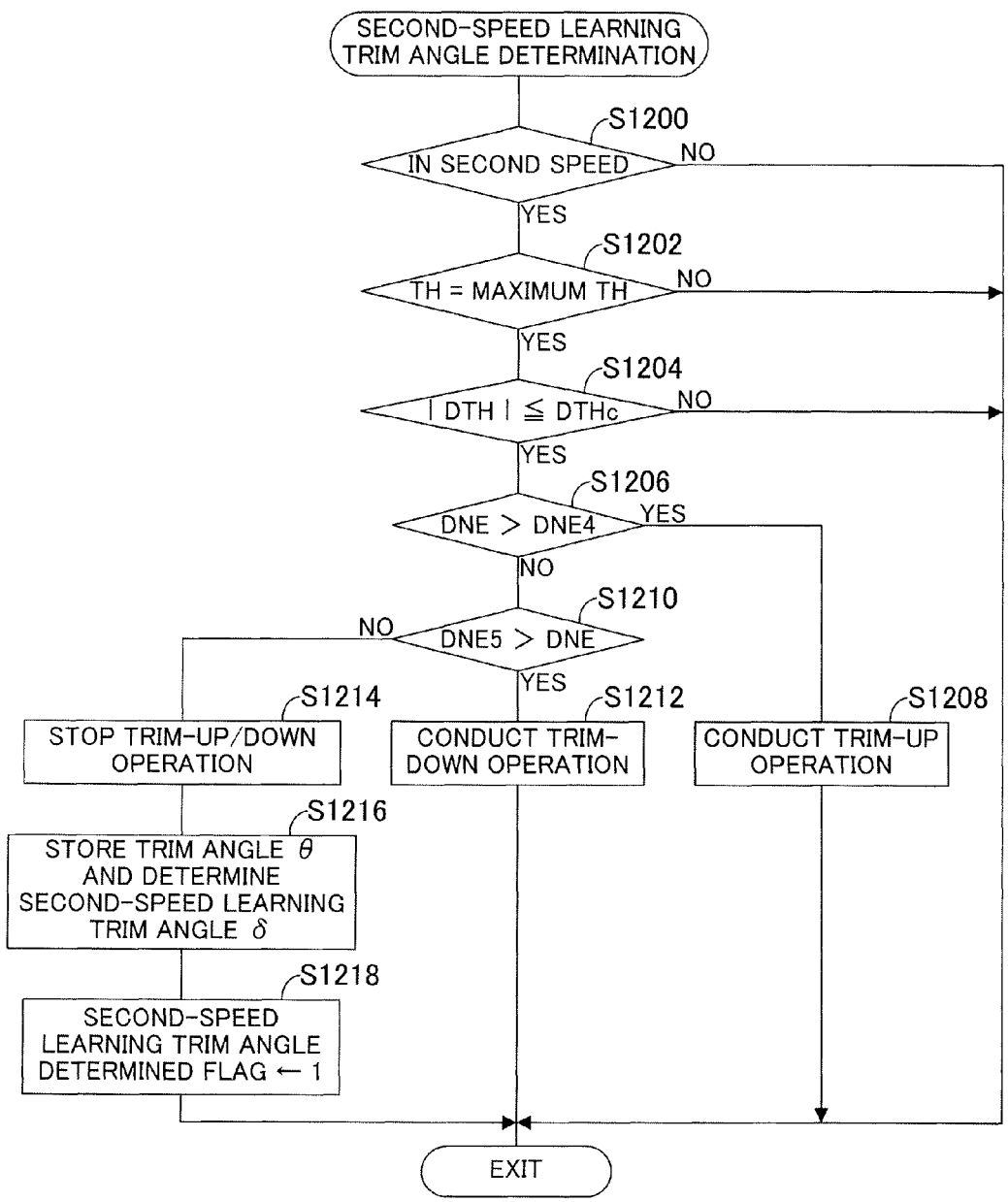
FIG. 27 is a subroutine flowchart showing the operation of second-speed learning trim angle determination of the FIG. 25 flowchart.
Figure 28:
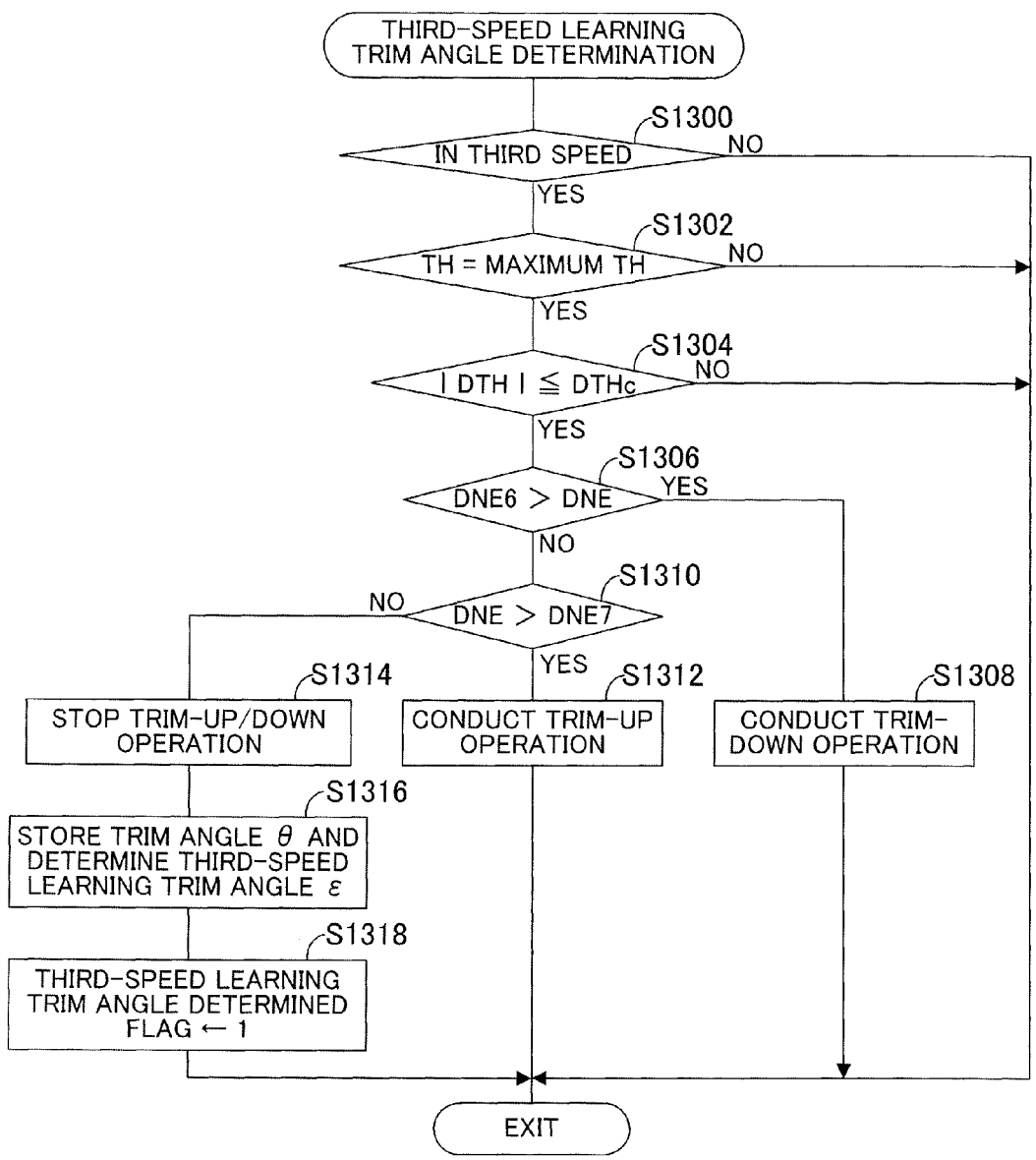
FIG. 28 is a subroutine flowchart showing the operation of third-speed learning trim angle determination of the FIG. 25 flowchart.

FIG. 27 is a subroutine flowchart showing the operation of second-speed learning trim angle determination and FIG. 28 is a subroutine flowchart showing the operation of third-speed learning trim angle determination.

As shown in FIG. 27, in S1200, it is determined whether the current gear position is in the second speed. When the result in S1200 is negative, the remaining steps are skipped and when the result is affirmative, the program proceeds to S1202, in which it is determined whether the throttle opening TH is the maximum opening.

When the result in S1202 is affirmative, the program proceeds to S1204, in which it is determined whether the throttle opening TH is stable (does not vary). This determination is made by comparing an absolute value of the change amount DTH of the throttle opening TH with a predetermined value DTHc used for determining the change amount. When the absolute value is equal to or less than the predetermined value DTHc, the throttle opening TH is determined to be stable. The predetermined value DTHc is set as a criterion (e.g., 2 degrees) for determining whether the throttle opening TH is stable, i.e., the change amount DTH is relatively small.

When the result in S1204 or S1202 is negative, the remaining steps are skipped. When the result in S1204 is affirmative, i.e., when the throttle opening TH is stable at the maximum opening so that the engine 30 is in the operating condition capable of making the boat speed reach the maximum speed, the program proceeds to S1206, in which it is determined whether the change amount DNE of the engine speed NE is greater than a fourth prescribed value DNE4 set to a positive value (e.g., 500 rpm).

When the process of S1206 is first conducted, since it is immediately after the engine 30 is determined to be in the aforementioned operating condition, the change amount DNE is large on the positive side. Therefore, the result is generally affirmative and the program proceeds to S1208, in which the trim unit 24 is operated to start and conduct the trim-up operation, thereby increasing the boat speed.

When the result in S1206 is negative, the program proceeds to S1210, in which it is determined whether the change amount DNE is less than a fifth prescribed value DNE5 set to a negative value (e.g., −500 rpm). When the result in S1210 is affirmative, it means that the trim angle θ has become excessive due to the trim-up operation in S1208 for example. Hence, the program proceeds to S1212, in which the trim angle θ is appropriately regulated through the trim-down operation.

When the result in S1210 is negative, i.e., when the change amount DNE is within a predetermined range between the fourth prescribed value DNE4 and the fifth prescribed value DNE5 (DNE5≤DNE≤DNE4), it is determined or estimated that the engine speed NE is saturated in the high speed range and the boat speed is at or about the maximum speed, and the program proceeds to S1214, in which the trim-up (or trim-down) operation is stopped. The predetermined range is set as a criterion for determining that the boat speed has reached the maximum speed.

The program proceeds to S1216, in which the present trim angle θ is detected based on the output of the trim angle sensor 104, i.e., the trim angle θ at the time when the trim-up operation is stopped (e.g., 10 degrees) is detected and stored, and the stored trim angle θ is determined as the second-speed learning trim angle δ (explained later).

Then the program proceeds to S1218, in which the bit of a second-speed learning trim angle determined flag (initial value 0) is set to 1, whereafter the program is terminated. The bit of this flag being set to 1 means that the second-speed learning trim angle δ is determined.

Next, the operation of third-speed learning trim angle determination in FIG. 28 is explained. In S1300, it is determined whether the current gear position is in the third speed. When the result in S1300 is negative, the remaining steps are skipped and when the result is affirmative, the program proceeds to S1302, in which it is determined whether the throttle opening TH is the maximum opening.

When the result in S1302 is affirmative, the program proceeds to S1304, in which it is determined whether an absolute value of the change amount DTH of the throttle opening TH is equal to or less than the predetermined value DTHc. Similarly to S1202 and S1204 described above, the process of S1302 and S1304 is conducted to determine whether the throttle opening TH is stable at the maximum opening and the engine 30 is in the operating condition capable of making the boat speed reach the maximum speed.

When the result in S1302 or S1304 is negative, the remaining steps are skipped. When the result in S1304 is affirmative, the program proceeds to S1306, in which it is determined whether the change amount DNE is less than a sixth prescribed value DNE6 set to a negative value (e.g., −500 rpm).

When the process of S1306 is first conducted, since it is immediately after the gear position is changed (shifted up) to the third speed and the affirmative result is made in S1300, the change amount DNE is large on the negative side. Therefore, the result in S1306 is generally affirmative and the program proceeds to S1308, in which the trim unit 24 is operated to start and conduct the trim-down operation. When it is immediately after the gear position is changed from the second speed to the third speed, if the trim angle θ established in the second speed is regulated to slightly decrease through the trim-down operation, it makes the boat speed increase.

When the result in S1306 is negative, the program proceeds to S1310, in which it is determined whether the change amount DNE is greater than a seventh prescribed value DNE7 set to a positive value (e.g., 500 rpm). When the result in S1310 is affirmative, it means that the trim angle θ has become too small due to the trim-down operation in S1308 for example. Hence, the program proceeds to S1312, in which the trim angle θ is appropriately regulated through the trim-up operation.

When the result in S1310 is negative, i.e., when the change amount DNE is within a second predetermined range between the sixth prescribed value DNE6 and the seventh prescribed value DNE7 (DNE6≤DNE≤DNE7), it is determined or estimated that the engine speed NE is saturated in the high speed range and the boat speed is at or about the maximum speed, and the program proceeds to S1314, in which the trim-down (or trim-up) operation is stopped. The second predetermined range is set as a criterion for determining that the boat speed has reached the maximum speed.

The program proceeds to S1316, in which the present trim angle θ, i.e., the trim angle θ at the time when the trim-down operation is stopped (e.g., 8 degrees) is detected and stored, and the stored trim angle θ is determined as the third-speed learning trim angle ε (explained later).

Then the program proceeds to S1318, in which the bit of a third-speed learning trim angle determined flag (initial value 0) is set to 1, whereafter the program is terminated. The bit of this flag being set to 1 means that the third-speed learning trim angle ε is determined.

The further explanation is made on the above process of S16 and S18. Depending on whether the gear position is in the second speed or third speed, the appropriate trim angle that enables the boat speed to reach the maximum speed is different. Concretely, the appropriate trim angle in the third speed is to be slightly smaller than that in the second speed. Therefore, in S16 and S18, the appropriate trim angles in the second and third speed are set by conducting the trim-up/down operation based on the change amount DNE, and the thus-obtained appropriate trim angles are stored as learning values. As described below, the learning values are utilized in the next and subsequent operation in the second and third speed.

Returning to the explanation on the FIG. 25 flowchart, the program proceeds to S20, in which it is discriminated whether the learning trim angles δ, ε are determined.

Figure 29:
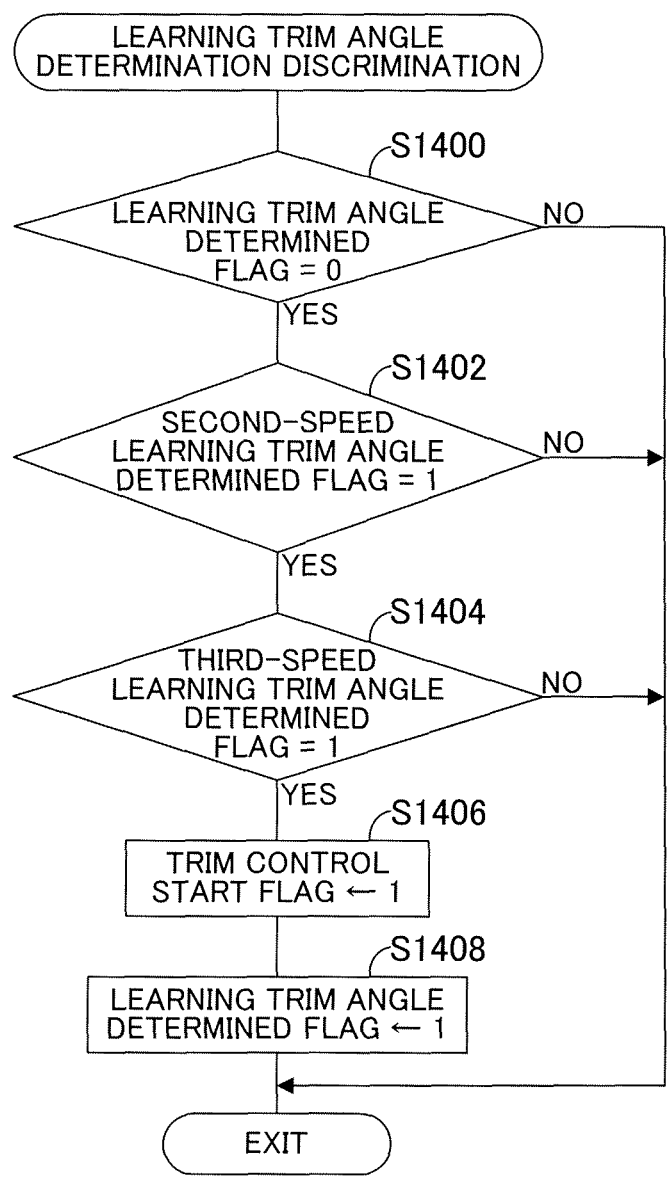
FIG. 29 is a subroutine flowchart showing the operation of learning trim angle determination discrimination of the FIG. 25 flowchart.

FIG. 29 is a subroutine flowchart showing the operation of learning trim angle determination discrimination of the FIG. 25 flowchart.

In S1400, it is determined whether the bit of a learning trim angle determined flag indicating that the learning trim angles δ, ε have been determined is 0. Since the initial value of this flag is 0, the result in S1400 in the first program loop is generally affirmative and the program proceeds to S1402.

In S1402, it is determined whether the bit of the second-speed learning trim angle determined flag is 1. When the result in S1402 is affirmative, the program proceeds to S1404, in which it is determined whether the bit of the third-speed learning trim angle determined flag is 1. When the result in S1404 or S1402 is negative, the remaining steps are skipped and when the result in S1404 is affirmative, the program proceeds to S1406, in which the bit of a trim control start flag (initial value 0) is set to 1. The bit of this flag being set to 1 means that the trim angle control using the learning trim angles δ, ε (explained later) can be started or is permitted, while being reset to 0 means that the control can not be started or is not permitted.

Then the program proceeds to S1408, in which the bit of the learning trim angle determined flag is set to 1 and the program is terminated. Upon setting of the bit of this flag to 1, the result in S1400 in the next and subsequent loops becomes negative and the steps of S1402 to S1408 are skipped. When the outboard motor 10 is powered off by the operator, the bits of the trim control start flag and learning trim angle determined flag are reset to 0.

Returning to the explanation on the FIG. 25 flowchart, the program proceeds to S22, in which it is determined whether the gear position is in the second speed and the trim-up operation should be conducted, and to S24, in which it is determined whether the gear position is in the third speed and the trim-down operation should be conducted.

Figure 30:
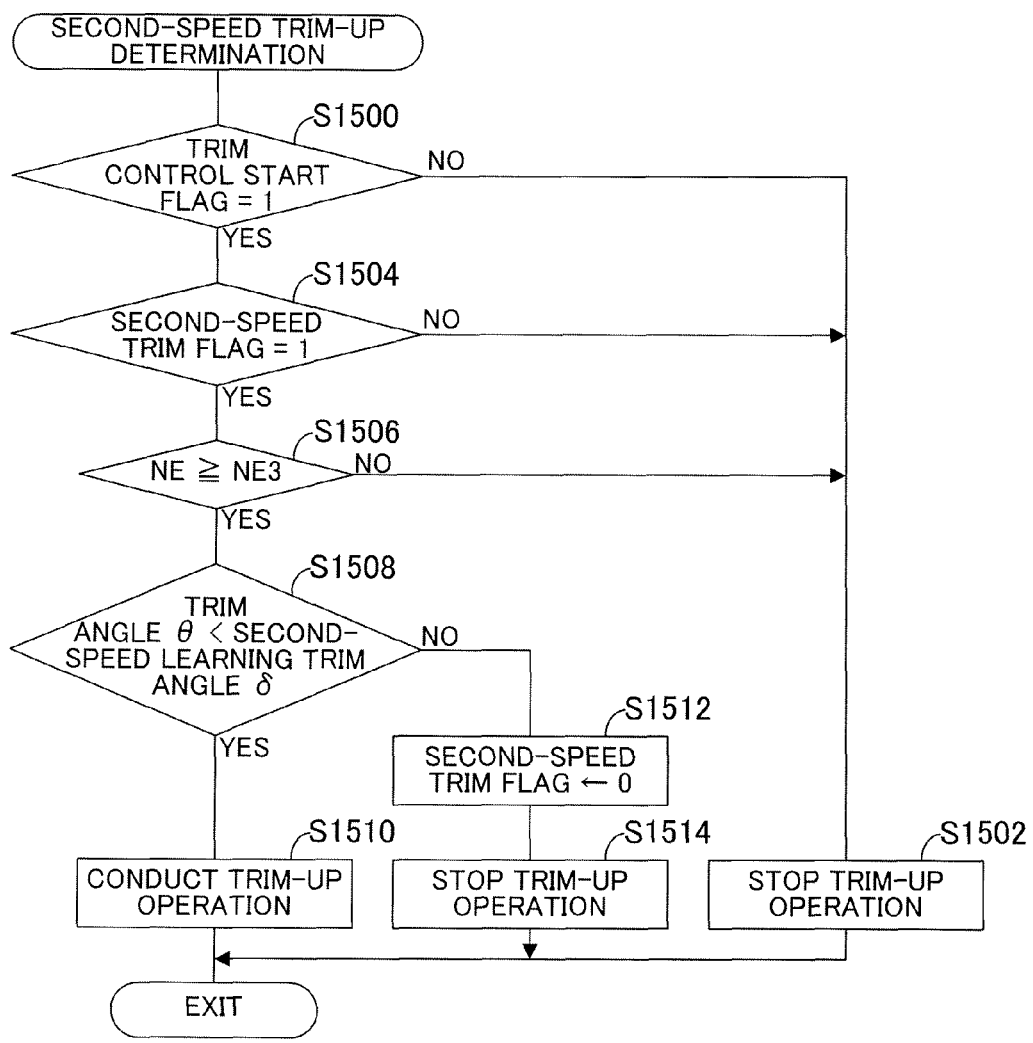
FIG. 30 is a subroutine flowchart showing the operation of second-speed trim-up determination of the FIG. 25 flowchart.
Figure 31:
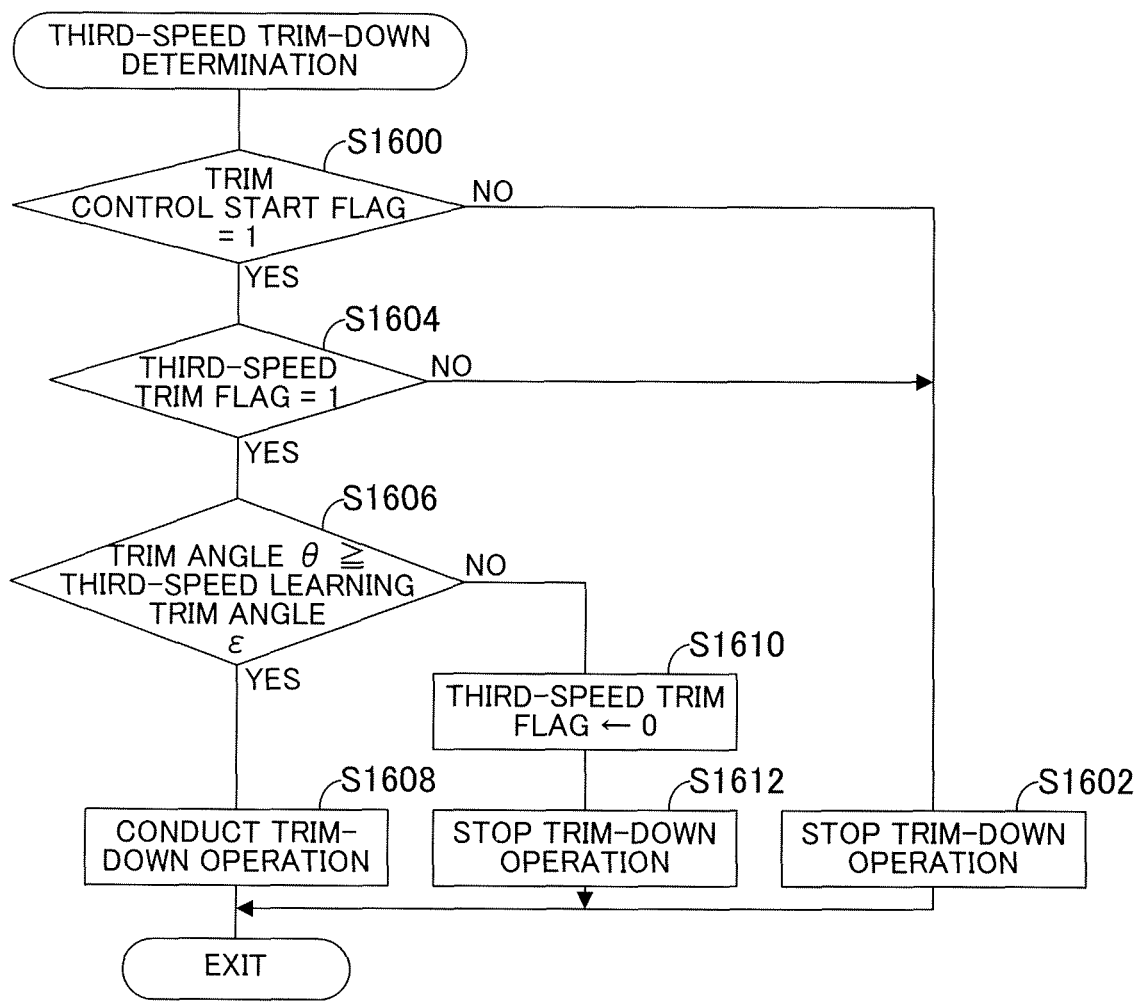
FIG. 31 is a subroutine flowchart showing the operation of third-speed trim-down determination of the FIG. 25 flowchart.

FIG. 30 is a subroutine flowchart showing the operation of second-speed trim-up determination and FIG. 31 is a subroutine flowchart showing the operation of third-speed trim-down determination.

As shown in FIG. 30, in S1500, it is determined whether the bit of the trim control start flag is 1. When the result in S1500 is negative, the program proceeds to S1502, in which the trim-up operation is stopped, i.e, the trim-up operation using the learning trim angle δ is not conducted.

When the result in S1500 is affirmative, the program proceeds to S1504, in which it is determined whether the bit of the second-speed trim flag is 1. When the result in S1504 is negative, since it means that the trim-up operation is not needed, the program proceeds to S1502, in which the trim-up operation is not conducted. When the result in S1504 is affirmative (e.g., when the change amount DTH is equal to or greater than the predetermined value DTHb and the gear position is changed to the first speed), the program proceeds to S1506, in which it is determined whether the engine speed NE is equal to or greater than the third predetermined speed NE3. In other words, the process in S1506 is conducted to determine whether the engine speed NE represents the condition where it is immediately before the acceleration in the first speed is completed and the transmission 46 is changed back from the first speed to the second speed.

When the result in S1506 is negative, since it is not the time to start the trim-up operation, the program proceeds to S1502 and the program is terminated without conducting the trim-up operation. On the other hand, when the result in S1506 is affirmative, the program proceeds to S1508, in which it is determined whether the trim angle θ is less than the second-speed learning trim angle δ.

When the result in S1508 is affirmative, the program proceeds to S1510, in which the trim unit 24 is operated to start and conduct the trim-up operation. Specifically, when the engine speed NE is equal to or greater than the third predetermined speed NE3, the trim-up operation is started. Thus, after the second-speed learning trim angle δ is determined, the trim-up operation is started before the acceleration is completed and the transmission 46 is changed back from the first speed to the second speed, thereby increasing the boat speed.

After the trim angle θ is regulated through the trim-up operation, when the result in S1508 in the next program loop is negative, the program proceeds to S1512, in which the bit of the second-speed trim flag is reset to 0 and to S1514, in which the trim-up operation is stopped. Thus, when the gear position is in the second speed, the trim angle θ is regulated to the learning trim angle δ, thereby making the boat speed reach the maximum speed.

Next, the operation of third-speed trim-down determination in FIG. 31 is explained. In S1600, it is determined whether the bit of the trim control start flag is 1. When the result in S1600 is negative, the program proceeds to S1602, in which the trim-down operation is stopped, i.e, the trim-down operation using the learning trim angle ε is not conducted.

When the result in S1600 is affirmative, the program proceeds to S1604, in which it is determined whether the bit of the third-speed trim flag is 1. When the result in S1604 is negative, since it means that the trim-down operation is not needed, the program proceeds to S1602, in which the trim-down operation is not conducted. When the result in S1604 is affirmative, i.e., when the gear position is changed to the third speed, the program proceeds to S1606, in which it is determined whether the trim angle θ is equal to or greater than the third-speed learning trim angle ε.

When the result in S1606 is affirmative, the program proceeds to S1608, in which the trim unit 24 is operated to start and conduct the trim-down operation. After the trim angle θ is regulated through the trim-down operation, when the result in S1606 in the next program loop is negative, the program proceeds to S1610, in which the bit of the third-speed trim flag is reset to 0 and to S1612, in which the trim-down operation is stopped. Thus, after the third-speed learning trim angle ε is determined, the trim-down operation is started when the transmission 46 is changed to the third speed, so that the trim angle θ is regulated to the learning trim angle ε, thereby making the boat speed reach the maximum speed.

Returning to the explanation on the FIG. 25 flowchart, the program proceeds to S26, in which it is determined whether the trim-down operation for regulating the trim angle θ back to the initial angle should be conducted.

Figure 32:
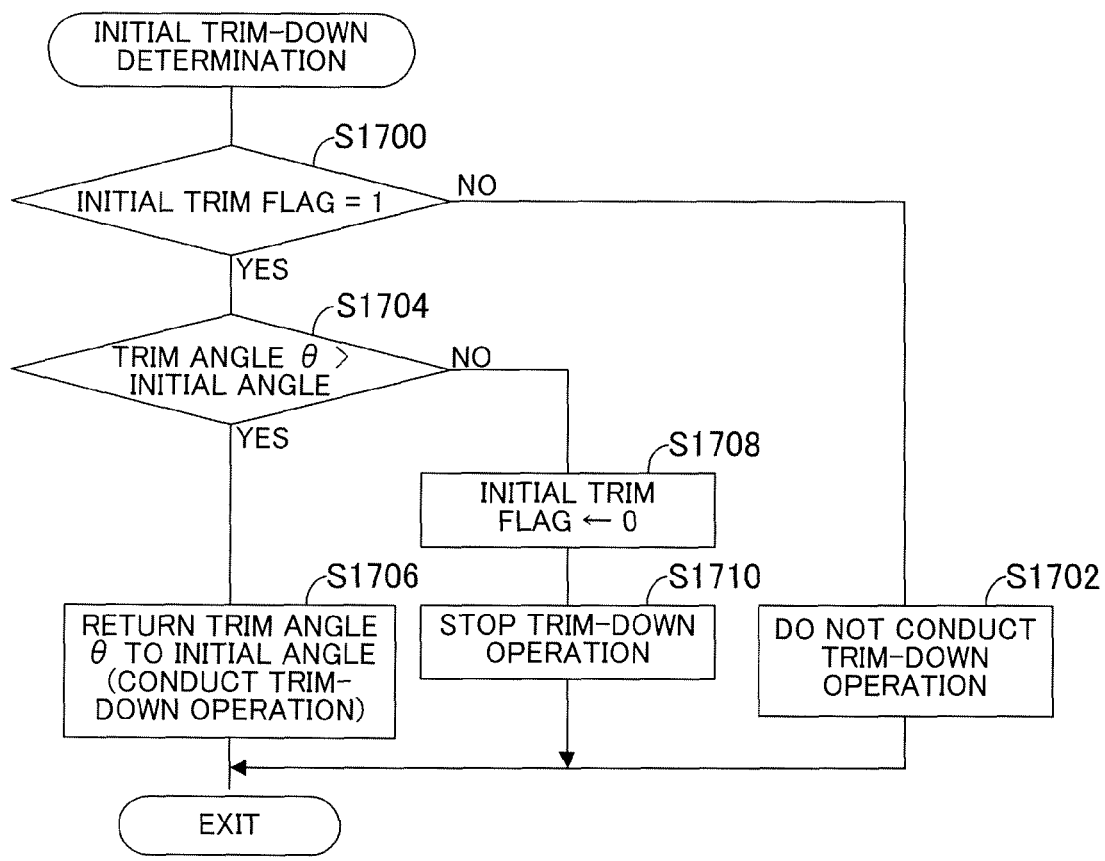
FIG. 32 is a subroutine flowchart showing the operation of initial trim-down determination of the FIG. 25 flowchart.

FIG. 32 is a subroutine flowchart showing the operation of initial trim-down determination.

In S1700, it is determined whether the bit of an initial trim flag is 1. When the result is negative, the program proceeds to S1702, in which the trim-down operation based on the initial trim flag is not conducted.

When the result in S1700 is affirmative, the program proceeds to S1704, in which it is determined whether the trim angle θ is greater than the initial angle. When the result in S1704 is affirmative, the program proceeds to S1706, in which the trim unit 24 is operated to conduct the trim-down operation to regulate or return the trim angle θ to the initial angle. When the result in S1704 is negative, the program proceeds to S1708, in which the bit of the initial trim flag is reset to 0 and to S1710, in which the trim-down operation is stopped and the program is terminated.

Figure 33:
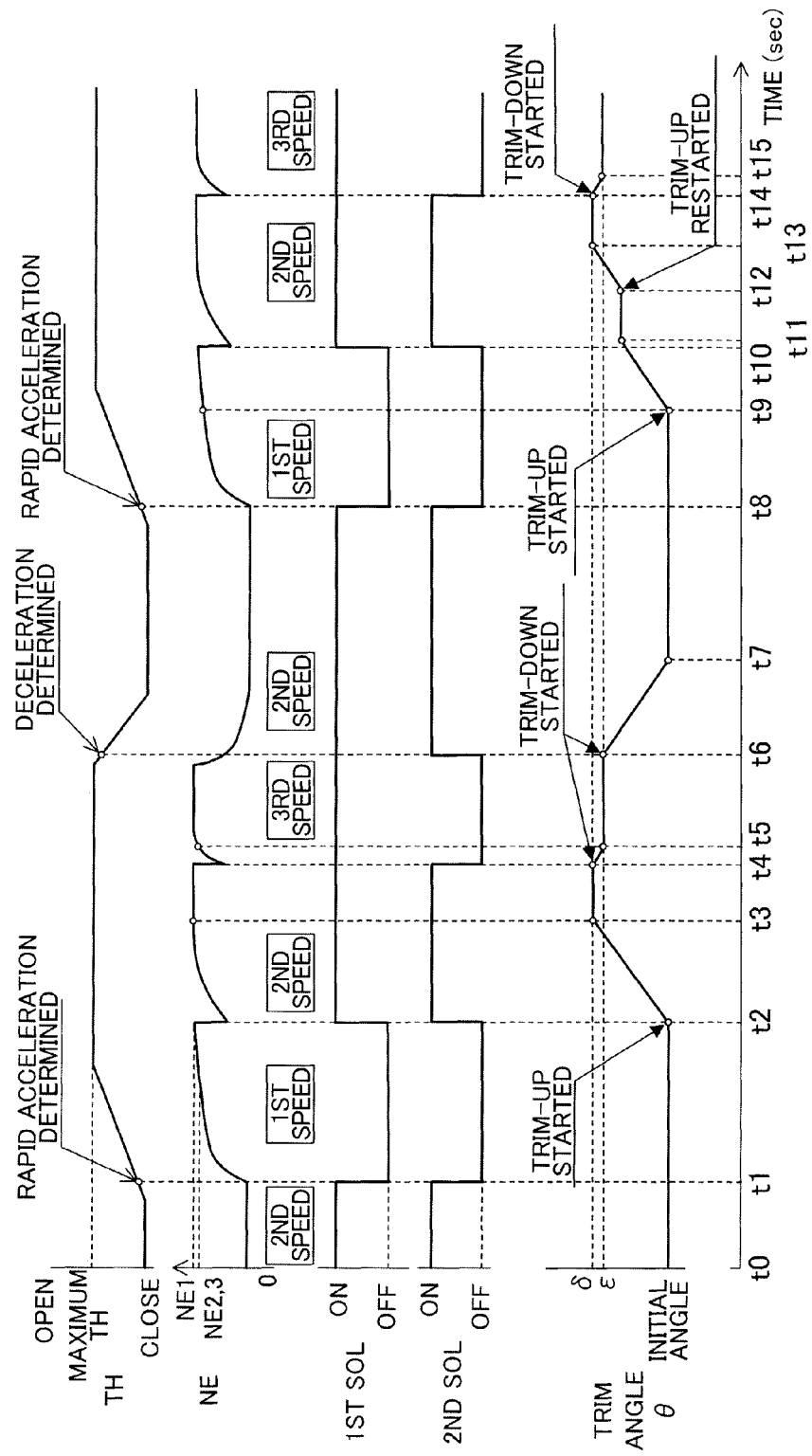
FIG. 33 is a time chart for explaining the operation of the flowcharts in FIGS. 25 to 32.

FIG. 33 is a time chart for explaining the above operation.

The explanation on the time t0 to t1 is omitted here, as it is the same as in the first embodiment.

After the gear position is changed to the first speed at the time t1, the acceleration is continued and the engine speed NE is gradually increased. When, at the time t2, the engine speed NE reaches the first predetermined speed NE1 or more (S1116), the gear position is changed from the first speed to the second speed (S1134) and then the trim-up operation is started (S1200, S1208).

At the time t3, when the change amount DNE is determined to be within the predetermined range (S1206, S1210), the trim-up operation is stopped (S1214) and the trim angle θ at the moment is learned or stored as the second-speed learning trim angle δ (S1216).

After that, when the fuel consumption decreasing command is inputted by the operator through the switch 130 (S1138) and, at the time t4, the engine speed NE is equal to or greater than the second predetermined speed NE2 (S1154), the gear position is changed from the second speed to the third speed (S1158) and the trim-down operation is started (S1300, S1308).

When, at the time t5, the change amount DNE is determined to be within the second predetermined range (S1306, S1310), the trim-down operation is stopped (S1314) and the trim angle θ at the moment is learned or stored as the third-speed learning trim angle ε (S1316). Although not illustrated, when the trim-down operation is stopped, similarly to the condition shown in FIG. 10C, the axis line 44a of the propeller shaft 44 is positioned substantially parallel with the traveling direction of the boat 1, thereby making the boat speed in the third speed reach the maximum speed.

When, at the time t6, the lever 122 is manipulated by the operator and the change amount DTH is less than the predetermined value DTHa (S1106), the gear position is changed from the third speed to the second speed (S1166) and the trim-down operation is started to regulate the trim angle θ to the initial angle (S1700, S1706). FIG. 10D is a view showing the condition where the trim angle θ has been returned to the initial angle.

Explaining on the next trim up/down operation, when, at the time t8, the lever 122 is manipulated and the change amount DTH is equal to or greater than the predetermined value DTHb (S1120), the gear position is changed from the second speed to the first speed (S1126).

After that, the acceleration is continued and the engine speed NE is gradually increased. When, at the time t9, the engine speed NE is equal to or greater than the third predetermined speed NE3, the trim-up operation is started (S1506, S1510). When the engine speed NE is further increased and reaches the first predetermined speed NE1 or more (S1116; time t10), the gear position is changed from the first speed to the second speed (S1134).

When, at the time 11, the pitching of the hull 12 is determined to occur, the trim-up operation is stopped (S1142, S1144, S1502, S1504). After that, when the predetermined time period elapses (time t12), the trim-up operation is restarted (S1140, S1150, S1504, S1510). When, at the time t13, the trim angle θ becomes the second-speed learning trim angle δ, the trim-up operation is stopped (S1508, S1514).

Then, when the fuel consumption decreasing command is inputted by the operator through the switch 130 (S1138) and, at the time t14, the engine speed NE is equal to or greater than the second predetermined speed NE2 (S1154), the gear position is changed from the second speed to the third speed (S1158) and the trim-down operation is started (S1608). Subsequently, when, at the time t15, the trim angle θ becomes the third-speed learning trim angle ε, the trim-down operation is stopped (S1606, S1612).

The remaining configuration as well as the effects is the same as that in the above embodiments.

As stated above, the first to seventh embodiments are configured to have an apparatus for controlling operation of an outboard motor (10) adapted to be mounted on a stern (12a) of a boat (1) and having an internal combustion engine (30) to power a propeller (42) through a drive shaft (input shaft 54) and a propeller shaft (44), a transmission (46) installed at a location between the drive shaft and the propeller shaft, the transmission being selectively changeable in gear position to establish speeds including at least a first speed and a second speed and transmitting power of the engine to the propeller with a gear ratio determined by established speed, and a trim angle regulation mechanism (trim unit 24) regulating a trim angle (θ) relative to the boat through trim-up/down operation, comprising a throttle opening change amount detector (throttle opening sensor 96, ECU 110, S10, S104, S404, S804, S1104) that detects a change amount (DTH) of throttle opening (TH) of the engine; an engine speed detector (crank angle sensor 102, ECU 110, S10, S110, S410, S810, S1108) that detects speed of the engine (NE); a transmission controller (ECU 110, S10, S120, S126, S420, S426, S820, S826, S1120, S1126) that controls operation of the transmission to change the gear position from the second speed to the first speed when the second speed is selected and the detected change amount of the throttle opening is equal to or greater than a first predetermined value (acceleration-determining predetermined value DTHb); and a trim angle controller (ECU 110) that controls operation of the trim angle regulation mechanism, wherein the trim angle controller operates the trim angle regulation mechanism to start the trim-up operation based on the detected engine speed (NE) (S12, S206, S208, S506, S510, S606, S610, S906, S910, S1004, S1010, S16, S1206, S1208).

With this, when, for example, it is immediately before the gear position is changed (returned) from the first speed to the second speed after the acceleration of the engine 30 is completed, the trim-up operation can be implemented. In other words, the outboard motor 10 can be trimmed up before the gear position is changed from the first speed to the second speed, thereby increasing the boat speed. Therefore, even when the gear position is changed from the first speed to the second speed after the acceleration is completed and the torque to be transmitted to the propeller 42 is decreased, since the boat speed is still increased by regulating the trim angle θ, it becomes possible to avoid an unnatural feel caused by the decrease in the boat speed from being given to the operator.

In the apparatus according to the first to sixth embodiments, the trim angle controller operates the trim angle regulation mechanism to start the trim-up operation when the detected engine speed is equal to or greater than a first predetermined speed (third predetermined speed NE3) (S12, S206, S208, S506, S510, S606, S610, S906, S910, S1004, S1010).

Specifically, since the predetermined speed NE3 is set to a value corresponding to that of immediately before the acceleration is completed and the gear position is changed back from the first speed to the second speed, in addition to the above effects, the trim-up operation can be started at the right time.

In the apparatus according to the first and third embodiments the trim angle controller controls the operation of the trim angle regulation mechanism such that the trim angle converges to a predetermined angle (learning trim angle θa) when the trim-up operation is started (S12, S200 to S214, S600 to S612).

With this, in addition to the above effects, the predetermined angle can be set to a value with which, for instance, the water resistance against the boat 1 is decreased so that the thrust is increased. Accordingly, it becomes possible to reliably increase the boat speed through the trim-up operation before the gear position is changed from the first speed to the second speed.

In the apparatus according to the first to sixth embodiments the trim angle controller controls the operation of the trim angle regulation mechanism to start the trim-down operation such that the trim angle converges to an initial angle when the detected change amount of the throttle opening is less than a second predetermined value (deceleration-determining predetermined value DTHa) (S10, S14, S106, S170, S300 to S308, S700 to S712).

With this, in addition to the above effects, the trim angle θ which is regulated to the predetermined angle, for example, can be changed back to the initial angle at the right time in accordance with the operating condition of the outboard motor 10. Also, in the case where the trim angle θ is regulated to the predetermined angle next time, since the outboard motor 10 can be trimmed up from the initial angle, it becomes possible to reliably and easily regulate the trim angle θ to the predetermined angle.

The apparatus according to the first and third embodiments further includes a pitching detector (acceleration sensor 126, ECU 110, S10, S140) that detects a pitching of the boat, and the trim angle controller determines the predetermined angle based on the trim angle at time when the pitching occurs (S10, S146).

With this, in addition to the above effects, a value obtained by subtracting the prescribed angle from the trim angle θ at the time the pitching occurs can be applied as the predetermined angle (learning trim angle θa). Therefore, when the next trim-up operation is started, the trim-up operation can be stopped before the pitching occurs, i.e., the predetermined angle can be set more appropriately.

The apparatus according to the second and seventh embodiments further includes a pitching detector (acceleration sensor 126, ECU 110, S10, S442, S1142) that detects a pitching of the boat, and the trim angle controller stops the trim-up operation when the pitching is detected by the pitching detector (S10, S12, S442, S444, S502, S504, S22, S1142, S1502, S1504). With this, since the trim-up operation can be stopped immediately after the pitching occurs, it becomes possible to prevent the pitching caused by excessive trim-up operation to the maximum extent.

The apparatus according to the second embodiment further includes an engine speed change amount calculator (ECU 110, S10, S412, S1112) that calculates a change amount (DNE) of the detected engine speed, and the trim angle controller restarts the trim-up operation when a predetermined time period elapses after the trim-up operation is stopped (S10, S12, S440, S450, S502, S510), and stops the restarted trim-up operation when the calculated change amount of the engine speed is less than a prescribed value (third prescribed value DNE3) (S12, S508, S512).

With this, in addition to the above effects, the trim-up operation can be restarted when the predetermined time period has elapsed and there is no pitching anymore. Further, since the prescribed value DNE3 is set to a value with which it is possible to estimate that the acceleration is completed and the boat speed is at or about the maximum speed, the restarted trim-up operation can be stopped at the right time.

In the apparatus, the trim angle controller restarts the trim-up operation when the predetermined time period elapses, while the pitching is not detected, after the trim-up operation is stopped (S10, S12, S440, S448, S450, S502, S510). With this, in addition to the above effects, the trim-up operation can be surely restarted when the predetermined time period has elapsed.

In the apparatus, the trim angle controller stores the trim angle at time when the restarted trim-up operation is stopped, and controls the operation of the trim angle regulation mechanism such that the trim angle converges to the stored trim angle (learning trim angle θa) when the trim-up operation is next conducted (S12, S500, S516 to S526). With this, in addition to the above effects, when the next trim-up operation is conducted, the appropriate trim angle θ can be achieved reliably.

The apparatus according to the fourth embodiment further includes an engine speed change amount calculator (ECU 110, S10, S812) that calculates a change amount (DNE) of the detected engine speed, and the trim angle controller stops the trim-up operation based on the calculated change amount of the engine speed (S12, S902, S908, S1002, S1006).

Specifically, when, for example, the change amount DNE represents the condition where the acceleration in the first speed was completed and the boat speed has reached the maximum speed, the trim-up operation can be stopped in response thereto, thereby appropriately setting the trim angle θ after the trim-up operation.

In the apparatus, the trim angle controller stops the trim-up operation when the calculated change amount of the engine speed is less than a prescribed value (third prescribed value DNE3) (S12, S902, S908).

With this, in addition to the above effects, since the prescribed value DNE3 is set as a criterion for determining that the acceleration in the first speed was completed and the boat speed has reached the maximum speed for instance, the trim-up operation can be stopped at the right time, thereby appropriately setting the trim angle θ after the trim-up operation.

The apparatus according to the fifth and sixth embodiments further includes an engine speed change amount calculator (ECU 110, S10, S812) that calculates a change amount (DNE) of the detected engine speed, and the trim angle controller changes a change amount of the trim angle per unit time in accordance with the detected engine speed or the calculated change amount of the engine speed after the trim-up operation is started (S12, S1008, S1008a, S1010).

With this, since the operating condition of the boat 1 (i.e., whether the boat speed approaches the maximum speed) can be determined based on the engine speed NE or the change amount DNE, it becomes possible to conduct the trim-up operation with the appropriate change amount of the trim angle θ per unit time in accordance with the operating condition, thereby preventing the pitching occurrence caused by the trim-up operation.

In the apparatus according to the fifth embodiment, the trim angle controller decreases the change amount of the trim angle as the calculated change amount of the engine speed is decreased (S12, S1008, S1010). With this, in addition to the above effects, it becomes possible to conduct the trim-up operation with the appropriate change amount of the trim angle θ per in accordance with the operating condition of the boat 1, thereby reliably preventing the pitching occurrence.

In the apparatus according to the sixth embodiment, the trim angle controller decreases the change amount of the trim angle as the detected engine speed is increased (S12, S1008a, S1010). With this, in addition to the above effects, it becomes possible to conduct the trim-up operation with the appropriate change amount of the trim angle θ per in accordance with the operating condition of the boat 1, thereby reliably preventing the pitching occurrence.

The apparatus according to the seventh embodiment further includes an engine speed change amount calculator (ECU 110, S10, S1110) that calculates a change amount (DNE) of the detected engine speed, and the transmission controller controls the operation of the transmission to change the gear position from the first speed to the second speed when the detected engine speed is equal to or greater than a second predetermined speed (first predetermined speed NE1) after the gear position is changed to the first speed (S10, S1116, S1134), and the trim angle controller operates the trim angle regulation mechanism to start the trim-up operation after the gear position is changed to the second speed by the transmission controller (S16, S1200, S1208) and to stop the trim-up operation when the calculated change amount of the engine speed is within a predetermined range (DNE5≤DNE≤DNE4) after the trim-up operation is started (S16, S1206, S1210, S1214).

With this, when, for example, the change amount DNE represents the condition where the acceleration was completed and the boat speed has reached the maximum speed, the trim-up operation can be stopped in response thereto, thereby appropriately setting the trim angle θ of after the acceleration is completed and the gear position is changed to the second speed.

In the apparatus, the trim angle controller stores the trim angle at time when the trim-up operation is stopped, and controls the operation of the trim angle regulation mechanism such that the trim angle converges to the stored trim angle (second-speed learning trim angle δ) when the trim-up operation is next conducted (S16, S22, S1216, S1504, S1508 to S1514). Specifically, since the trim angle θ at which the trim-up operation is to be stopped is stored to learning-control the trim unit 24, the trim angle θ used in the next trim-up operation can be reliably set to the optimal value.

In the apparatus, the transmission establishes speeds including at least a third speed, the transmission controller controls the operation of the transmission to change the gear position from the second speed to the third speed when the detected engine speed is equal to or greater than a third predetermined speed (second predetermined speed NE2) after the trim-up operation is stopped by the trim angle controller (ECU 110, S10, S1154, S1158), and the trim angle controller operates the trim angle regulation mechanism to start the trim-down operation after the gear position is changed to the third speed by the transmission controller (S18, S1300, S1308) and to stop the trim-down operation when the calculated change amount of the engine speed is within a second predetermined range (DNE6≤DNE≤DNE7) after the trim-down operation is started (S18, S1306, S1310).

With this, when, for example, the change amount DNE represents the condition where the gear position was changed to the third speed and the boat speed has reached the maximum speed, the trim-down operation can be stopped in response thereto, thereby appropriately setting the trim angle θ of after the gear position is changed to the third speed. Since the trim angle θ can be set to the optimal value for making the boat speed reach the maximum speed, it makes possible to decrease the fuel consumption, i.e., improve the fuel efficiency.

In the apparatus, the trim angle controller stores the trim angle at time when the trim-down operation is stopped, and controls the operation of the trim angle regulation mechanism such that the trim angle converges to the stored trim angle (third-speed learning trim angle ε) when the trim-down operation is next conducted (S18, S24, S1316, S1604 to S1612). Specifically, the trim angle θ at which the trim-down operation is to be stopped is stored to learning-control the trim unit 24, the trim angle θ used in the next trim-down operation can be reliably set to the optimal value.

The apparatus according to the third embodiment further includes a trouble occurrence determiner (ECU 110, S12, S612, S614, S14, S704, S706) that determines whether a trouble occurs in control of the trim angle regulation mechanism, and the trim angle controller stops the control of the trim angle regulation mechanism when it is determined that the trouble occurs (S608, S710).

Since it is configured so that the control of the trim angle regulation mechanism 24 is stopped (i.e., is not continued) when it is determined that the trouble occurs, it becomes possible to avoid a trouble such as a locked condition of the motor 24c, thereby preventing a failure of the trim angle regulation mechanism 24.

In the apparatus, the trim angle regulation mechanism includes an electric motor (24c) for regulating the trim angle, and the trouble occurrence determiner determines that the trouble occurs in the control of the trim angle regulation mechanism by the trim angle controller when the trim angle remains same continuously for a prescribed time period or when a drive current (I) of the motor is equal to or greater than a predetermined current (Ia) (S608, S612, S614, 704, S706, S710).

With this, it becomes possible to accurately determine whether a trouble occurs in the control of the trim angle regulation mechanism 24.

It should be noted that, in some of the foregoing embodiments, although the trim angle (predetermined angle) after the trim-up operation is regulated to a value (learning trim angle θa) determined by learning, it may instead be a fixed value (e.g., 10 degrees) set in advance.

It should also be noted that, although the outboard motor is exemplified above, this invention can be applied to an inboard/outboard motor equipped with a transmission and a trim angle regulation mechanism.

It should also be noted that, although the deceleration/acceleration-determining predetermined value DTHa, DTHb, first to third predetermined speeds NE1 to NE3, first to seventh prescribed values DNE1 to DNE7, predetermined time period, predetermined current Ia, displacement of the engine 30 and other values are indicated with specific values in the foregoing, they are only examples and not limited thereto.

Japanese Patent Application Nos. 2010-049665, 2010-049666, 2010-049667, 2010-049668, 2010-049669 and 2010-049670, all filed on Mar. 5, 2010 are incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for controlling operation of an outboard motor adapted to be mounted on a stern of a boat and having an internal combustion engine to power a propeller through a drive shaft and a propeller shaft, a transmission installed at a location between the drive shaft and the propeller shaft, the transmission being selectively changeable in gear position to establish gears including at least a first gear and a second gear and transmitting power of the engine to the propeller with a gear ratio determined by established gear, and a trim angle regulation mechanism for regulating a trim angle relative to the boat through selective trim-up and trim-down operations, said apparatus comprising:

a throttle opening change amount detector that detects a change amount of a throttle opening of the engine;

an engine speed detector that detects a speed of the engine;

a transmission controller that controls operation of the transmission to change the gear position from the second gear to the first gear when the second gear is selected and the detected change amount of the throttle opening is equal to or greater than a first predetermined value; and a trim angle controller that controls operation of the trim angle regulation mechanism, wherein the trim angle controller operates the trim angle regulation mechanism to start a trim-up operation, when the detected engine speed is equal to or greater than a first predetermined speed after the gear position is changed from the second gear to the first gear by the transmission controller.

2. The apparatus according to claim 1, wherein the trim angle controller controls the operation of the trim angle regulation mechanism such that the trim angle converges to a predetermined angle when the trim-up operation is started.

3. The apparatus according to claim 2, wherein the trim angle controller controls the operation of the trim angle regulation mechanism to start the trim-down operation such that the trim angle converges to an initial angle when the detected change amount of the throttle opening is less than a second predetermined value.

4. The apparatus according to claim 2, further including:
a pitching detector that detects a pitching of the boat, said pitching detector comprising an acceleration sensor,
and wherein the trim angle controller determines the predetermined angle based on the trim angle at time when the pitching occurs.

5. The apparatus according to claim 1, further including:
a pitching detector that detects a pitching of the boat, said pitching detector comprising an acceleration sensor,
and wherein the trim angle controller stops the trim-up operation when the pitching is detected by the pitching detector.

6. The apparatus according to claim 5, further including:
an engine speed change amount calculator that calculates a change amount of the detected engine speed,
and wherein the trim angle controller restarts the trim-up operation when a predetermined time period elapses after the trim-up operation is stopped, and stops the restarted trim-up operation when the calculated change amount of the engine speed is less than a prescribed value.

7. The apparatus according to claim 6, wherein the trim angle controller restarts the trim-up operation when the predetermined time period elapses, while the pitching is not detected, after the trim-up operation is stopped.

8. The apparatus according to claim 6, wherein the trim angle controller stores the trim angle at time when the restarted trim-up operation is stopped, and controls the operation of the trim angle regulation mechanism such that the trim angle converges to the stored trim angle when the trim-up operation is next conducted.

9. The apparatus according to claim 1, further including:
an engine speed change amount calculator that calculates a change amount of the detected engine speed,
and wherein the trim angle controller stops the trim-up operation based on the calculated change amount of the engine speed.

10. The apparatus according to claim 9, wherein the trim angle controller stops the trim-up operation when the calculated change amount of the engine speed is less than a prescribed value.

11. The apparatus according to claim 1, further including:
an engine speed change amount calculator that calculates a change amount of the detected engine speed,
and wherein the trim angle controller changes a change amount of the trim angle per unit time in accordance with the detected engine speed or the calculated change amount of the engine speed after the trim-up operation is started.

12. The apparatus according to claim 11, wherein the trim angle controller decreases the change amount of the trim angle as the calculated change amount of the engine speed is decreased.

13. The apparatus according to claim 11, wherein the trim angle controller decreases the change amount of the trim angle as the detected engine speed is increased.

14. The apparatus according to claim 1, further including:
an engine speed change amount calculator that calculates a change amount of the detected engine speed,
and wherein the transmission controller controls the operation of the transmission to change the gear position from the first gear to the second gear when the detected engine speed is equal to or greater than a second predetermined speed after the gear position is changed to the first gear, and the trim angle controller operates the trim angle regulation mechanism to start the trim-up operation after the gear position is changed to the second gear by the transmission controller and to stop the trim-up operation when the calculated change amount of the engine speed is within a predetermined range after the trim-up operation is started.

15. The apparatus according to claim 14, wherein the trim angle controller stores the trim angle at a time when the trim-up operation is stopped, and controls the operation of the trim angle regulation mechanism such that the trim angle converges to the stored trim angle when the trim-up operation is next conducted.

16. The apparatus according to claim 14, wherein the transmission establishes gears including at least a third gear, the transmission controller controls the operation of the transmission to change the gear position from the second gear to the third gear when the detected engine speed is equal to or greater than a third predetermined speed after the trim-up operation is stopped by the trim angle controller, and the trim angle controller operates the trim angle regulation mechanism to start the trim-down operation after the gear position is changed to the third gear by the transmission controller and to stop the trim-down operation when the calculated change amount of the engine speed is within a second predetermined range after the trim-down operation is started.

17. The apparatus according to claim 16, wherein the trim angle controller stores the trim angle at a time when the trim-down operation is stopped, and controls the operation of the trim angle regulation mechanism such that the trim angle converges to the stored trim angle when the trim-down operation is next conducted.

18. The apparatus according to claim 1, further including:
a trouble occurrence determiner that determines whether a trouble occurs in control of the trim angle regulation mechanism,
and wherein the trim angle controller stops the control of the trim angle regulation mechanism when it is determined that the trouble occurs.

19. The apparatus according to claim 18, wherein the trim angle regulation mechanism includes an electric motor for regulating the trim angle, and the trouble occurrence determiner determines that the trouble occurs in the control of the trim angle regulation mechanism by the trim angle controller when the trim angle remains the same trim angle continuously for a prescribed time period.

* * * * *